(12) United States Patent
Smits

(10) Patent No.: US 11,829,059 B2
(45) Date of Patent: Nov. 28, 2023

(54) HIGH RESOLUTION SCANNING OF REMOTE OBJECTS WITH FAST SWEEPING LASER BEAMS AND SIGNAL RECOVERY BY TWITCHY PIXEL ARRAY

(71) Applicant: Gerard Dirk Smits, Los Gatos, CA (US)

(72) Inventor: Gerard Dirk Smits, Los Gatos, CA (US)

(*) Notice: Subject to any disclaimer, the term of this patent is extended or adjusted under 35 U.S.C. 154(b) by 0 days.

(21) Appl. No.: 17/850,102

(22) Filed: Jun. 27, 2022

(65) Prior Publication Data
US 2022/0326594 A1 Oct. 13, 2022

Related U.S. Application Data

(63) Continuation of application No. 17/189,204, filed on Mar. 1, 2021, now Pat. No. 11,372,320.
(Continued)

(51) Int. Cl.
*G03B 21/20* (2006.01)
*G02B 26/10* (2006.01)
*H04N 9/31* (2006.01)

(52) U.S. Cl.
CPC ....... *G03B 21/2046* (2013.01); *G02B 26/101* (2013.01); *H04N 9/3129* (2013.01)

(58) Field of Classification Search
CPC .............. G03B 21/145; G03B 21/208; G03B 21/2013; G03B 21/2033; G03B 21/2053;
(Continued)

(56) References Cited

U.S. PATENT DOCUMENTS 4,019,262 A 4/1977 Breglia et al.
4,340,274 A 7/1982 Spooner
(Continued)

FOREIGN PATENT DOCUMENTS

CN 1633801 A 6/2005
CN 1902530 A 1/2007
(Continued)

OTHER PUBLICATIONS

Office Communication for Japanese Patent Application No. JP 2019-535248 dated Jul. 4, 2022, pp. 1-5.
(Continued)

*Primary Examiner* — Sultan Chowdhury
(74) *Attorney, Agent, or Firm* — John W. Branch; Branch Partners PLLC

(57) ABSTRACT

A scanning light imaging device for continuously pseudo randomly scanning patterns of light in a beam onto a remote surface to achieve spatio-temporal super resolution for finding remotely located objects. The scanning light imaging device employs a scanner to project image beams of visible or non-visible light and/or tracer beams of non-visible light onto a remote surface or remote object to detect reflections. The device employs a light detector to sense at least the reflections of light from one or more of the image beams or the tracer beams incident on the remote surface or remote object. The device employs the sensed reflections of light beams to predict the trajectory of subsequent scanned beams in a pseudo random pattern and determine up to a six degrees of freedom position for the remote surface or remote object.

20 Claims, 18 Drawing Sheets

Related U.S. Application Data

(60) Provisional application No. 63/100,040, filed on Feb. 27, 2020.

(58) Field of Classification Search
CPC .. G03B 21/2066; G02B 26/007; G02B 26/10; G02B 26/12; G02B 26/101; G02B 26/108; G02B 26/121; G02B 26/123; G02B 26/127

See application file for complete search history.

(56) References Cited

U.S. PATENT DOCUMENTS

| | | | |
|---|---|---|---|
| 4,820,041 A | 4/1989 | Davidson et al. |
| 4,988,187 A | 1/1991 | Kuriyama |
| 5,052,820 A | 10/1991 | McGinniss et al. |
| 5,107,122 A | 4/1992 | Barkan et al. |
| 5,115,230 A | 5/1992 | Smoot |
| 5,218,427 A | 6/1993 | Koch |
| 5,245,398 A | 9/1993 | Ludden |
| 5,455,588 A | 10/1995 | Lew et al. |
| 5,506,682 A | 4/1996 | Pryor |
| 5,521,722 A | 5/1996 | Colvill et al. |
| 5,559,322 A | 9/1996 | Jacoby et al. |
| 5,572,251 A | 11/1996 | Ogawa |
| 5,580,140 A | 12/1996 | Katz et al. |
| 5,661,506 A | 8/1997 | Lazzouni et al. |
| 5,793,491 A | 8/1998 | Wangler et al. |
| 5,812,664 A | 9/1998 | Bernobich et al. |
| 5,914,783 A | 6/1999 | Barrus |
| 5,930,378 A | 7/1999 | Kubota et al. |
| 6,009,374 A | 12/1999 | Urahashi |
| 6,115,022 A | 9/2000 | Mayer, III et al. |
| 6,130,706 A | 10/2000 | Hart, Jr. et al. |
| 6,195,446 B1 | 2/2001 | Skoog |
| 6,307,526 B1 | 10/2001 | Mann |
| 6,404,416 B1 | 6/2002 | Kahn et al. |
| 6,535,182 B2 | 3/2003 | Stanton |
| 6,535,275 B2 | 3/2003 | McCaffrey et al. |
| 6,543,899 B2 | 4/2003 | Covannon et al. |
| 6,545,670 B1 | 4/2003 | Pryor |
| 6,670,603 B2 | 12/2003 | Shimada et al. |
| 6,692,994 B2 | 2/2004 | Davis et al. |
| 6,704,000 B2 | 3/2004 | Carpenter |
| 6,710,767 B1 | 3/2004 | Hasegawa et al. |
| 6,766,066 B2 | 7/2004 | Kitazawa |
| 6,843,564 B2 | 1/2005 | Putilin et al. |
| 6,843,568 B2 | 1/2005 | Schenk et al. |
| 6,894,823 B2 | 5/2005 | Taylor et al. |
| 6,982,683 B2 | 1/2006 | Stanton |
| 7,006,142 B2 | 2/2006 | Seo |
| 7,023,536 B2 | 4/2006 | Zhang et al. |
| 7,027,222 B2 | 4/2006 | Takahashi et al. |
| 7,116,455 B2 | 10/2006 | Yamaoka |
| 7,119,965 B1 | 10/2006 | Rolland et al. |
| 7,144,117 B2 | 12/2006 | Kojima |
| 7,182,465 B2 | 2/2007 | Fuchs et al. |
| 7,203,383 B2 | 4/2007 | Fisher |
| 7,232,229 B2 | 6/2007 | Peeters et al. |
| 7,262,765 B2 | 8/2007 | Brown et al. |
| 7,278,745 B2 | 10/2007 | Engle |
| 7,280,211 B2 | 10/2007 | Horibe et al. |
| 7,283,301 B2 | 10/2007 | Peeters et al. |
| 7,289,110 B2 | 10/2007 | Hansson |
| 7,303,289 B2 | 12/2007 | Fujiwara |
| 7,348,528 B2 | 3/2008 | Marshall |
| 7,349,553 B2 | 3/2008 | Rodriguez |
| 7,359,041 B2 | 4/2008 | Xie et al. |
| 7,375,804 B2 | 5/2008 | Liebman et al. |
| 7,377,656 B2 | 5/2008 | Nojima et al. |
| 7,401,920 B1 | 7/2008 | Kranz et al. |
| 7,440,691 B2 | 10/2008 | Beniyama et al. |
| 7,511,847 B2 | 3/2009 | Silverbrook et al. |
| 7,554,652 B1 | 6/2009 | Babin et al. |
| 7,667,598 B2 | 2/2010 | Yenisch et al. |
| 7,787,134 B2 | 8/2010 | Kohnen et al. |
| 7,905,567 B2 | 3/2011 | Orsley |
| 7,911,444 B2 | 3/2011 | Yee |
| 8,115,728 B2 | 2/2012 | Feng |
| 8,169,447 B2 | 5/2012 | Bhogal et al. |
| 8,170,329 B2 | 5/2012 | Seko et al. |
| 8,189,176 B2 | 5/2012 | Moir |
| 8,213,022 B1 | 7/2012 | Riza et al. |
| 8,259,239 B2 | 9/2012 | Hua |
| 8,282,222 B2 | 10/2012 | Smits |
| 8,297,758 B2 | 10/2012 | Choi et al. |
| 8,330,942 B2 | 12/2012 | Nordenfelt et al. |
| 8,355,117 B2 | 1/2013 | Niclass |
| 8,430,512 B2 | 4/2013 | Smits |
| 8,493,573 B2 | 7/2013 | Chinn et al. |
| 8,558,810 B2 | 10/2013 | Guo |
| 8,573,783 B2 | 11/2013 | Smits |
| 8,636,367 B1 | 1/2014 | Callison et al. |
| 8,665,435 B2 | 3/2014 | Hidaka |
| 8,696,141 B2 | 4/2014 | Smits |
| 8,711,370 B1 | 4/2014 | Smits |
| 8,718,326 B2 | 5/2014 | Yoon et al. |
| 8,723,928 B2 | 5/2014 | Moriyama et al. |
| 8,773,512 B1 | 7/2014 | Rafii |
| 8,780,161 B2 | 7/2014 | Samadani et al. |
| 8,797,531 B2 | 8/2014 | Knox et al. |
| 8,867,827 B2 | 10/2014 | Yeatman, Jr. et al. |
| 8,941,817 B2 | 1/2015 | Laudrain et al. |
| 8,947,755 B2 | 2/2015 | Konuma et al. |
| 8,953,242 B2 | 2/2015 | Larson et al. |
| 8,957,847 B1 | 2/2015 | Karakotsios et al. |
| 8,994,780 B2 | 3/2015 | Moore |
| 9,026,596 B2 | 5/2015 | Perez et al. |
| 9,045,226 B2 | 6/2015 | Piasecki et al. |
| 9,080,866 B1 | 7/2015 | Dowdall et al. |
| 9,097,800 B1 | 8/2015 | Zhu |
| 9,131,192 B2 | 9/2015 | Ubillos et al. |
| 9,134,799 B2 | 9/2015 | Mark |
| 9,151,607 B2 | 10/2015 | Davies et al. |
| 9,244,339 B2 | 1/2016 | Wang |
| 9,323,055 B2 | 4/2016 | Baillot |
| 9,366,519 B2 | 6/2016 | Danbury et al. |
| 9,377,533 B2 | 6/2016 | Smits |
| 9,392,225 B2 | 7/2016 | Eisenberg |
| 9,454,014 B2 | 9/2016 | Kurashige et al. |
| 9,482,514 B2 | 11/2016 | Bridges |
| 9,562,764 B2 | 2/2017 | France |
| 9,581,883 B2 | 2/2017 | Smits |
| 9,599,713 B2 | 3/2017 | Giger et al. |
| 9,618,610 B2 | 4/2017 | Kao et al. |
| 9,703,473 B2 | 7/2017 | Schillings et al. |
| 9,813,673 B2 | 11/2017 | Smits |
| 9,854,196 B2 | 12/2017 | Liu et al. |
| 9,864,440 B2 | 1/2018 | Geller et al. |
| 9,939,233 B2 | 4/2018 | Scott et al. |
| 9,946,076 B2 | 4/2018 | Smits et al. |
| 9,952,033 B2 | 4/2018 | Martini et al. |
| 9,961,337 B2 | 5/2018 | Stroetmann |
| 10,037,017 B2 | 7/2018 | Wooldridge et al. |
| 10,052,927 B2 | 8/2018 | Maise et al. |
| 10,067,230 B2 | 9/2018 | Smits |
| 10,261,183 B2 | 4/2019 | Smits |
| 10,331,021 B2 | 6/2019 | Smits |
| 10,564,284 B2 | 2/2020 | Smits |
| 10,614,734 B2 * | 4/2020 | Peuhkurinen .......... G02B 26/10 |
| 10,962,867 B2 | 3/2021 | Smits |
| 2001/0043165 A1 | 11/2001 | Stanton |
| 2002/0011987 A1 | 1/2002 | Kitazawa |
| 2002/0036765 A1 | 3/2002 | McCaffrey et al. |
| 2002/0039138 A1 | 4/2002 | Edelson et al. |
| 2002/0040971 A1 | 4/2002 | Ono |
| 2002/0067466 A1 | 6/2002 | Covannon et al. |
| 2002/0089489 A1 | 7/2002 | Carpenter |
| 2002/0100884 A1 | 8/2002 | Maddock |
| 2002/0139920 A1 | 10/2002 | Seibel et al. |
| 2002/0145588 A1 | 10/2002 | McCahon et al. |
| 2002/0149694 A1 | 10/2002 | Seo |
| 2003/0010888 A1 | 1/2003 | Shimada et al. |
| 2003/0045034 A1 | 3/2003 | Davis et al. |

(56) References Cited

U.S. PATENT DOCUMENTS

| | | |
|---|---|---|
| 2003/0156260 A1 | 8/2003 | Putilin et al. |
| 2003/0202234 A1 | 10/2003 | Taylor et al. |
| 2003/0202679 A1 | 10/2003 | Rodriguez |
| 2003/0214710 A1 | 11/2003 | Takahashi et al. |
| 2003/0222849 A1 | 12/2003 | Starkweather |
| 2004/0003409 A1 | 1/2004 | Berstis |
| 2004/0006424 A1 | 1/2004 | Joyce et al. |
| 2004/0041996 A1 | 3/2004 | Abe |
| 2004/0054359 A1 | 3/2004 | Ruiz et al. |
| 2004/0100508 A1 | 5/2004 | Hansson |
| 2004/0114834 A1 | 6/2004 | Fisher |
| 2004/0179254 A1 | 9/2004 | Lewis et al. |
| 2004/0218155 A1 | 11/2004 | Schenk et al. |
| 2004/0240754 A1 | 12/2004 | Smith et al. |
| 2004/0263874 A1 | 12/2004 | Silverbrook et al. |
| 2005/0024586 A1 | 2/2005 | Teiwes et al. |
| 2005/0030305 A1 | 2/2005 | Brown et al. |
| 2005/0035943 A1 | 2/2005 | Kojima |
| 2005/0052635 A1 | 3/2005 | Xie et al. |
| 2005/0083248 A1 | 4/2005 | Biocca et al. |
| 2005/0099664 A1 | 5/2005 | Yamaoka |
| 2005/0159893 A1 | 7/2005 | Isaji et al. |
| 2005/0195375 A1 | 9/2005 | Fujiwara |
| 2005/0195387 A1 | 9/2005 | Zhang et al. |
| 2005/0219530 A1 | 10/2005 | Horibe et al. |
| 2005/0254726 A1 | 11/2005 | Fuchs et al. |
| 2005/0273830 A1 | 12/2005 | Silver et al. |
| 2006/0028328 A1 | 2/2006 | Cresse |
| 2006/0028374 A1 | 2/2006 | Fullerton |
| 2006/0028375 A1 | 2/2006 | Honda et al. |
| 2006/0028622 A1 | 2/2006 | Nojima et al. |
| 2006/0132447 A1 | 6/2006 | Conrad |
| 2006/0132472 A1 | 6/2006 | Peeters et al. |
| 2006/0132729 A1 | 6/2006 | Engle |
| 2006/0197936 A1 | 9/2006 | Liebman et al. |
| 2006/0256133 A1 | 11/2006 | Rosenberg |
| 2007/0046625 A1 | 3/2007 | Yee |
| 2007/0053679 A1 | 3/2007 | Beniyama et al. |
| 2007/0064242 A1 | 3/2007 | Childers |
| 2007/0103699 A1 | 5/2007 | Kohnen et al. |
| 2007/0138371 A1 | 6/2007 | Marshall |
| 2007/0182949 A1 | 8/2007 | Niclass |
| 2007/0211329 A1 | 9/2007 | Haase et al. |
| 2007/0273610 A1 | 11/2007 | Baillot |
| 2008/0018591 A1 | 1/2008 | Pittel et al. |
| 2008/0174516 A1 | 7/2008 | Xiao et al. |
| 2008/0266169 A1 | 10/2008 | Akita |
| 2008/0291213 A1 | 11/2008 | Bhogal et al. |
| 2008/0309913 A1 | 12/2008 | Fallon |
| 2008/0316026 A1 | 12/2008 | Yenisch et al. |
| 2008/0317077 A1 | 12/2008 | Hoving et al. |
| 2009/0096994 A1 | 4/2009 | Smits |
| 2009/0147239 A1 | 6/2009 | Zhu et al. |
| 2009/0285590 A1 | 11/2009 | Orsley |
| 2010/0002154 A1 | 1/2010 | Hua |
| 2010/0008588 A1 | 1/2010 | Feldkhun et al. |
| 2010/0013860 A1 | 1/2010 | Mandella et al. |
| 2010/0014750 A1 | 1/2010 | Seko et al. |
| 2010/0045967 A1 | 2/2010 | Moir |
| 2010/0110385 A1 | 5/2010 | Choi et al. |
| 2010/0142856 A1 | 6/2010 | Takeuchi et al. |
| 2010/0149518 A1 | 6/2010 | Nordenfelt et al. |
| 2010/0235006 A1 | 9/2010 | Brown |
| 2010/0246902 A1 | 9/2010 | Rowe et al. |
| 2010/0305857 A1 | 12/2010 | Byrne et al. |
| 2010/0326311 A1 | 12/2010 | Simon |
| 2010/0328054 A1 | 12/2010 | Yim et al. |
| 2011/0001793 A1 | 1/2011 | Moriyama et al. |
| 2011/0102763 A1 | 5/2011 | Brown et al. |
| 2011/0115747 A1 | 5/2011 | Powell et al. |
| 2011/0123113 A1 | 5/2011 | Berretty et al. |
| 2011/0211243 A1 | 9/2011 | Smits |
| 2011/0249157 A1 | 10/2011 | Fredembach et al. |
| 2011/0304842 A1 | 12/2011 | Kao et al. |
| 2012/0017147 A1 | 1/2012 | Mark |
| 2012/0050528 A1 | 3/2012 | Davies et al. |
| 2012/0132713 A1 | 5/2012 | Chaum |
| 2012/0134537 A1 | 5/2012 | Yoon et al. |
| 2012/0140231 A1 | 6/2012 | Knox et al. |
| 2012/0187296 A1 | 7/2012 | Hollander et al. |
| 2012/0224019 A1 | 9/2012 | Samadani et al. |
| 2012/0229818 A1 | 9/2012 | Chinn et al. |
| 2012/0236379 A1 | 9/2012 | da Silva et al. |
| 2012/0250152 A1 | 10/2012 | Larson et al. |
| 2012/0262696 A1 | 10/2012 | Eisele et al. |
| 2012/0274937 A1 | 11/2012 | Hays et al. |
| 2012/0320013 A1 | 12/2012 | Perez et al. |
| 2013/0003081 A1 | 1/2013 | Smits |
| 2013/0021271 A1 | 1/2013 | Guo |
| 2013/0079983 A1 | 3/2013 | Ehlgen et al. |
| 2013/0088465 A1 | 4/2013 | Geller et al. |
| 2013/0135198 A1 | 5/2013 | Hodge et al. |
| 2013/0170006 A1 | 7/2013 | Kurashige et al. |
| 2013/0176561 A1 | 7/2013 | Hidaka |
| 2013/0215487 A1 | 8/2013 | Konuma et al. |
| 2013/0229669 A1 | 9/2013 | Smits |
| 2013/0239057 A1 | 9/2013 | Ubillos et al. |
| 2013/0258108 A1 | 10/2013 | Ono et al. |
| 2013/0293396 A1 | 11/2013 | Selevan |
| 2013/0293760 A1 | 11/2013 | Nisenzon et al. |
| 2013/0300637 A1 | 11/2013 | Smits et al. |
| 2013/0300670 A1 | 11/2013 | Besperstov et al. |
| 2013/0342813 A1 | 12/2013 | Wang |
| 2014/0022539 A1 | 1/2014 | France |
| 2014/0098179 A1 | 4/2014 | Moore |
| 2014/0146243 A1 | 5/2014 | Liu et al. |
| 2014/0176954 A1 | 6/2014 | Scott et al. |
| 2014/0204385 A1 | 7/2014 | Ouyang et al. |
| 2014/0215841 A1 | 8/2014 | Danbury et al. |
| 2014/0267620 A1 | 9/2014 | Bridges |
| 2014/0273752 A1 | 9/2014 | Bajaj et al. |
| 2014/0284457 A1* | 9/2014 | Smits .................. H04N 9/3194 250/208.2 |
| 2014/0285818 A1 | 9/2014 | Holz |
| 2014/0307248 A1 | 10/2014 | Giger et al. |
| 2014/0350836 A1 | 11/2014 | Stettner et al. |
| 2014/0354514 A1 | 12/2014 | Aronsson |
| 2015/0009493 A1 | 1/2015 | Kwiatkowski et al. |
| 2015/0066196 A1 | 3/2015 | Wooldridge et al. |
| 2015/0091815 A1 | 4/2015 | Michaelis |
| 2015/0233703 A1 | 4/2015 | Martini et al. |
| 2015/0160332 A1 | 6/2015 | Sebastian et al. |
| 2015/0169082 A1 | 6/2015 | Li et al. |
| 2015/0225783 A1 | 8/2015 | Mears et al. |
| 2015/0279114 A1 | 10/2015 | Yonekubo |
| 2015/0285625 A1 | 10/2015 | Deane |
| 2015/0286293 A1 | 10/2015 | Gruhlke et al. |
| 2015/0301180 A1 | 10/2015 | Stettner et al. |
| 2016/0004126 A1 | 1/2016 | Leister |
| 2016/0011312 A1 | 1/2016 | Leyva |
| 2016/0014403 A1 | 1/2016 | Stroetmann |
| 2016/0041266 A1 | 2/2016 | Smits |
| 2016/0047895 A1 | 2/2016 | Dussan |
| 2016/0050345 A1 | 2/2016 | Longbotham et al. |
| 2016/0139266 A1 | 5/2016 | Montoya et al. |
| 2016/0162747 A1 | 6/2016 | Singh et al. |
| 2016/0259038 A1 | 9/2016 | Retterath et al. |
| 2016/0259058 A1 | 9/2016 | Verheggen et al. |
| 2016/0282468 A1 | 9/2016 | Gruver et al. |
| 2016/0306044 A1 | 10/2016 | Smits |
| 2016/0313553 A1 | 10/2016 | Song et al. |
| 2016/0335778 A1 | 11/2016 | Smits |
| 2016/0349526 A1 | 12/2016 | Kurashige et al. |
| 2017/0003392 A1 | 1/2017 | Bartlett et al. |
| 2017/0010104 A1 | 1/2017 | Aviel |
| 2017/0045358 A1 | 2/2017 | Masuda et al. |
| 2017/0052065 A1 | 2/2017 | Sharma et al. |
| 2017/0097407 A1 | 4/2017 | Shpunt et al. |
| 2017/0108443 A1 | 4/2017 | Kurihara et al. |
| 2017/0131090 A1 | 5/2017 | Bronstein et al. |
| 2017/0176575 A1 | 6/2017 | Smits |
| 2017/0176596 A1 | 6/2017 | Shpunt et al. |
| 2017/0208292 A1 | 7/2017 | Smits |
| 2017/0242104 A1 | 8/2017 | Dussan |

(56) References Cited

U.S. PATENT DOCUMENTS

| | | | |
|---|---|---|---|
| 2017/0299721 A1 | 10/2017 | Eichenholz et al. | |
| 2017/0363724 A1 | 12/2017 | Reid | |
| 2018/0039852 A1 | 2/2018 | Nakamura et al. | |
| 2018/0113216 A1 | 4/2018 | Kremer et al. | |
| 2018/0120931 A1 | 5/2018 | Shpunt et al. | |
| 2018/0180733 A1 | 6/2018 | Smits | |
| 2018/0189574 A1 | 7/2018 | Brueckner et al. | |
| 2019/0011567 A1 | 1/2019 | Pacala et al. | |
| 2019/0080612 A1 | 3/2019 | Weissman et al. | |
| 2019/0285877 A1* | 9/2019 | Ogino | G02B 26/101 |
| 2020/0013185 A1 | 1/2020 | Yoshimura | |
| 2020/0132984 A1 | 4/2020 | Tsao et al. | |
| 2020/0133106 A1 | 4/2020 | Smits | |
| 2020/0142064 A1* | 5/2020 | Davis | G02B 26/12 |
| 2020/0192082 A1* | 6/2020 | Zhou | G02B 26/0833 |
| 2020/0310114 A1 | 10/2020 | Tanabe | |
| 2021/0011132 A1* | 1/2021 | Ellis | G01S 17/10 |
| 2021/0157012 A1 | 5/2021 | Wajnberg et al. | |

FOREIGN PATENT DOCUMENTS

| | | |
|---|---|---|
| CN | 201159795 Y | 12/2008 |
| CN | 101750012 A | 6/2010 |
| CN | 102084290 A | 6/2011 |
| CN | 102576156 A | 7/2012 |
| CN | 103608642 A | 2/2014 |
| CN | 103797328 A | 5/2014 |
| CN | 105066953 A | 11/2015 |
| DE | 102015205826 A1 | 10/2015 |
| EP | 0583060 A2 | 2/1994 |
| EP | 0722109 A1 | 7/1996 |
| EP | 1213597 A2 | 6/2002 |
| EP | 2148220 A1 | 1/2010 |
| EP | 2711667 A1 | 3/2014 |
| GB | 2510001 A | 7/2017 |
| JP | 11119184 A | 4/1999 |
| JP | 2000-304508 A | 11/2000 |
| JP | 201045381 A | 2/2001 |
| JP | 2003029201 A | 1/2003 |
| JP | 2004132914 A | 4/2004 |
| JP | 2005519338 A | 6/2005 |
| JP | 2010-197227 A | 9/2010 |
| JP | 2011197674 A | 10/2011 |
| JP | 2013097138 A | 5/2013 |
| JP | 2015-025901 A | 2/2015 |
| KR | 10-2011-0115752 A | 10/2011 |
| KR | 101665938 B1 | 10/2016 |
| WO | 1992018971 A1 | 10/1992 |
| WO | 200034818 A1 | 6/2000 |
| WO | 2002004247 A1 | 1/2002 |
| WO | 2002037166 A1 | 5/2002 |
| WO | 2005010739 A1 | 2/2005 |
| WO | 2006063577 A1 | 6/2006 |
| WO | 2008152647 A2 | 12/2008 |
| WO | 2009049272 A2 | 4/2009 |
| WO | 2011109402 A2 | 9/2011 |
| WO | 2012054231 A2 | 4/2012 |
| WO | 2013079099 A1 | 6/2013 |
| WO | 2014141115 A2 | 9/2014 |
| WO | 2016033036 A2 | 3/2016 |
| WO | 2016130997 A1 | 8/2016 |
| WO | 2016168378 A1 | 10/2016 |
| WO | 2017040066 A1 | 3/2017 |
| WO | 2017106875 A1 | 6/2017 |

OTHER PUBLICATIONS

Office Communication for U.S. Appl. No. 15/953,278 dated Jul. 18, 2022, pp. 1-5.
Office Communication for U.S. Appl. No. 17/214,505 dated Aug. 26, 2022, pp. 1-13.
Office Communication for U.S. Appl. No. 16/708,198 dated Aug. 26, 2022, pp. 1-5.
Office Communication for U.S. Appl. No. 17/214,505 dated Sep. 12, 2022, pp. 1-2.
Examination Report for European Patent Application No. 20201393.4 dated Sep. 15, 2022, pp. 1-6.
Office Communication for U.S. Appl. No. 15/953,278 dated Nov. 10, 2022, pp. 1-7.
Office Communication for U.S. Appl. No. 17/187,069 dated Dec. 5, 2022, pp. 1-11.
Office Communication for Chinese Patent Application No. 201780084810.1 dated Nov. 22, 2022, pp. 1-21.
Mak, D.K., "Locating Flaws in Three-Dimensional Space Using a Transmitter-Receiver System," NDT, Nov. 1990, vol. 12, No. 11, pp. 1-9.
Gu, Liming, "Research on Key Technologies of Photon Beam Position Measurement at HLS," A dissertation for Doctor's degree, University of Science and Technology of China, May 2011, pp. 1-248.
Chen, Junqing et al., "Digital Camera Imaging System Simulation," IEEE Transactions on Electron Devices, Nov. 2009, vol. 56, Iss. 11, pp. 2496-2505.
Office Communication for Chinese Patent Application No. 201780076900.6 dated Dec. 5, 2022, pp. 1-15.
Office Communication for Japanese Patent Application No. JP 2019-535248 dated Jan. 10, 2023, pp. 1-4.
Office Communication for U.S. Appl. No. 16/938,968 dated Jan. 26, 2023, pp. 1-11.
Office Communication for U.S. Appl. No. 16/708,198 dated Mar. 6, 2023, pp. 1-5.
Office Communication for U.S. Appl. No. 16/790,592 dated Mar. 8, 2023, pp. 1-5.
Office Communication for U.S. Appl. No. 15/953,278 dated Apr. 25, 2023, pp. 1-6.
Office Communication for U.S. Appl. No. 17/188,483 dated May 22, 2023, pp. 1-10.
Office Communication for U.S. Appl. No. 12/249,899 dated Jun. 6, 2012, pp. 1-12.
Office Communication for U.S. Appl. No. 12/249,899 dated Mar. 13, 2012, pp. 1-12.
Office Communication for U.S. Appl. No. 12/249,899 dated Sep. 14, 2011, pp. 1-12.
Extended European Search Report for European Patent Application No. 08837063.0 dated Nov. 19, 2010, pp. 1-8.
International Search Report and Written Opinion for International Patent Application No. PCT/US2008/079663 dated Apr. 30, 2009, pp. 1-5.
International Search Report and Written Opinion for International Patent Application No. PCT/US2011/026691 dated Oct. 24, 2011, pp. 1-7.
International Search Report for International Patent Application No. PCT/US2011/054751 dated Jan. 30, 2012, p. 1.
International Preliminary Report on Patentability for International Patent Application No. PCT/US2008/079663 dated Jan. 25, 2010, pp. 1-11.
Examination Report for European Patent Application No. 08837063.0 dated Oct. 22, 2012, pp. 1-6.
Examination Report for European Patent Application No. 08837063.0 dated Dec. 27, 2011, pp. 1-5.
International Preliminary Report on Patentability issued for International Patent Application No. PCT/US2011/026691 dated Sep. 4, 2012, pp. 1-7.
International Preliminary Report on Patentability issued for International Patent Application No. PCT/US2011/054751 dated Apr. 9, 2013, pp. 1-7.
Office Communication for U.S. Appl. No. 13/037,949 dated Nov. 2, 2012, pp. 1-13.
Office Communication U.S. Appl. No. 13/037,949 dated Aug. 26, 2013, pp. 1-9.
Office Communication for U.S. Appl. No. 13/605,948 dated Dec. 31, 2012, pp. 1-11.
Office Communication for U.S. Appl. No. 14/046,374 dated Feb. 20, 2014, pp. 1-10.
Extended European Search Report for European Patent Application No. 11834848.1 dated Feb. 21, 2014, pp. 1-7.

(56) References Cited

OTHER PUBLICATIONS

Savage, Phil, "GDC 2013: Valv's Michael Abrash on the challenges of VR—'a new world is emerging'," PCGamer, Apr. 2, 2013, pp. 1-6.
Office Communication for U.S. Appl. No. 13/858,762 dated Sep. 13, 2013, pp. 1-18.
Office Communication for U.S. Appl. No. 13/858,762 dated Jan. 31, 2014, pp. 1-15.
Office Communication for U.S. Appl. No. 14/048,954 dated Feb. 26, 2014, pp. 1-15.
Office Communication for U.S. Appl. No. 14/048,954 dated Oct. 22, 2014, pp. 1-8.
Office Communication for U.S. Appl. No. 13/877,652 dated Mar. 12, 2015, pp. 1-20.
Office Communication for U.S. Appl. No. 14/636,062 dated Jun. 2, 2015, pp. 1-7.
International Search Report and Written Opinion for International Patent Application No. PCT/US2015/023184 dated Jun. 29, 2015, pp. 1-13.
Office Communication for U.S. Appl. No. 13/877,652 dated Aug. 18, 2015, pp. 1-21.
Office Communication U.S. Appl. No. 14/636,062 dated Sep. 25, 2015, pp. 1-8.
Office Communication for U.S. Appl. No. 14/671,904 dated Sep. 22, 2015, pp. 1-15.
Office Communication for U.S. Appl. No. 14/823,668 dated Oct. 30, 2015, pp. 1-12.
International Search Report and Written Opinion for International Patent Application No. PCT/US2015/044691 dated Nov. 18, 2015, pp. 1-12.
Office Communication for U.S. Appl. No. 14/636,062 dated Dec. 14, 2015, pp. 1-3.
Office Communication for U.S. Appl. No. 14/636,062 dated Feb. 1, 2016, pp. 1-9.
Office Communication for U.S. Appl. No. 13/877,652 dated Feb. 10, 2016, pp. 1-22.
Office Communication for U.S. Appl. No. 14/671,904 dated Feb. 22, 2016, pp. 1-13.
Office Communication for U.S. Appl. No. 14/823,668 dated Feb. 24, 2016, pp. 1-15.
O'Toole, Matthew et al., "Homogeneous Codes for Energy-Efficient Illumination and Imaging," ACM Transactions on Graphics, Jul. 2015, vol. 34(4), pp. 1-13.
Office Communication for U.S. Appl. No. 14/823,668 dated May 18, 2016, pp. 1-10.
Office Communication for U.S. Appl. No. 14/218,643 dated Jun. 23, 2016, pp. 1-11.
Office Communication for U.S. Appl. No. 13/877,652 dated Aug. 12, 2016, pp. 1-22.
Office Communication for U.S. Appl. No. 15/194,502 dated Aug. 19, 2016, pp. 1-12.
Office Communication for U.S. Appl. No. 14/636,062 dated Aug. 24, 2016, pp. 1-9.
International Search Report and Written Opinion for International Patent Application No. PCT/US2016/027386 dated Aug. 26, 2016, pp. 1-10.
Office Communication for U.S. Appl. No. 14/671,904 dated Sep. 28, 2016, pp. 1-14.
Office Communication for U.S. Appl. No. 14/218,643 dated Nov. 1, 2016, pp. 1-10.
Kanzawa, Yusuke et al., "Human Skin Detection by Visible and Near-Infrared Imaging," IAPR Conference on Machine Vision Applications, Jun. 13-15, 2011, Nara Japan, pp. 1-5.
Office Communication for U.S. Appl. No. 15/384,227 dated Feb. 7, 2017, pp. 1-8.
Blais, F. et al., "Range Error Analysis of an Integrated Time-of-Flight, Triangulation, and Photogrammetry 3D Laser Scanning System," SPIE Proceedings of Aero Sense, Orlando, Florida, Apr. 24-28, 2000, vol. 4035, pp. 1-14.
Office Communication for U.S. Appl. No. 15/194,502 dated Mar. 9, 2017, pp. 1-7.
International Search Report and Written Opinion for International Patent Application No. PCT/US2016/067626 dated Mar. 16, 2017, pp. 1-12.
Office Communication for U.S. Appl. No. 14/671,904 dated May 5, 2017, pp. 1-11.
Office Communication for U.S. Appl. No. 16/820,523 dated Apr. 22, 2020, pp. 1-10.
Extended European Search Report for European Patent Application No. 17742125.2 dated Jul. 29, 2019, pp. 1-13.
Li, Hao et al., "Facial Performance Sensing Head-Mounted Display." ACM Transactions on Graphics (TOG), vol. 34, No. 4, 2015, pp. 1-9.
Seymour, Mike, "Facing Second Son—fxguide," Feb. 2, 2015, https://www.fxguide.com/fxfeatured/facing-second-son/, retrieved on Jul. 19, 2019, pp. 1-18.
Rolland, Jannick P. et al., "Development of Head-Mounted Projection Displays for Distributed, Collaborative, Augmented Reality Applications." Presence: Teleoperators & Virtual Environments, vol. 14, No. 5, 2005, pp. 528-549.
International Search Report and Written Opinion for International Patent Application No. PCT/US2019/015739 dated May 17, 2019, pp. 1-7.
Extended European Search Report for European Patent Application No. 17878671.1 dated May 7, 2020, pp. 1-11.
Examination Report for European Patent Application No. 16876940.4 dated May 28, 2020, pp. 1-5.
Office Communication for U.S. Appl. No. 16/435,392 dated Aug. 10, 2020, pp. 1-7.
Office Communication for U.S. Appl. No. 16/679,110 dated Aug. 18, 2020, pp. 1-9.
Office Communication for U.S. Appl. No. 16/443,702 dated Sep. 18, 2020, pp. 1-14.
Office Communication for U.S. Appl. No. 16/435,392 dated Oct. 23, 2020, pp. 1-4.
Office Communication for Japanese Patent Application No. JP 2018551896 dated Oct. 26, 2020, pp. 1-11.
Office Communication for U.S. Appl. No. 16/820,523 dated Nov. 2, 2020, pp. 1-6.
Office Communication for U.S. Appl. No. 15/953,278 dated Nov. 4, 2020, pp. 1-16.
Office Communication for U.S. Appl. No. 16/659,513 dated Nov. 25, 2020, pp. 1-6.
Office Communication for U.S. Appl. No. 16/435,392 dated Dec. 1, 2020, pp. 1-13.
Office Communication for U.S. Appl. No. 16/679,110 dated Dec. 7, 2020, pp. 1-6.
Office Communication for U.S. Appl. No. 16/443,702 dated Dec. 18, 2020, pp. 1-3.
Partial Supplementary European Search Report for European Patent Application No. 18797782.2 dated Jan. 19, 2021, pp. 1-19.
Office Communication for U.S. Appl. No. 16/443,702 dated Feb. 8, 2021, pp. 1-12.
Office Communication for U.S. Appl. No. 15/953,278 dated Mar. 17, 2021, pp. 1-10.
Office Communication for U.S. Appl. No. 16/679,110 dated Mar. 17, 2021, pp. 1-8.
Extended European Search Report for European Patent Application No. 20201393.4 dated Apr. 22, 2021, pp. 1-9.
Duchowski, Andrew T. et al., "Gaze-Contingent Displays: A Review," Cyberpsychology & Behavior, 2004, vol. 7, No. 6, pp. 621-634.
International Search Report and Written Opinion for International Patent Application No. PCT/US2021/020359 dated May 11, 2021, pp. 1-7.
Office Communication for U.S. Appl. No. 16/443,702 dated Jun. 1, 2021, pp. 1-5.
Examination Report for European Patent Application No. 17878671.1 dated May 14, 2021, pp. 1-5.
Extended European Search Report for European Patent Application No. 18797782.2 dated May 27, 2021, pp. 1-21.
Examination Report for European Patent Application No. 11834848.1 dated Jun. 7, 2019, pp. 1-6.

(56) References Cited

OTHER PUBLICATIONS

Examination Report for European Patent Application No. 17742125.2 dated Nov. 19, 2020, pp. 1-7.
Office Communication for Chinese Patent Application No. 201880030862.5 dated Jun. 9, 2021, pp. 1-23.
Examination Report for European Patent Application No. 16876940.4 dated Jul. 30, 2021, pp. 1-4.
Extended European Search Report for European Patent Application No. 17885850.2 dated May 25, 2020, pp. 1-8.
Examination Report for European Patent Application No. 17885850.2 dated Aug. 30, 2021, pp. 1-5.
Office Communication for U.S. Appl. No. 15/953,278 dated Oct. 5, 2021, pp. 1-20.
Office Communication for Japanese Patent Application No. JP 2019-535248 dated Nov. 17, 2021, pp. 1-7.
Kasai, Takeshi et al., "A Real Time Measurement System of 3-D Motion Using Multiple Cameras," Society of Biomechanisms Japan, 1986, vol. 8, pp. 1-32.
Office Communication for Chinese Patent Application No. 201680082143.9 dated Nov. 30, 2021, pp. 1-33.
Office Communication for U.S. Appl. No. 15/411,959 dated May 11, 2017, pp. 1-9.
International Search Report and Written Opinion for International Patent Application No. PCT/US2017/014616 dated May 1, 2017, pp. 1-11.
Office Communication for U.S. Appl. No. 13/877,652 dated May 31, 2017, pp. 1-23.
Office Communication for U.S. Appl. No. 15/384,227 dated Jul. 19, 2017, pp. 1-5.
Office Communication for U.S. Appl. No. 14/671,904 dated Aug. 18, 2017, pp. 1-7.
Office Communication for U.S. Appl. No. 15/194,502 dated Aug. 15, 2017, pp. 1-7.
Office Communication for U.S. Appl. No. 15/411,959 dated Aug. 29, 2017, pp. 1-5.
Office Communication for U.S. Appl. No. 13/877,652 dated Dec. 6, 2017, pp. 1-8.
Office Communication for U.S. Appl. No. 15/799,149 dated Jan. 10, 2018, pp. 1-7.
Office Communication for U.S. Appl. No. 15/444,182 dated Feb. 14, 2018, pp. 1-8.
Office Communication for U.S. Appl. No. 15/804,392 dated Feb. 9, 2018, pp. 1-10.
Office Communication for U.S. Appl. No. 15/194,502 dated Feb. 12, 2018, pp. 1-9.
Office Communication for U.S. Appl. No. 15/804,909 dated Feb. 12, 2018, pp. 1-14.
Office Communication for U.S. Appl. No. 15/098,285 dated Apr. 19, 2018, pp. 1-20.
International Search Report and Written Opinion for International Patent Application No. PCT/US2017/068377 dated Apr. 17, 2018, pp. 1-12.
Office Communication for U.S. Appl. No. 15/694,532 dated Jul. 10, 2018, pp. 1-6.
Office Communication for U.S. Appl. No. 15/804,392 dated Jun. 6, 2018, pp. 1-7.
Office Communication for U.S. Appl. No. 15/194,502 dated Jun. 11, 2018, pp. 1-9.
Office Communication for U.S. Appl. No. 15/804,909 dated Jul. 5, 2018, pp. 1-5.
Office Communication for U.S. Appl. No. 15/799,149 dated Jun. 20, 2018, pp. 1-3.
Office Communication for U.S. Appl. No. 15/853,783 dated Aug. 15, 2018, pp. 1-10.
International Search Report and Written Opinion for International Patent Application No. PCT/US2017/059282 dated Aug. 10, 2018, pp. 1-10.
Office Communication for U.S. Appl. No. 15/444,182 dated Sep. 13, 2018, pp. 1-8.
Office Communication for U.S. Appl. No. 16/049,380 dated Sep. 27, 2018, pp. 1-15.
Office Communication for U.S. Appl. No. 16/140,485 dated Nov. 23, 2018, pp. 1-23.
International Search Report and Written Opinion for International Patent Application No. PCT/US2018/032078 dated Nov. 16, 2018, pp. 1-16.
Office Communication for U.S. Appl. No. 15/194,502 dated Jan. 3, 2019, pp. 1-11.
Office Communication for U.S. Appl. No. 15/694,532 dated Jan. 17, 2019, pp. 1-5.
Office Communication for U.S. Appl. No. 15/853,783 dated Jan. 24, 2019, pp. 1-6.
Office Communication for U.S. Appl. No. 15/444,182 dated Mar. 20, 2019, pp. 1-10.
Office Communication U.S. Appl. No. 15/194,502 dated Mar. 6, 2019, pp. 1-8.
Office Communication for U.S. Appl. No. 16/223,043 dated Mar. 14, 2019, pp. 1-17.
Office Communication for U.S. Appl. No. 15/976,269 dated Mar. 25, 2019, pp. 1-13.
Office Communication for U.S. Appl. No. 16/165,631 dated Apr. 1, 2019, pp. 1-9.
Office Communication for U.S. Appl. No. 16/114,139 dated Apr. 19, 2019, pp. 1-17.
Office Communication for U.S. Appl. No. 16/398,139 dated Jun. 6, 2019, pp. 1-5.
Office Communication for U.S. Appl. No. 16/140,485 dated Jun. 3, 2019, pp. 1-14.
Office Communication for U.S. Appl. No. 15/976,269 dated Jul. 8, 2019, pp. 1-5.
Office Communication for U.S. Appl. No. 16/384,761 dated Jun. 21, 2019, pp. 1-11.
Office Communication for U.S. Appl. No. 16/261,528 dated May 17, 2019, pp. 1-9.
Office Communication for U.S. Appl. No. 16/165,631 dated Jul. 19, 2019, pp. 1-10.
International Search Report and Written Opinion for International Patent Application No. PCT/US2018/056757 dated Mar. 11, 2019, pp. 1-12.
Extended European Search Report for European Patent Application No. 16876940.4 dated May 8, 2019, pp. 1-8.
Office Communication for U.S. Appl. No. 16/140,485 dated Aug. 9, 2019, pp. 1-3.
Office Communication for U.S. Appl. No. 16/114,139 dated Aug. 2, 2019, pp. 1-7.
Office Communication for U.S. Appl. No. 16/140,845 dated Sep. 20, 2019, pp. 1-5.
Office Communication for U.S. Appl. No. 15/976,269 dated Sep. 6, 2019, pp. 1-7.
Office Communication for U.S. Appl. No. 16/443,702 dated Oct. 3, 2019, pp. 1-13.
Office Communication for U.S. Appl. No. 16/398,139 dated Sep. 27, 2019, pp. 1-7.
Office Communication for U.S. Appl. No. 16/530,818 dated Oct. 16, 2019, pp. 1-8.
Office Communication for U.S. Appl. No. 16/165,631 dated Oct. 8, 2019, pp. 1-4.
Office Communication for U.S. Appl. No. 16/114,139 dated Sep. 9, 2019, pp. 1-2.
Office Communication for U.S. Appl. No. 16/384,761 dated Nov. 29, 2019, pp. 1-5.
Office Communication for U.S. Appl. No. 15/976,269 dated Oct. 8, 2019, pp. 1-2.
Office Communication for U.S. Appl. No. 16/165,631 dated Dec. 27, 2019, pp. 1-6.
Office Communication for U.S. Appl. No. 16/679,110 dated Feb. 13, 2020, pp. 1-9.
Office Communication for U.S. Appl. No. 16/435,392 dated Feb. 21, 2020, pp. 1-9.
Office Communication for U.S. Appl. No. 16/659,513 dated Mar. 20, 2020, pp. 1-12.

(56) References Cited

OTHER PUBLICATIONS

Office Communication for Chinese Patent Application No. 201780018948.1 dated Mar. 27, 2020, pp. 1-14.
Office Communication for U.S. Appl. No. 16/530,818 dated Apr. 6, 2020, pp. 1-5.
Office Communication for U.S. Appl. No. 15/953,278 dated Apr. 9, 2020, pp. 1-5.
Office Communication for U.S. Appl. No. 17/189,204 dated Jan. 11, 2022, pp. 1-24.
Office Communication for Japanese Patent Application No. JP 2019-561820 dated Mar. 7, 2022, pp. 1-11.
Office Communication for U.S. Appl. No. 17/214,505 dated Mar. 16, 2022, pp. 1-12.
Office Communication for U.S. Appl. No. 15/953,278 dated May 2, 2022, pp. 1-10.
Office Communication for U.S. Appl. No. 17/189,204 dated May 2, 2022, pp. 1-14.
Office Communication for U.S. Appl. No. 16/790,592 dated May 19, 2022, pp. 1-10.
Office Communication for U.S. Appl. No. 17/187,069 dated Jun. 28, 2023, pp. 1-11.
Office Communication for U.S. Appl. No. 15/953,278 dated Jul. 6, 2023, pp. 1-5.

* cited by examiner

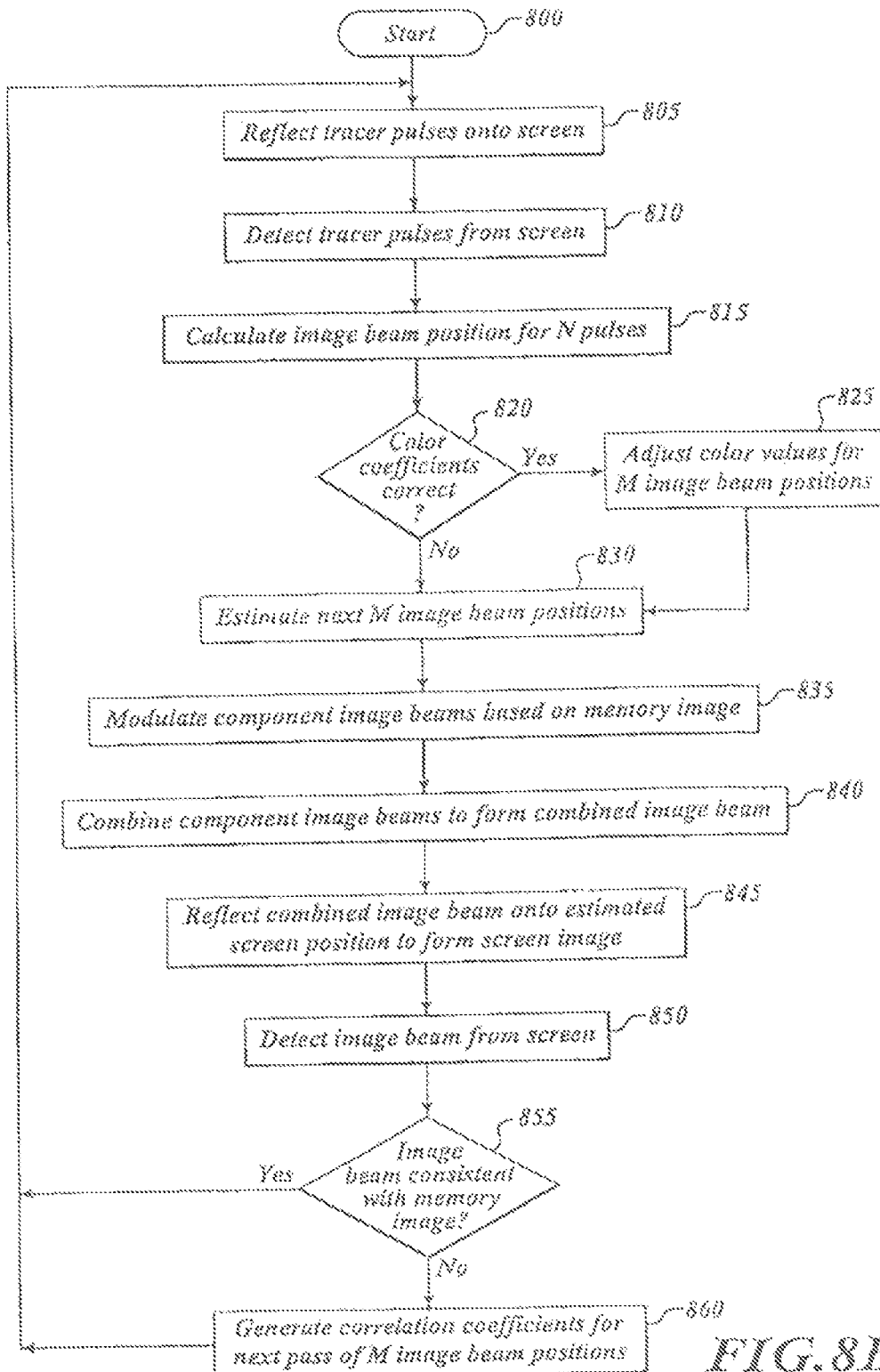

2 Sequential events recorded (detector reported)

\+ True (signal) events
⊕ False/noise random events (not fitting the x, y, t trajectory of the "falling star"

HIGH RESOLUTION SCANNING OF REMOTE OBJECTS WITH FAST SWEEPING LASER BEAMS AND SIGNAL RECOVERY BY TWITCHY PIXEL ARRAY

CROSS-REFERENCE TO RELATED APPLICATIONS

This Utility Patent Application is a Continuation of U.S. patent application Ser. No. 17/189,204 filed on Mar. 1, 2021, now U.S. Pat. No. 11,372,320 issued on Jun. 28, 2022, which is based on previously filed U.S. Provisional Patent Application U.S. Ser. No. 63/100,040 filed on Feb. 27, 2020, the benefit of the filing date of which is hereby claimed under 35 U.S.C. § 119(e) and § 120 and the contents of which are each further incorporated in entirety by reference.

TECHNICAL FIELD

The present disclosure is directed to a scanning light imaging device in general, and more particularly, to a device that employs observed reflection of light beams from a remote surface or object to determine physical aspects of that surface and predict the subsequent position of the remote surface or object.

BACKGROUND

With the ubiquity of images that are available for display by an electronic device, the capabilities of a particular electronic device's display have become a significant factor to users. These images can include, movies, videos, podcasts, television, pictures, cartoons, illustrations, graphics, tables, charts, presentations, and the like. Also, the quality, resolution, and type of display for images that can be displayed by an electronic device is often the primary factor in a user's decision to purchase that particular electronic device. For example, users might prefer relatively low power projection displays for mobile devices, such as mobile telephones, notebook computers, hand held video game consoles, hand held movie players, personal digital assistants (PDA), and the like. These low power projection displays can include, and backlit or non-backlit Liquid Crystal Displays (LCD). Further, other relatively low power emissive displays such as Organic Light Emitting Diodes (OLED), are growing in popularity for mobile devices. Also, the size of a display for a mobile device is often limited to a relatively small area, i.e., displays that can easily fit in a hand or clothing pocket. The relatively small size of displays for many mobile devices can also limit their usability for some applications.

Stationary electronic devices, such as personal computers, televisions, monitors, and video game consoles, often employ high power projection display technologies, such as Gas Plasma, Cathode Ray Tubes (CRT), LCD, DLPs (Digital Light Processor), and the like. Also, displays for these relatively stationary electronic devices are often considerably larger than those displays employed with mobile devices, e.g., projection displays can be five feet across or more. However, the relatively large physical size of the cabinetry associated with most displays employed with stationary devices can be inconvenient and unattractive for many users, especially when the displays are not in use.

Front image projection devices can also be used to display images on a remote surface, e.g., a hanging screen of reflective fabric, or some other relatively vertical and reflective surface such as a wall. Also, a variety of different technologies are employed by front image projection devices, such as Digital Light Processors (DLP), Light Emitting Diodes (LED), Cathode Ray Tubes (CRT), Liquid Crystal Displays (LCD), Liquid Crystal on Silicon (LCoS), MicroElectroMechanicalSystems (MEMS) scanners, and the like. However, artifacts in reflections of beams of light projected onto remote surfaces or remote objects and determining a multi-dimensional position of the remote surfaces and/or remote objects have been difficult to compensate for, and often adversely affect the quality, resolution, and usability of reflections of these remotely projected beams of light.

BRIEF DESCRIPTION OF THE DRAWINGS

Non-limiting and non-exhaustive embodiments of the present invention are described in reference to the following drawings. In the drawings, like reference numerals refer to like parts through all the various figures unless otherwise explicit.

For a better understanding of the present disclosure, a reference will be made to the following detailed description, which is to be read in association with the accompanying drawings, wherein:

FIG. 8B shows a flow diagram of one embodiment of a detailed process of generating an image with a LID;

DESCRIPTION OF THE EMBODIMENTS

Figure 1:
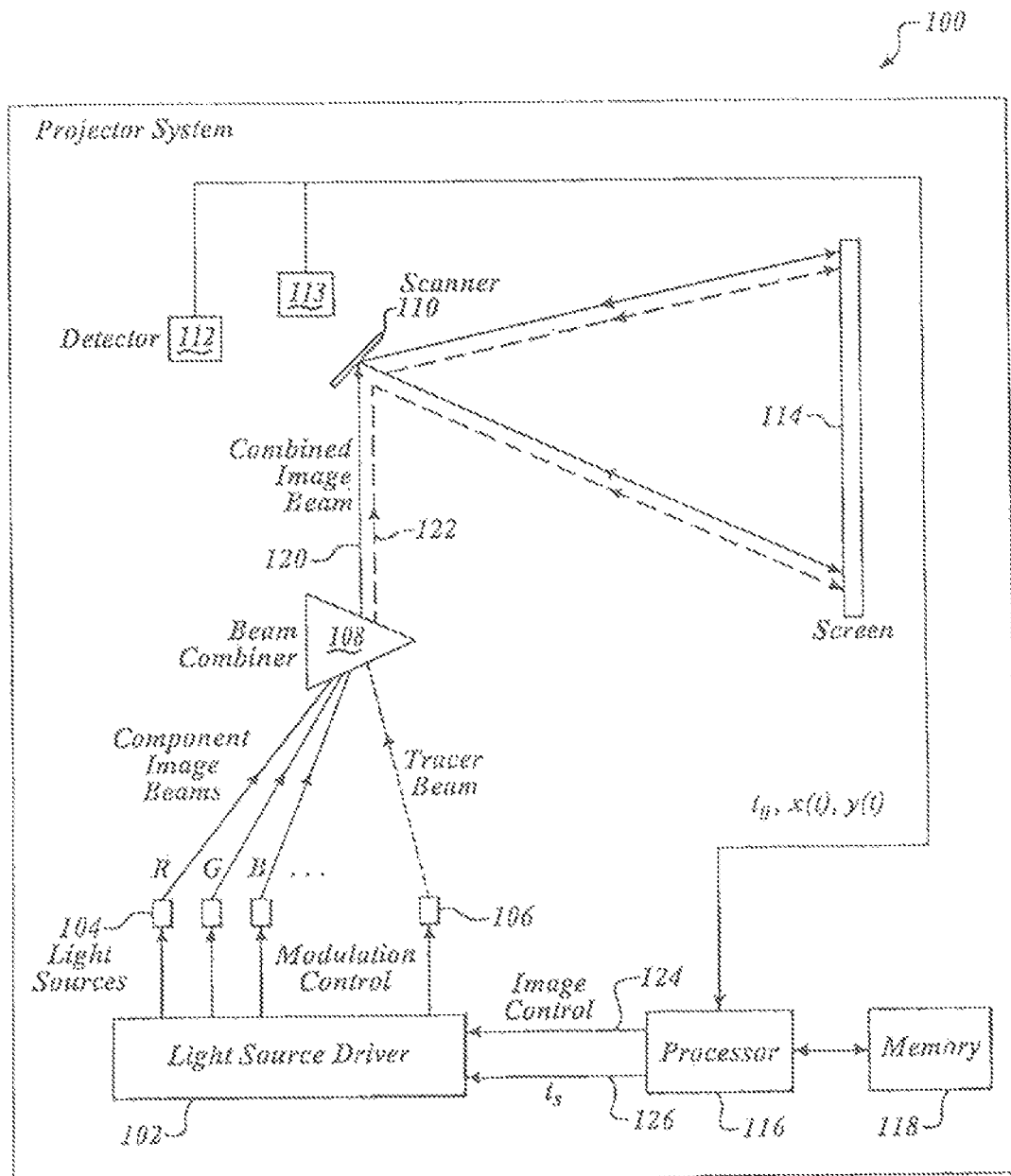
FIG. 1 is a block diagram of one embodiment of a scanning light imaging device (LID)

The present disclosure will now be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "pseudorandom" as used herein, indicates a statistically random process, which appears to be random as distinguished from a truly random process, which lacks predictability. Pseudorandom processes may be generated using some deterministic elements combined with some non-repeating patterns. For example, a timestamp may be combined with the changing contents of a predetermined memory location to generate a pseudorandom number. Furthermore, this term as used herein, indicates lack of a predefined scanning organization, for example, an array of pixels (picture elements), parallel scanlines, hatched scanlines, cross hatched scanlines, open lissajous pattern scanlines, or any other arrangement or pattern having a temporal or spatial relationship between scanlines.

The term "twitchy pixel" or "binary pixel" as used herein, indicates a pixel that presents a binary state, e.g., either one or zero, in the presence or absence of photons. Further, the twitchy pixel can detect and indicate the exact moment of arrival of an individual photon impinging on the twitchy pixel by an immediate change in its binary state, e.g., from zero to one. In one or more embodiments, a Silicon Photon Multiplier (SiPM) array may be employed to provide an array of twitchy (binary) pixels. An individual SiPM pixel, is also known as a "Geiger mode APD" pixel that consists of a photodiode, across which a strong reverse bias voltage is applied. This "over bias voltage" is strong enough to ensure that an arriving photon not only causes a breakdown of the photodiode's natural directional resistance to current, but is also so strong that when one of the first arriving photons frees up a valence electron in the semiconductor lattice, this first freed electron, propelled by the strong local potential electric field force, rushes towards the positive photo diode junction, accelerates and through collisions within the lattice, causes other electrons to be freed setting up a chain reaction, resulting in a huge "avalanche" of conduction band electrons. In this way, a single blue or otherwise sufficiently energetic photon impinging on the SiPM pixel may cause as many as 200,000 electrons to "rush the gate". "Energetic" photon energy may be construed as significantly greater than the semiconductor band gap between the valence band and the conductive band. For example, a highly energetic Blue 405 nm photon can 2.7 times or more of the energy required to jump across this bandgap. Thus, within as little as 100 picoseconds of the arrival of the first photons, a strong spike of current can be detected and used as fast reporting signal.

By arranging arrays of Geiger mode pixels, accurate and immediate avalanches may be used to precisely track the progression of a spot of light across the array, such as the trail of bubbles left by the rare occurrence of elementary particles in a bubble chamber used in particle physics. In this way, SiPM pixel arrays can have one of the highest photon detection efficiency (PDE), lowest dark noise, fast high-gain detection signal output with the lowest jitter which provide excellent time precision. For example, some pseudo random scanning laser spot tracking systems can employ such SiPM pixel arrays to track reflected spots of light in real time with high precision.

The term "corresponding" as used herein, may indicate a one-to-one, one-to-many, or many-to-one mapping. For example, an image pixel corresponding to a display position may indicate that the image pixel corresponds to more than one display position, when adjacent display positions are resolvable at a higher resolution in comparison with the resolution of the image associated with the image pixel. In such a case, a single image pixel may be interpolated or resolved to cover more than one display position, and thus, the single image pixel corresponds to more that one display position and indicates a one-to-many mapping. In another case where the image pixels and the display positions have substantially equal resolutions, the correspondence there between can be a one-to-one mapping. Furthermore, if a plurality of adjacent pixels have substantially equal values, they may be projected as a line to form the image instead of a series of individual positions on a display.

Examples of such systems that provide for pseudorandom scanning of light beams include, but are not limited to, those disclosed in U.S. Pat. No. 10,331,021 issued Jun. 25, 2019; U.S. Pat. No. 9,581,883 issued Feb. 28, 2017; U.S. Pat. No. 8,696,141 issued Apr. 15, 2014; U.S. Pat. No. 8,430,512 issued Apr. 30, 2013; U.S. Pat. No. 8,282,222 issued Oct. 9, 2012; all of which are incorporated herein by reference in their entirety.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly described, the invention is directed to a scanning light imaging device for determining a position of a remote surface and/or remote object. displaying an image onto a remote surface. The scanning light imaging device employs a scanner to project image beams of visible and/or non-visible light, or image beams and tracer beams of light onto a remote surface/object, which reflects the projected beams of light. In one or more embodiments, image beams and/or tracer beams may be a spot formed by just one or more photons of light projected unto a remote surface and/or objects. Also, the image projection device may also employ a light detector to sense at least the reflections of light from the spot beams incident on the remote surface. In one or more embodiments, the scanning light imaging device employs the sensed tracer beam light to predict the trajectory of subsequent image beams that impinge on the remote surface. Also, the image beams and tracer beams that form the reflections of spot beams can be projected onto the remote surface/object in sweeping scans of one or more pseudo random patterns rather than a predefined pattern, such as an array or grid. In one or more embodiments, the trajectory of the spot beams can be observed so that a point of view of the reflections can be selected by, or automatically adjusted for, a user.

Additionally, in at least one or more embodiments, the light detector can also sense the reflections of visible/non-visible spot beams of light that form the reflections incident on the remote surface and/or objects. And the scanning light imaging device can employ the sensed reflections of this light to effect adjustments to subsequent spot beams scanned onto the remote surface and/or objects.

In one or more embodiments, the scanning light imaging device may be employed to pseudo randomly project beams of visible light onto the remote surface/objects and also pseudo randomly project other tracer beams of non-visible and/or visible light onto the same remote surface/objects. These pulses can be generated by modulating the output of light sources or shuttering the light detector of the reflected light pulses from the remote surfaces/objects.

In one or more embodiments, the light from the image beam and the tracer beam can be combined and projected onto the same location at the remote surface/object, or they may be projected onto two adjacent locations where the distance between the two locations is predetermined. The image beam light may have a wavelength in the visible spectrum, and it may also have a wavelength in the non-visible spectrum. If visible light is employed for tracer beams, the frequency of the light is typically so fast that the tracer beams are undetectable to the typical viewer. Also, if non-visible light is employed for the tracer beam pulses, the light wavelength may be in one or more non-visible spectrums, e.g., infrared, ultraviolet, or the like.

Furthermore, in at least one embodiment, the scanning light imaging device enables one or more safety interlocks between the device and the remote surface. For example, a determination is made as to whether or not the scanner is properly moving, and if not, the image beam and tracer beam are disabled until the scanner is properly moving again. Also, in at least one embodiment, if a excessively close object is detected between the device and the projection of the beams of light on the remote surface/object, the image beam and tracer beam may be disabled, or reduced in power until the moving object is no longer present between the device and the remote surface/object. Alternatively, the moving object may become the new remote surface/object that the scanning light imaging device pseudo randomly scans and senses the reflected beams light that are used to determine a new position for the new remote surface/object.

In at least one embodiment, the tracer beam non-visible light pulses are IR (Infra-Red) light that is projected by a scanner, such as an oscillating MEMS scanner, onto particular positions in a pseudorandom scanline trajectory that sweeps across the remote surface. A light detector, such as a camera, coupled with a processing unit, tracks the tracer beam light to obtain data for detecting N consecutive preceding positions of the pseudorandom scanline trajectory and estimating the subsequent consecutive M positions of the scanline trajectory with respect to a current position of the remote surface/object. In one or more embodiments, multiple component image beams of visible light, for example, RGB (Red-Green-Blue) colors, may be modulated, based on a corresponding M pixels of an image in a memory (memory image), and combined to create discrete combined image beam pulses. The combined image beam pulses are projected onto the remote surface/object at the subsequent estimated positions after the current combined image beam position. Furthermore, the reflections of the projected combined image beams incident on the remote surface/object, in addition to the tracer beam, may be optionally detected and compared with information previously stored in a memory. And based on that comparison, the subsequent estimated positions of the projected image beams can be adjusted on subsequent pseudorandom sweeps, progressively, to improve the projected image's sharpness, brightness, and color. The combined image beam may also include information about how a known reflected image of the remote surface/object is to be displayed to a user.

In one or more embodiments, analysis of reflections of pseudo random beam patterns traced out by fast sweeping laser beams, may be employed by robots and other computational entities to "make sense out of a world." The image projection device and light detector may be employ the reflections of the pseudo random beams to quickly and efficiently perceive and recognize ("classify") living moving things (humans, pets and other animate objects) that robotic systems need to account for to safely navigate and be useful beyond the confines of a safety cage in an automated assembly line.

In one or more embodiments, super resolution of illuminated physical dimensions and positions of remote surfaces and/or objects may be provided with a high speed sweeping and sharply focused laser beam "spot" and tracking the spot's reflections arriving at individual sequential binary pixels that asynchronously self-report in real-time, e.g., an array of binary pixels may also be referred to as a "twitchy pixel array" that is formed with an SPiM pixel array.

In one or more embodiments, a highly preferential signal discovery is provided by sorting true pixel events caused by the image beam's reflections on a twitchy pixel array, triggering a known characteristic sweep pattern, and differentiating these events from false pixel events e.g. caused by pixel dark noise" (e.g sensor noise caused by one or more of thermal random electrons and EM interference) and/or by stray, ambient or spurious photons impinging on the twitchy pixel.

In one or more embodiments, substantially high (super) levels of resolution may be provided by ultra-fast self-reporting binary (twitchy) pixels in an array, such as an SiPM pixel array, that may be used by a laser spot scanning device to observe when (accurate to the nanosecond) a first photon(s) of the scanning laser spot's reflection arrives at successive pixels in the array. For example, if the scan time across the pixel array is 100 microseconds (e.g. when scanning at 10,000 lines per second), and if the triggered pixel pixels along the trajectory are observed with 1 nanosecond precision ($\frac{1}{100}^{th}$ of the approximate time interval of 100 ns elapsed between successive triggered pixel events— the approx. time interval elapsed between avalanches caused by the scanning spot's reflections imaged on to the sensor) then an estimate may be determined for the true instantaneous position of the beam's spot on a remote surface, by interpolating the spot's position from the spatio-temporal trajectory observed as a series of events in the pixel array. In this way, the degree of super resolution can exceed by as much as 10 times the linear discrete resolution of the array.

In one or more embodiments, if 1000 columns of pixels span across a 50 degree angular field of view (FOV), then each column has 0.05 degree of view (view frustum $\frac{1}{1000} \times 50$ degrees). Also, by tracking the time of arrival at individual pixels with nanosecond precision of the scanning spot reflections focused onto the sensor's pixel grid, then an estimate may be determined based at least in part on the beam's instantaneous position as a function of time to well beyond 0.005 degree angular resolution. Hence 10,000 positions or "10K" resolution, as 10,000×0.005 degrees equals the FOV's 50 degrees width.

For hundreds of millions of users using billions of computing devices, the availability of a physically small, low-power, high-quality, high reliability, high resolution scanned imaging system with few or no visual artifacts may provide a significant advantage. These advantages may be particularly significant for devices where both the physical size, the image rendering speed and latency and resolution of the imaging systems is critical, such as augmented reality head mounted displays (AR-HMDs). With a small, low-power, built-in pico projectors, such small computing devices can display information, effectively, in very high-resolution, without the physical size and high power consumption rate normally associated with a conventional pixelated and frame by frame rendering display systems.

Power efficiency is also very important, particularly for small personal devices, because of the limited battery life with daily use. Efficient projection of light with limited use of filters, polarizers, and the like, reduces overall power consumption, while providing a high quality display. The mixing of light falls into at least two general categories: additive mixing and subtractive mixing. In additive mixing, component light signals are combined with each other. In subtractive mixing, some light frequency components are filtered out, transmissively or reflectively, or subtracted from the original whole. Some of the conventional display technologies, such as LCD and DLP, use subtractive mixing as a basic part of their operation. Subtractive mixing of light beams is generally wasteful of energy because light (photons) is first generated and then partially blocked (subtracted), wasting the already generated light. Subtractive mixing is used to increase image brightness and enhance contrast between the brightest and darkest pixels. In display systems eventually utilized for displaying the image, resulting in poor overall efficiency.

Another important aspect of a display technology is reliability. With few moving parts, low power consumption, and low heat generation, reliability of invention may be generally greater compared to other display technologies having similar quality.

The feedback aspects, for both tracer pulses and image beam, of the invention enables uses in applications that are not possible, or are more difficult to realize, with other technologies to display images on remote surfaces and also detect multi-dimensional positions of remote surfaces and/or objects that may be stationary or moving. For example, the invention allows automatic adjustment of a display in real-time based on a perspective/position of the viewer/user. The user may move around a remote display screen while the invention automatically adjusts the displayed image to provide the appropriate perspective as viewed from each new position of the user with respect to the direction of projection onto the screen. This feature may have uses in immersive applications, such as video games. A variation of this capability is that the projected image may be displayed on an un-even surface of a screen, such as a textured wall, fabric, or other background with texture or curvatures that would otherwise distort the projected image. These features are more fully described below with respect to FIGS. 3-7.

Even though various embodiments refer to the RGB color space, other color spaces may also be used. For example, YIQ, YUV, YCbCr, and the like, color spaces may also be used to provide an image for projection. Similarly, more than three basic colors may be used. For example, in addition to the Red Green Blue color sources, other emissive spectral component color sources may be used, such as an Orange color source, for example, in the wavelength range of 597 to 622 nano-meters (nm), a Yellow color source, for example, in the wavelength range of 577 to 597 nm, or a Violet color source, for example, in the wavelength range of 380 to 455 nm. In this way, four or more component color sources may be used to project the image on a remote surface.

Generally, use of additional component colors may remove some tradeoffs, for example, the tradeoffs between efficiency, efficacy (characterized as perceived lumens per watt), gamut (broadest color range), and fidelity, characterized by avoidance of perceptive artifacts, such as spatial, temporal, motion, or color artifacts. Such tradeoffs may have to be made in both spatially rasterized and field-sequential color display systems, like LCDs, having addressable display elements or pixels. The use of a greater number of coherent monochrome sources, such as laser beams, reduce speckle that may be caused by self-interference in the reflected beam of each component light beam. The greater number of component light beams may reduce speckle because the component light beams are not coherent with respect to each other and may cancel out.

Multiple component light sources of substantially identical wavelength may also be used for added peak power, light efficiency, scanning, and detection speeds. For example, multiple semiconductor light sources, such as LEDs and laser diodes, may be optically combined to generate a brighter and more efficient light beam. Speckle may be reduced due to reduced phase coherency in such "gang source" systems where multiple near-identical wavelength component light sources are used.

Illustrative Operating Environment

Electronic displays for computing devices, such as workstations, desktop and laptop Personal Computers (PC), mobile devices like mobile phones, PDA's, and the like, as well as displays for entertainment-oriented devices, such as televisions (TV), DVD players, and the like, may be replaced or supplemented by scanning light imaging device (LID). In one embodiment, the LID is an integral part of the computing or entertainment device. In another embodiment, the LID may be a supplemental device used in addition to, or in place of, a conventional display and/or detecting positions of remote surfaces/objects for a vehicle navigation system or an augmented reality system.

One embodiment of a computing device usable with the LID is described in more detail below in conjunction with FIG. 2. Briefly, however, the computing device may virtually be any stationary or mobile computing device capable of processing and displaying data and information. Such devices include mobile devices such as, cellular/mobile telephones, smart phones, display pagers, radio frequency (RF) devices, infrared (IR) devices, PDAs, handheld computers, laptop computers, wearable computers, tablet computers, mobile video game consoles, integrated devices combining one or more of the preceding devices, or the like. Stationary computing devices may also include virtually any computing device that typically connects using a wired or wired communications medium such as personal computers, video game consoles, multiprocessor systems, microprocessor-based or programmable consumer electronics, network PCs, or the like.

Computing devices typically range widely in terms of capabilities and features. For example, a mobile phone may have a numeric keypad and a few lines of an LCD or OLED display on which a small amount of text and graphics may be displayed. In another example, a computing device may have a touch sensitive screen, a stylus, and a relatively large display in which both text and graphics may be displayed.

A computing device may include a browser application that is configured to send/receive and display web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Communication media used with computing devices typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

The display of images and/or video data using the LID is different from the display of the same images/video on more conventional displays. Conventional displays generally are arranged with some form of pixel addressing in the display area. The pixel address may be specified by timing, as in raster scanners like CRTs using horizontal and vertical blanking signals (H-sync and V-sync, respectively), or by row-column address pairs like transistor/LED (Light Emitting Diode) arrays in LCDs. In conventional displays, the area of the display is generally quantized as a fixed grid with equal sized tiles or spatial quanta, also referred to as pixels. In such display systems, the illusion of motion is created by quantizing continuous time and space into discrete and equal time and space quanta, also referred to as frames. Generally, a fixed frame rate, expressed as Frames Per Second (FPS) is used to record and play back moving images. This quantization of time into frames, and image into pixels, introduce temporal and spatial artificial visual artifacts, respectively, during the display of moving images, such as jagged lines (spatial), aliasing (spatial and temporal), image blurring (temporal), judder (temporal), and the like, further described below.

These address-based pixel organizations are fundamentally different from the pseudo random scanning method used in an LID. The address-based displays generally require a defined frame format with specific and rigid timing requirements, as is well known to one skilled in the relevant arts. For example, in a raster scanner, scanned lines (scanlines) are displayed in consecutive order, as parallel horizontal lines, one after another from the top to the bottom of the screen. In contrast, the MEMS scanner for the LID can oscillate and project light in a pseudorandom pattern onto a remote surface, where the scanlines of an image beam and/or a tracer beam are primarily traced out in a direction based on the image or spot beam to be projected, without relying upon a particular spatial or temporal relationship with the previous or the next scanline.

Conventional scan patterns, in terms of both timing and spatial regularity, digital sampling, and quantization in general create a number of visual artifacts, such as jagged slant or diagonal lines, especially visible in low-resolution imaging systems, image blurring, motion blur (may occur because of a basic mismatch between continuous human vision and quantized digital imaging system), judder (defined as small unnatural jerky movements in motion pictures, either in space or in time. In space, judder can be the result of consecutive film frames not advanced precisely to the same position at the projector gate. In time, judder in video may be noticed because 24 frames per second for film source does not divide evenly into 60 fields or frames per second for NTSC video, and some film frames' content is shown on the screen for more time than other frames' content), moirés (pattern resulting from two grids that are superimposed over one another), screen door effects, aliasing, and the like. These artifacts results, in one way or another, from quantization and digital sampling.

However, since the LID is relatively analog in nature and in its operation as compared to conventional displays, does not depend on quantization, even though at some points through the process a LID implementation can process digital data. For example, reading an image from memory to display may involve some digital processing, however, once the image is ready for projection using LID, the process is largely analog, as more fully described herein.

Another difference between the LID and conventional displays is tracking and feedback.

Conventional displays are feed-forward in their basic operation, sending image data in one direction: from the source of the image, for example memory or DVD, to the destination, which is the display device. Generally, no feedback is needed for basic operation and no data is read back from the conventional display. In some implementations of conventional display devices, the displayed image may be read back or sensed and compared with the source image to increase the quality of the displayed image. However, such feedback is for quality enhancement as opposed to being part of the basic operation of the conventional display devices. The display method used in LID may use feedback from the tracer beam, for example, IR pulses, to determine the next screen position on the scanline trajectory by trajectory prediction and/or estimation. Once the next screen position is so predicted, the memory image for the corresponding screen position is obtained and used to modulate the component image beams for combining and projecting onto the next screen position.

Because the scanlines can be pseudorandom in the LID, generally, the timing information (usually included in video frames) needed for display of a video stream on a conventional display device, may not be needed for display of the same video stream on the LID. In one embodiment, the active video signal, the sequence of images to be displayed, that is sent to a conventional display screen, may be stripped, in real-time, from the formatting information associated with the conventional displays, such as H-sync and V-sync signals and/or other timing information, for display using LID. In another embodiment, the active video or other image to be displayed using LID may be generated for LID or pre-stripped at the source of the video or image. In yet another embodiment, both of the above embodiments may be implemented by dynamically determining whether an image has display format information or is pre-stripped. In still another embodiment, the timing information included in video frames may be used to extract information that may be used to improve quality and/or perceived resolution. For example, a weighted average of multiple frames may be used to insert precise interpolated inter-frame pixel values that reduce unwanted visual artifacts.

Many graphics programs, such as video games and programs for 3-D (three Dimensional) manipulation of objects, may generate images with effective resolutions that are significantly beyond the resolutions that can be displayed by conventional display devices. Such high resolution graphics generated by these graphics programs may specially benefit from a projection system, such as the IPD, that is substantially free from quantization effects and has very high effective resolution.

FIG. 1 is a block diagram of one embodiment of LID 100. This embodiment includes a light source driver 102 for modulating component image beams, generated by light sources 104, and for controlling tracer beam generator 106. The component image beams are combined using a beam combiner 108 that produces a combined image beam 120. The combined image beam is directed to a scanner 110, which pseudo randomly sweeps a scan of the combined image beam to screen 114, or another remote surface/object. Combined image beam 120 includes information about a known image to be displayed or may be a spot beam that projects photons sequentially in scanned patterns, or pseudo-randomly scanned spatio-temporal trajectories. The information about the known image is projected sequentially (serially) onto screen 114 using the consecutive projected scanlines causing the known image to appear on screen 114 or at another remote surface/object that may be moving and/or stationary. The formation of the known image on the screen may take a few microseconds or less.

Tracer beam 122 used for scanline trajectory prediction is also directed to scanner 110 and reflected to screen 114 or another remote surface/object. Detector 112 is used to detect the reflection of the tracer beam off screen 114 or another remote surface/object. Detector 112 sends timing to and screen position information [x, y] to processor 116 coupled with memory 118 holding an image to be displayed on screen 114 or reflected off another remote surface/object. Detector 112 can also be used to optionally detect the reflection of the image beam off screen 114 or another remote surface/object that may be stationary or moving. Additionally, in at least one embodiment, a separate detector 113 can be included to separately detect the reflection of the image beam off screen 114 or another remote surface/object. Furthermore, in one or more embodiments, information provided by detector 112 and separate detector 113 may be employed to triangulate one or more of a position of the other remote surface/object that is stationary or moving. Processor 116 is also coupled with light source driver 102 to control the modulation of component image beams, and generation of tracer beam 122 by tracer beam generator 106.

In one embodiment, component light sources 104 may include red, green and blue (RGB) color components. In another embodiment, component light sources 104 may include other color components such as orange, yellow and violet in addition to RGB. In one embodiment light sources 104 are LEDs (Light Emitting Diode), while in another embodiment, light sources 104 are lasers. In yet another embodiment, light sources 104 are laser diodes. Those skilled in the relevant arts will appreciate that many types of light sources may be used to generate component lights, such as red, green, and blue, and the like, without departing from the spirit of the disclosure.

Component light sources 104 produce component image light beams that are combined by a beam combiner 108 to produce a combined image beam. In one embodiment the beam combiner 108 is an optical device, such as a prism, dichroic mirrors, or the like. In another embodiment, the beam combiner 108 is an electronic device that may be used to convert light components into electrical signals, mix the electrical signals into a mixed signal, and convert the mixed signal back into a combined image beam. An electronic mixer may be used if intermediate processing of the light beam, such as digital or analog filtering or other control and processing, is desired.

In one embodiment, scanner 110 may be a MEMS device with a precision built mirror with at least a two-axis gimbal for independently controlled rotation about two orthogonal axis. In this embodiment, the mirror may sweep pseudo randomly scanlines that cover any screen position on the surface of screen 114 or another remote surface/object. In another embodiment, scanner 110 may be a mirror with other types of directional controls, such that a scanline may be projected on every screen position on screen 114 or another remote surface/object. For example, polar or cylindrical adjustments and corresponding controls may be used to point the mirror to direct the reflection of image beam to any screen position on screen 114 or another remote surface/object. Because of the rotation of the mirror, a scanline projected on screen 114 may have a slight curvature instead of being a straight line. Scanner 110 may work in a color sequential mode, where the image beam sequentially varies across multiple colors and the image is reconstructed by the viewer by virtue of time integration of the various color values observed.

In another embodiment, that may be useful for highly mobile images, such as movies, a multiple-color system may be implemented using multiple primary colors simultaneously. The primary colors may be separated out by using a prism, dichroic beam splitters or dichroic mirrors, or by using separate sub-pixels with color filters. In another embodiment, a full, broad-spectrum white source may be used for illumination, and the white beam may then be split into its color components which are separately observed by multiple lines in a linear array sensor.

A particular scanline projected by the scanner 110 onto the screen 114 is not aimed, in a feed-forward fashion, at any particular predetermined position (or curve, when referring to all points on the scanline) on the screen 114. Rather, the scanline is pseudo randomly projected at along some arbitrary trajectories, fast sequences of adjacent positions on the screen 114 and these trajectories and positions are observed and detected by a detector, more fully described below. This feedback arrangement is generally more precise and accurate than feed-forward, because the actual position of the projected scanline on the screen is determined, instead of a predicted feed-forward position, which may be off due to many causes, such as vibration of the scanner 110 and/or the screen 114 or another remote surface/object. Feedback inherently makes image correction on the screen possible, for example, to counter screen imperfections and/or vibrations, because feedback is after-the-fact observation of an event (e.g., scanline position on the screen), rather than before-the-fact prediction and/or specification of the event, as is the case in feed-forward systems. In one embodiment, screen 114 is a typical front projection screen with a high reflexive index. In another embodiment, screen 114 is a back projection screen with diffuse transmittance for passing light through. In this embodiment, the other components shown in FIG. 1 are arranged to project the image onto the back of the screen to be viewed from front of the screen by a viewer. In another embodiment, screen 114 may be a light colored wall or any other flat surface. In yet another embodiment, screen 114 may be any surface with or without texture, of any shape, curvature, surface roughness, 3D shape or other irregularities. The feedback feature of PSTP 100 may automatically compensate for surface imperfections, texture, and irregularities of screen 114.

In one embodiment, detector 112 is a monochrome camera. The monochrome camera detects single colors, such as red, green, or blue. Monochrome cameras may also detect IR light. A monochrome camera may be useful when the tracer beam 122 is a visible pulsed light beam. In this embodiment, the light beam pulses are of short enough duration that would be imperceptible to the human eye. In another embodiment, detector 112 may be an IR detector used to detect pulses projected by the tracer beam 122. In yet another embodiment, detector 112 may be a CCD (Charge Coupled Device) or SiPM (Silicon Photo Multiplier) array. The CCD or SiPM array may be a single row CCD or SiPM array or it may be a two dimensional CCD or SiPM array.

In yet another embodiment, multiple single row CCD or SiPM arrays may be used. In this embodiment, a two-dimensional projected image is optically collapsed into two orthogonally related linear image components. Each of the two linear image components may be detected by a separate single row CCD or SiPM array. This way, a target object on the projected image may be detected and tracked. In the past, a camera system constructed from specially adapted optics and sensors—could be optimized to detect and track one or more target objects, for example, dots or small bright features, in a broad field of view. With simple mirror optics a single linear array sensor is sufficient to detect both location and signal intensity of the dots in a 2D field with a minimum of computation. Positional observations can be made at very high speed with an accuracy not attainable with conventional camera systems. However, the LID eliminates the trade-off between spatial resolution and shutter speed as observed in existing array sensors.

In still another embodiments, if a singular target object, for example, a single screen position the light level of which exceeds a pixel threshold of a detector array (for example, CCD or SiPM array), a folding optics arrangements may be used to superimpose a dimension Y (for example, vertical) of an image onto a dimension X (for example, horizontal) of the image so that information contained in both dimensions may be measured and detected by a single linear CCD or SiPM array. US Provisional Patent application, Ser. No. 61/002,402, referenced above and to which priority is claimed and incorporated by reference, discloses this arrangement. The folding optics arrangement may be implemented using a mirror, a half-mirror (for beam splitting), or a reflecting prism, among other options. In one embodiment, pixels in the detector 112 array may have the same associated threshold. In another embodiment, pixels in the detector 112 may have a different associated threshold based on certain criteria, for example, the contrast expected in the image that will be displayed. In yet another embodiment, the pixel thresholds may be set dynamically based on certain criteria, for example, the average darkness or brightness of the image about to be displayed. The dynamic setting of the pixel thresholds may be performed during a calibration cycle of detector 112, where the pixel threshold value is set to just below the brightest value observed in the detector sensor array.

The folding optics embodiment of detector 112 enables out-of-order reporting of screen positions exceeding the pixel threshold. Additionally, this embodiment enables dimensional superposition, as more fully described below. In one embodiment, each pixel in detector 112 array may be set to a threshold. The threshold is set above the natural noise level, for example, the dark current of the electronics implementing the detector pixels. The threshold may also be set at a higher level than the natural noise level, but below the expected brightness of the target object to be detected. This way, the brightest screen position in the projected image exceeds the pixel threshold and triggers detection of the surface position. Each pixel in the detector 112 array has a predetermined address (pixel address) typically corresponding to a sequential count that can either be hard-wired or assigned during initialization of the scanned imaging system.

When a pixel in detector 112 array exceeds the threshold value, a pixel "hit" event, the address of the pixel is reported, for example to processor 116 (see FIG. 1), together with the measured light value for the corresponding screen position. For example, the data that is reported to processor 116 may take the form of a 2-tuple [Address of pixel N, Value of pixel N]. Either concurrently or afterwards, the pixel is reset, so the pixel is ready to detect the next event, for example, another surface position the brightness of which exceeds the pixel threshold. All other pixels in detector 112 array are unaffected during the detection reset cycle and pixels in detector 112 array may operate fully asynchronously. Multiple pixel hit events may be detected at the same time.

In this embodiment, no electronic or mechanical shutter may be needed for detecting pixel hit events. The pixel thresholds and resetting together act as an effective shutter mechanism for detector 112 array. An effective shutter speed of a sensor (pixel) in detector 112 array is at most as slow as the reset time of any one pixel, typically on the order of a few micro seconds or less. The shutter speed for the detection of a pixel hit event, may generally be limited by the sensitivity of a pixel trigger circuit to detect a minimum amount of charge exceeding the preset threshold value (trigger). If the value to be detected is a sufficiently bright strobe, the detection would be nearly instantaneous. For example, an avalanche photo diode detector based pixel might require as few as 10 photons to detect a hit. When high speed beam detection is required, adjacent pixels in the detector corresponding to screen positions on the scanline, may be asynchronously (and typically time-sequentially) triggered, effectively causing the detector to have little or no shutter speed limit. Furthermore, nearly simultaneous observations of different pixel hit events may be pipelined for processing to calculate and predict the trajectory of the scanline. A precise reference clock may be used to time-stamp each pixel hit event observation for accurate trajectory calculations. Such a reference clock may provide GHz (Giga Hertz; nano-second time resolution) time-stamps.

The surface position, brightness, and timestamp associated with a pixel hit even may be obtained asynchronously. Therefore, the timing of the observed pixel hit events is independent of sampling speed, sampling intervals, or shutter speed of detector 112, thus, avoiding measurement errors and quantization effects, which typically result in image artifacts such as aliasing in traditional array sensors. Reducing quantization artifacts is an important architectural consideration. In the cases that the observed object has a known periodicity, clock accuracy and motion accuracy can be derived independently from the sensor spatial resolution, reducing motion blur. In one embodiment, the tracer beam 122 (see FIG. 1) may be pulsed with a low duty cycle, on the order of pico-seconds. Such low duty cycle IR pulses create a short-duration bright flash and ensure that the screen position at which this bright flash appears do not spread across more than any two adjacent pixels in detector 112 array, even when the scanline sweep velocity may far exceed the spatial accuracy and shutter speed of a conventional camera.

In one embodiment, dimensional Superposition entails beam folding in addition to "deconstructing" the image, e.g., optically reducing the image dimensionally from a 2-D space, having an X- and a Y-dimension, into two or more 1-D spaces. In this embodiment an N×N image detector array may be reduced to a single N-pixel linear sensor array by "folding" and superimposing each of the two dimensions of the image onto one linear array. A 2-D image beam may be collapsed into two 1-D linear arrays using one or more cylindrical lenses that split the 2-D image beam. Beam folding may be performed by guiding the image light exiting from a cylindrical lenses onto a single linear array by optical means, for example, using mirror(s), prism(s), grating(s), or waveguide(s). In one embodiment, the single linear array may be a monochrome linear array. In another embodiment, the 2-D image may be split, resulting in two split image beams. One of the split beams may be rotated and recombined with the other split image beam, so that one cylindrical lens and corresponding sensor array may be needed.

In this embodiment, a single surface position where the IR pulse is projected on the surface, may result in two separate illuminated dots on the linear array. One dot represents X-dimension and the other dot represents the Y-dimension of the surface position on the original 2-D image. Thus, the bit values (representing, for example, brightness) and addresses of the two dots in the single linear array allow the spatial surface position in the 2-D image, as well as the intensity and color of the 2-D image corresponding to the surface position be reconstruction rapidly and efficiently, as two values have to be read from the same sensor in the single linear array. This embodiment allows the scanned laser imaging system to track a highly mobile bright objects in its Field of View (FoV) with N×N spatial resolution at a speed limited by the pulse width (or period) of the tracer beam. In this case, the effective resolution of the IPD is equivalent to speed x pulse period. In one embodiment, for accurate scanline trajectory calculations, multiple sequential readings can be made as described and the result can be hyper-resolved by interpolation for scanline sweep segments with known speed and smooth curvature. This way, the IPD's scanner may achieve high resolution and great color depth, using a single monochrome array sensor.

In one embodiment, improved spatial color accuracy, for example, hue and luminance, may be independently achieved, using the same set of optics and sensors. To detect the screen position accurately based on a reflection of incident beams projected on the screen 114, a narrow band frequency light source may be used, in the form of a narrowly collimated illumination beam that illuminates a very narrow spot, for example, an IR or UV beam. If all light beams have substantially the same frequency, the optics may be optimized or tuned for this frequency. A broad spectrum light source or a mix of multiple primary color components, representing the image to be displayed, may be superimposed and projected onto the screen position to determine the hue and luminance information of the reflected image beam. To enhance the sensitivity of the color measurements, and to allow for some blurring and color aberrations inherent in using the broad spectrum light in the optics of the detector 112, values of multiple pixels in the single linear array may be combined. This may be possible because due to the laser collimation accuracy, the image information may be generally centered on the same location as the narrow beam location, which has been already determined.

In one embodiment, both the screen position and visible image color components may be read simultaneously by subtracting IR pulse value of the screen position from sum of the adjoining "lit-up" screen positions. In another embodiment, the periodic IR pulse may be used to determine the precise scanline trajectory. The scanner may operate in color spatial field sequential fashion, where for each color, location is calculated by spatial interpolation based on the time-stamp associated with the screen position.

In one embodiment, processor 116 is a programmed microprocessor coupled to memory 118 containing the image to be displayed. As is well known to those skilled in the art, embedded programs running on the microprocessor may be used to perform appropriate signal processing using processor 116. In one embodiment, processor 116 is a digital signal processor (DSP) with specialized instructions for processing signal information. In another embodiment, processor 116 is a circuit for performing hardware-based processing and calculations. In yet another embodiment, processor 116 is a software component running on a microprocessor or microcontroller running other applications as well. Those skilled in the art would appreciate that processor 116 may be implemented using multiple processors, each processor performing a portion of the calculations needed.

In one embodiment, light source driver 102 is a circuit for modulating light sources 104 according to image control signals 124 output from the processor 116. Light source driver 102 may also process timing information is 126 to control tracer beam generator 106. In one embodiment, light source driver 102 modulates light sources 104 and controls tracer beam generator 106. In another embodiment, light source driver 102 may be implemented as two separate modules, one for controlling light sources 14 and one for controlling tracer beam generator 106.

Not all the components shown in FIG. 1 may be required to implement PSTP 100 and variations in the arrangement and type of the components may be made without departing from the spirit or scope of the disclosure. For example, light source driver 102 and processor 116 may be integrated into one device. Conversely, light source driver 102 for modulating component light sources 104 may be a device that is distinct from processor 116. Similarly, in various embodiments, detector 112 and scanner 110 may be integrated together or may be implemented as discrete components.

In operation, with continued reference to FIG. 1, scanner 110 pseudo-randomly sweeps screen 114 with scanlines. In one embodiment, a random number generator is used to generate at least a component used to perform pseudo-random sweeps for scanner 110. In another embodiment, physical features may be used in the structure of scanner 110 to introduce pseudo-randomness in the sweep direction of the mirror employed in scanner 110. For example, irregular mechanical features, optical features, electrical currents, magnetic fields, or thermal fluctuations may be used to introduce such randomness. As scanner 110 sweeps across screen 114, the tracer beam 122 is reflected by scanner 110 and projected onto screen 114. Subsequently, tracer beam 122 is reflected back by screen 114 and is detected by detector 112. In one embodiment, tracer beam 122 is a pulsed IR beam. In another embodiment, tracer beam 122 is composed of short duration visible light pulses. Those skilled in the art will appreciate that a behavior pattern that may appear random at one level of detail may be deterministic at a more detailed level. For example, a pseudorandom behavior pattern at micro-second level of detail may be entirely deterministic at a nano-second level of detail. For instance, regular events at nano-second time resolution, when combined into longer units of time, may give rise to higher level events that appear random.

Detector 112 determines the screen position as defined by a pulse from tracer beam 122. Processor 116 predicts the subsequent screen positions based on the previous screen positions on the same scanline. The subsequent screen positions are used to obtain image pixel information from memory 118 and display on the subsequent predicted screen positions. In one embodiment, the image pixel information from memory or another image source, such as a graphic engine, may correspond to one or more screen positions. The image to be displayed may be a described as a polygonal element or continuously interpolated color mapping. This process may be continuously repeated for pulse after pulse.

For each detected pulse, the corresponding surface position information is provided to processor 116 by detector 112. In one embodiment, the screen position information may include raw data as collected by detector 112, for example, an array index of detector 112. In this embodiment, the raw data may be further processed by processor 116 to calculate the [X, Y] coordinates of the detected beam of light. In another embodiment, the surface position information may include [X, Y] coordinates of the detected pulse, as determined by detector 112. Detector 112 may also provide time of detection, to, to processor 116. The time of transmission of the tracer beam from the tracer beam generator 106 to processor 116, the pulse "flight time," may be calculated by subtracting the time of generation of the pulse from the time of detection of the pulse. The pulse flight time may be used to estimate the distance of the particular point on screen 114 where the pulse was detected to scanner 110. Knowing this distance enables processor 116 to adjust the brightness and modulation of the component image beams, and tracer beam pulse frequency to compensate for a rough or irregular surface of screen 114 or another remote surface/object that may be stationary or moving.

In one embodiment, successive screen positions traversed by the pseudorandom scanlines, used to project combined image beam 120 onto screen 114, are looked up by high speed processor 116 in a memory reference table and the color values of the image to be displayed corresponding to the screen positions are rendered on the screen positions nearly instantaneously. Hardware graphics processors can look up such color values and any related computations at multiples of GHz (Giga Hertz, a billion cycles/second) clock speeds. Thus, pixel color values, typically specified as 24, 32 or 48 bit color vectors, can be computed billions of times per second, with a latency of about a few nano seconds (billionths of a second). This rate of processing is more than sufficient to render the equivalent of 30 frames of two million pixels each second (60 million vectors per second). Thus, such computational speeds are more than sufficient for LID 100 to render HDTV (High Definition TV) quality video.

In one embodiment, the projection and detection functions described above may be alternated on a small time scale, for example, on the order of a few nano-seconds. In this embodiment, in a first phase, a projection cycle is performed projecting a portion of a scanline on the screen, while a detection cycle stands by. In a second phase, the detection cycle starts while the projection cycle stands by. The first and second phases may be performed on a single or a few screen positions. In another embodiment, the projection and detection functions may operate simultaneously. For example, two sliding windows overlapping in time may be used to simultaneously project and detect multiple screen positions. One sliding window may be used for projection of an image onto multiple screen positions, while the other sliding window may be used for detection of previously projected multiple screen positions.

In its basic operation as described above, LID 100 is independent of frames of video in contrast to conventional projectors or other display devices. In LID, pixels on the projected image are refreshed not by an orderly scan, such as raster scan, but by pseudorandom scanlines. As such, the limitations associated with quantization/digitization, frame rates, and the like, as described above, largely do not apply to LID 100. For example, HDTV needs to display about 180 million dots per second for 30 frames per second of 1920 columns, 980 rows for each frame, and three colors per pixel. As a result, every pixels must be re-drawn because of the regular frame rates. This type of "overkill" is necessary to suppress some of the quantization artifacts discussed above. In contrast, LID 100 can update a pixel using a single combined image beam 120 if the pixel is predicted to fall on the current scanline, avoiding the need to process/calculate pixels in regular sequence to get rid of artifacts.

Additionally, little or no calculations need be performed when there is a span of non-changing image value covering multiple screen positions or another remote surface/object positions. For example, for a solid background color the value of the image beam corresponding to screen positions falling within the solid background need be calculated once and used tens, hundreds, or thousands of times during one or more scanline sweeps. Human visual system is persistent in some respects, holding a perceived brightness or color value for a small span of time, on the order of a few microseconds.

Additionally, the human visual system may integrate successive values of a pixel over time provided the refresh rate is beyond human visual perception. The result of such integration may be a perceived as a color different from all of the successively integrated values of the pixel over time. There is no concept of frame involved in the LID, even though a sequence of image frames may also be displayed using the LID like any sequence of images.

In one embodiment, the expected reflection of the image on the screen or another remote surface/object at a particular position may be compared to the actual reflection value (for example, returned color intensity of each color of the projection beam colors). A difference between an expected beam reflection value at each position and the actual reflection value at the same position is an indication of the reflection/absorption response of the screen or another remote surface/object. Thus, images prior to projection may be observed and acted upon during and after pseudo random scanning.

In one embodiment, the difference between the expected and the actual reflection values may be used when on-screen, location-specific references are required that allow the LID to align and match its projection with great color and spatial accuracy to a predetermined location, color, or pattern. Thus, the projected image might complement, or alternatively mask, a reflected image. For example, a screen artifact, such as a user-interface component embedded in the screen, like a microphone or a camera lens, or a non-uniform screen area may be detected. Based on such detection, the LID may adjust the projected image to avoid projecting the image on such screen artifacts. This feature may be useful in a video conferencing session, where the projected image of a first party in the conference needs to be properly aligned with the camera aperture embedded in the screen (which may be considered as a small irregularity in the screen surface) so that an observing second party to the video conferencing session looks directly at where the first party is looking, that is, straight into his/her eyes. If this embodiment is implemented on both sides in the video conference, the gazes and observed facial perspectives of both parties may be properly and mutually aligned. This feature enables a life-like and natural eye-to-eye contact, greatly facilitating communication between humans. In addition, due to the ability of the scanner to detect the lens aperture accurately, the sweeping projection beam can be spatially masked and can be synchronized with the shutter interval of the camera so that the camera is not blinded by the projected image.

In another embodiment, the projected image may be aligned with the projection surface, for example, in a situation where the projection surface is in motion with respect to the projector or the viewer, and the projected image needs to be angularly and/or spatially adjusted, for example, by rotation, translation, and/or scaling, to match the moving projection surface. The LID may have high scanline projection speeds, for example about 10,000 feet per second (fps). At high projection speeds, such image adjustments may be made faster than the human eye can detect. In this embodiment, the RSPT may create an image that seems physically attached to the moving projection surface. One application of this embodiment might be the projection of advertising on moving vehicles or objects. Another application that may require precise control is an electronic dashboard display where it is desirable to align the projected image accurately with the moving/vibrating control surface, particularly if that surface has an active (for example, emissive or reflective) display that needs to be complemented by the projected image. For example, in traffic control or mission control, projecting real time flight or vehicular information on a terrain map may be possible using this embodiment.

In yet another embodiment, a white board or other collaborative surface may be used as a screen for the LID, where written, printed, or projected images may be annotated with real, for example, erasable markers. The annotations or other markings may be superimposed on a known image that is projected onto the white board. Such markings may then be scanned in by the LID, so the markings can be added in real-time to the image or document being projected onto the collaborative surface, and/or stored for later use or further modification. In one embodiment, the detector in LID, for example detector 112 (see FIG. 1), may include a detection camera that can detect an image on the screen in addition to detecting the tracer beam pulses. In this embodiment, the difference between the known image projected by the LID and the reflected image that is read back, or detected, by the detection camera may be used to determine if any additional images, such as text, lines, or physical objects like a hand or a pointer, and the like, have been projected or otherwise marked on the screen and superimposed on the known image. For example, if an image of a drawing is projected on a white board and a user writes a number or text, for example, using a physical marker, on the white board, the detection camera may detect the difference between the drawing before and after the text was written by the user. Subsequently, the projected drawing may be augmented with the text written by the user on the same spot that the user wrote. In one embodiment, this augmentation may be done in real-time and substantially immediately. In another embodiment, the augmentation may be done later after storage of the detected differences.

This embodiment may be particularly useful in cases where the modifications on a real white board need to be available in real-time in multiple locations in a collaborative setting. During a collaboration session, an image, such as a system diagram, may be projected on a regular white board at multiple locations using the LID. Any modifications made to the projected diagram at any one of the locations participating in the collaboration session may be seen at all participating locations. In another embodiment, the LID may be a rear projection system. In this embodiment, when using a "dry erase" marker on a translucent screen, the LID may detect, from behind the screen, the ink left by the "dry erase" marker. In another embodiment, a physical object, for example, a pointing device, such as a stick or a finger, may be detected by the LID and used to augment the projected image. For example, if a participant at one location uses a stick to point to a feature on the projected image, other participants at other locations will see an augmented image including the pointer pointing to the same feature on the image. Similarly, in an immersive video game or a virtual reality (VR) environment, or Mixed Reality (MR) environment, physical objects, such as chairs, tables, avatars, player characters, and the like may be integrated into the scene, adding to the realism by making the VR experience more consistent with reality.

Those skilled in the art will appreciate that the same functionalities described above for LID 100 may be implemented using other arrangements of components without departing from the spirit of the present disclosures. For example, although LID 100 is shown and discussed with respect to a front projection arrangement, where the projected image is viewed by a user as reflected off screen 114, substantially the same concepts, components, and methods may be used for a rear projection arrangement, where the projected image is viewed on the other side of screen 114 via light transmission.

Illustrative Computing Device Environment

Figure 2:
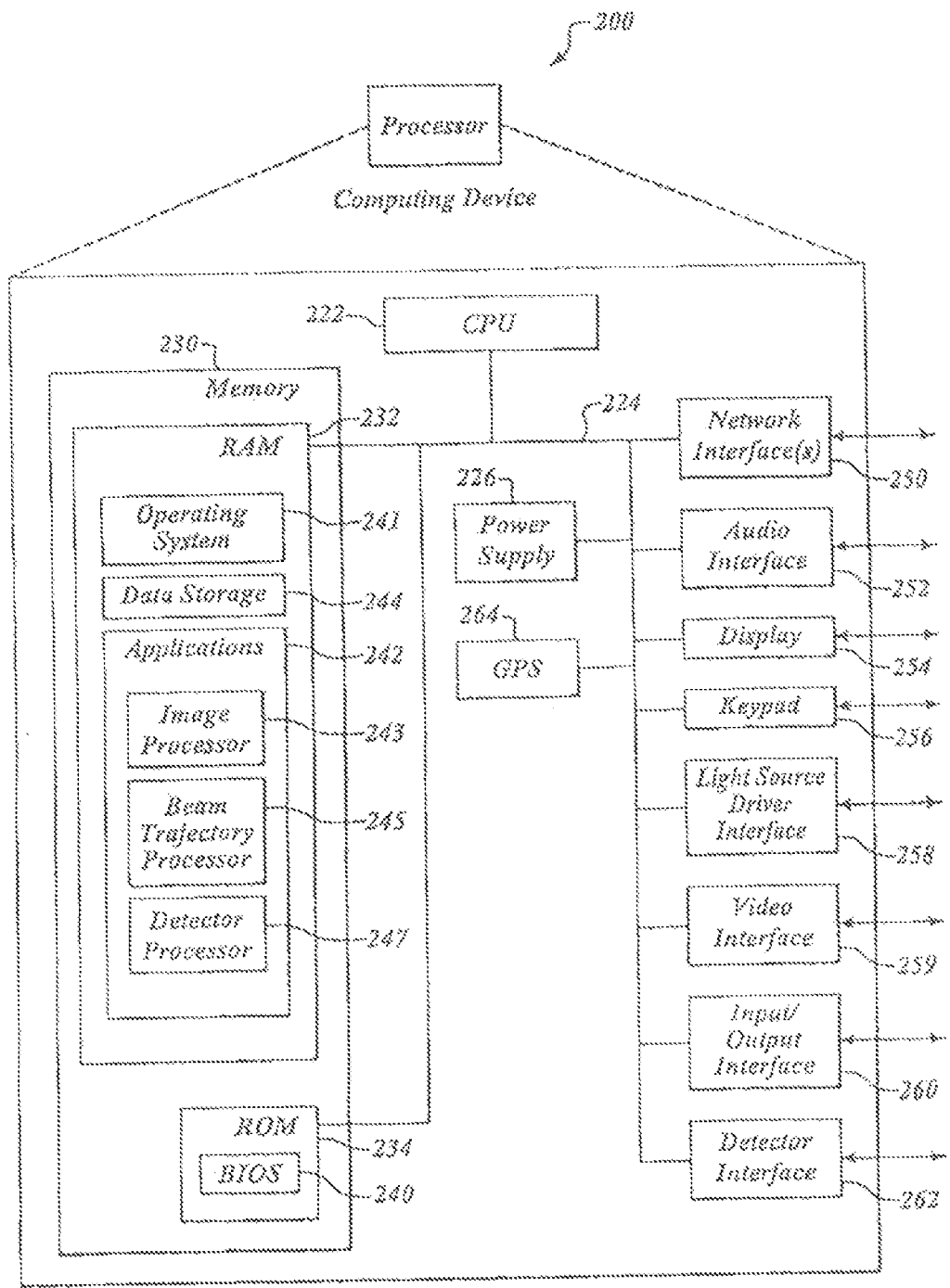
FIG. 2 shows one embodiment of a client device that may be included in a system implementing aspects of the invention.

FIG. 2 shows one embodiment of computing device 200 that may be included in a system using LID 100. Computing device 200 may include many more or less components than those shown in FIG. 2. However, the components shown are sufficient to disclose an embodiment for practicing the present invention.

As shown in the figure, computing device 200 includes a processing unit (CPU) 222 in communication with a mass memory 230 via a bus 224. Computing device 200 also includes a power supply 226, one or more network interfaces 250, an audio interface 252 that may be configured to receive an audio input as well as to provide an audio output, a display 254, a keypad 256, a light source driver interface 258, a video interface 259, an input/output interface 260, a detector interface 262, and a global positioning systems (GPS) receiver 264. Power supply 226 provides power to computing device 200. A rechargeable or non-rechargeable battery may be used to provide power. The power may also be provided by an external power source, such as an AC adapter or a powered docking cradle that supplements and/or recharges a battery. In one embodiment, CPU 222 may be used as high performance processor 116 for processing feedback and timing information of LID 100, as described above with respect to FIG. 1. In another embodiment, CPU 222 may operate independently of processor 116. In yet another embodiment, CPU 222 may work in collaboration with processor 116, performing a portion of the processing used for the operation of LID 100.

Network interface 250 includes circuitry for coupling computing device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action.

Display 254 may be a CRT, a liquid crystal display (LCD), gas plasma, light emitting diode (LED), or any other type of display used with a computing device. Display 254 may also include a touch sensitive screen arranged to receive input from an object such as a stylus or a digit from a human hand. LID 100 may replace display 254 or work in conjunction with display 254. For example, if display 254 is an output or write-only device, that is, an output device that displays information but does not take input from the user, then LID 100 may replace display 254. However, if display 254 is an input/output device or read/write device, then LID 100 may work in conjunction with display 254. LID 100 may display the output information while display 254 may take user input, for example, as a touch-screen display. This way, a user can view high quality output using LID 100 while inputting information via the touch-screen display 254, which may additionally output the same information viewed on LID 100. In another embodiment, described more fully below with respect to FIGS. 5 and 6, the feedback provided by LID 100 may be used to detect user input in 3-D, integrate such input into the image being displayed, and project the integrated image onto the screen 114 in real time. This embodiment reduces or eliminates the need for display 254.

Keypad 256 may comprise any input device arranged to receive input from a user. For example, keypad 256 may include a push button numeric dial, or a keyboard. Keypad 256 may also include command buttons that are associated with selecting and sending images.

In one embodiment, a light source driver interface 258 may provide signal interface with the light source driver 102. Light source driver interface 258 may be used to provide modulation and timing control information to light source driver 102. For example, if CPU 222 is used as processor 116 for processing feedback and timing information of LID 100, then light source driver interface 258 may be used to deliver image control 124 and timing information 126 to light source driver 102.

Video interface 259 may generally be used for providing signals of a particular type and/or formatting images for display on a particular type of display device 254. For example, if display 254 is a raster type device, such as a CRT, then video interface 259 provides the appropriate signal timing, voltage levels, H-sync, V-sync, and the like to enable the image to be displayed on display 254. If display 254 is LID, the video interface 259 may implement some or all of the components shown in FIG. 1 to enable an image to be displayed using LID 100.

Computing device 200 may also include input/output interface 260 for communicating with external devices, such as a headset, or other input or output devices not shown in FIG. 2. Input/output interface 260 can utilize one or more communication technologies, such as USB, infrared, Bluetooth™, or the like.

In one embodiment, detector interface 262 may be used to collect timing and screen, remote surface/object position information from detector 112 and passing such information on to processor 116 and/or CPU 222 for further processing. In another embodiment, detector interface 262 may be integrated with video interface to 259 as one unit. In yet another embodiment, detector interface 262 may be external to computing device 200 and be part of an integrated external LID unit.

GPS transceiver 264 can determine the physical coordinates of computing device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS transceiver 264 can determine a physical location within millimeters for computing device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of computing device 200. The mass memory also stores an operating system 241 for controlling the operation of computing device 200. It will be appreciated that this component may include a general purpose operating system such as a version of UNIX, or LINUX™, or a specialized computing communication operating system such as Windows Mobile™, or the Symbian® operating system. The operating system may include, or interface with a Java virtual machine module that enables control of hardware components and/or operating system operations via Java application programs. In one embodiment, mass memory 232 may be used as memory 118, for holding an image to be displayed using LID 100, coupled with processor 116 and/or CPU 222.

Memory 230 may further include one or more data storage 244, which can be utilized by computing device 200 to store, among other things, applications 242 and/or other data. For example, data storage 244 may also be employed to store information that describes various capabilities of computing device 200, a device identifier, and the like. The information may then be provided to another device based on any of a variety of events, including being sent as part of a header during a communication, sent upon request, or the like.

Applications 242 may include computer executable instructions which, when executed by computing device 200, transmit, receive, and/or otherwise process messages (e.g., SMS, MMS, IMS, IM, email, and/or other messages), audio, video, and enable telecommunication with another user of another computing device. Other examples of application programs include calendars, browsers, email clients, IM applications, VOIP applications, contact managers, task managers, database programs, word processing programs, security applications, spreadsheet programs, games, search programs, and so forth. Applications 242 may further include image processor 243, beam trajectory processor 245, and detector processor 247.

In one embodiment, image processor 243 is a software component that may perform functions associated with processing digital images for display using LID 100. For example, image processor 243 may used to fetch an image to display using LID 100 from memory 118. In one embodiment, image processor 243 works in collaboration with other components, such as video interface 259, detector interface 262, beam trajectory processor 245, and detector processor 247. Additionally, image processor 243 may be used to perform digital image processing operations on the image fetched from memory 118. For example, image processor 243 may use an adjustment coefficients matrix to adjust each color component of each image pixel of the image in memory 118 before using LID 100 to display the image. In one embodiment multiple adjustment coefficients matrices may be used to adjust different image parameters. For example, one matrix may be used to adjust brightness, while another matrix may be used to adjust saturation when using HSB color space. In one embodiment, RGB color representation may be converted to HSB, be adjusted according to the appropriate coefficient matrices, and converted back to RGB for modulation.

Those skilled in the art will appreciate that there are many image processing operations that may be performed on an image before displaying the image. For example, various filtering operations may be performed on the image to filter out noise, sharpen edges, and improve contrast. Such image processing operations may be based on the timing of tracer beam 122 pulses, the detected view angle of a viewer, the texture of screen 114, and the like.

Beam Trajectory Processor (BTP) 245 is used to process information about the pseudo-random scanline trajectory based on tracer beam pulses 122. BTP 245 may work in cooperation with image processor 243 to estimate the next screen position for projecting the image. In one embodiment, BTP 245 collect data about N successive tracer beam 122 pulses from a current scanline being scanned by scanner 110. Next, BTP 245 uses the N successive pulses to estimate the next M display screen positions on the current scanline. For example, BTP 245 may use numerical methods to fit a curve through the [X, Y] positions of the N successive pulses and estimate/predict the next M display screen positions on the current scanline. Those skilled in the relevant arts will appreciate that there are many numerical methods that may be used for this application. For example, least squares curve fit may be used to minimize curve fit errors. Subsequently, image processor 243 fetches image pixels from memory at 118, corresponding to the M display positions on the current scanline.

In one embodiment, the screen position estimation/prediction process described above may be repeated for each tracer beam 122 pulse that is detected by detector 112. In effect, a sliding window type algorithm may be used to continuously and accurately estimate and update the predicted position of the next screen position before the scanline actually crosses the predicted screen position. In this embodiment, the width of the sliding window is the N screen positions.

In one embodiment, detector processor 247 may work in collaboration with detector interface 262 to collect and preprocess data for tracer beam 122 pulses before providing such data to BTP 245 for trajectory estimations. Those skilled in the relevant arts will appreciate that image processor 243, BTP 245, and detector processor 247 may be integrated into one component. Similarly, the functions performed by each of these components may be decomposed and distributed over other components, software or hardware, of computing device 200.

Those skilled in the relevant arts will appreciate that some of the components described above with respect to FIG. 2, for example, beam trajectory processor 245, image processor 243, and detector processor 247, may be integrated together in a single more comprehensive component that performs the functions of the individual components described. Conversely, some of the components may be decomposed and distributed over multiple smaller components with more focused functions. Additionally, some of the components described above may be implemented in hardware, software, firmware, or a combination of these.

Generalized System Operation

Figure 3:
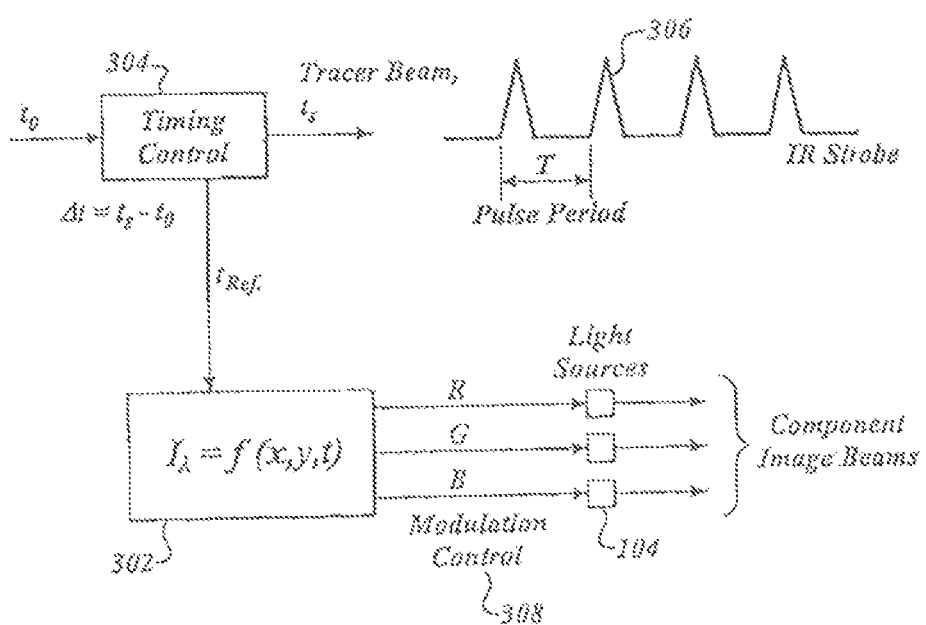
FIG. 3 shows one embodiment of a LID control subsystem.

FIG. 3 shows one embodiment of LID 100 control subsystem. The control subsystem takes feedback information from detector 112, processes the feedback information in conjunction with image data stored in memory 118, and provides control information to light source driver 102. In one embodiment, the control subsystem includes a timing control 304 outputting a tracer beam timing and/or frequency control signal, $t_s$, and another reference timing signal, $t_{ref}$, to an intensity control component 302. The intensity control component 302 provides modulation control signals 308 for modulating component image beams generated by light sources 104.

In one embodiment, timing control component 304 is implemented as part of BTP 245 and/or a detector processor 247. In another embodiment, timing control component 304 is implemented as a separate hardware circuit that may interface with detector interface 262. Similarly, in one embodiment, intensity control component 302 may be implemented as part of image processor 243. In another embodiment, intensity control component 302 may be implemented as an independent component that is coupled with image processor 243.

In one embodiment, timing control component 304 takes as input timing information to from to detector 112 and outputs tracer beam 122 timing information, such as $t_s$ with pulse period T between pulses 306. Tracer beam 122 timing information may subsequently be used for generating tracer beam 122 via tracer beam generator 106. Timing control component 304 may also calculate pulse flight time by subtracting $t_s$ from $t_0$. Pulse flight information may be used to calculate the distance of screen 114 from scanner 110, based on which image intensity may be controlled. Timing control 304 may also be used to vary pulse period T and thus, vary the effective resolution of the image projected via LID 100 dynamically. Dynamic, localized, real-time variation of image resolution may be useful to adjust the displayed image on an uneven surface of screen 114. For example, if the surface of screen 114 has an edge with a sharp drop or angle, such as a wall corner with a large drop, at a given resolution, a display pixel may fall partly on the top side of the edge and partly on the bottom side of the edge, thus, splitting and distorting the displayed pixel. However, if the displayed pixel is split into two pixels by increasing local resolution dynamically, then instead of splitting the pixel over the edge, one pixel at appropriate intensity is projected on the top side of the edge and another pixel and at another appropriate intensity is projected on the bottom side of the edge.

In one embodiment, dynamic resolution adjustment in conjunction with other features of LID, such as feedback and flight time information, may be used to project an image on several odd-shaped or angled walls surrounding the LID for creating a visually immersive environment. Such visually immersive environment may be used in video games where the player is at the center of the room in a virtual game environment. In one embodiment, a single LID may be used to project an image about 180° wide. In another embodiment, more than one LID may be used to project an image about 360° wide (for example, planetarium style projection), completely surrounding a viewer.

Another application of dynamic resolution control is focusing high resolution, and thus, high quality, where high resolution is needed most. For example, an image having details of a face against a blue sky background can benefit from the high resolution for showing facial wrinkles, hair, shadows, and the like, while the blue sky background can be displayed at a relatively lower resolution without sacrificing quality significantly or noticeably.

In one embodiment, intensity control component 302 determines intensity of component image beams based on pixel values of the image in memory 118 corresponding to the next M screen positions on the current scanline. The intensity of each component image beam for each predicted screen position may be further adjusted by adjustment coefficients in an image processing matrix. In one embodiment, detector 112 includes a color camera that detects combined image beam 120 from screen 114, in addition to detecting tracer beam 122, as another feedback signal. Detected combined image beam 120 may be used to further adjust displayed image quality by comparing detected combined image beam 120 at each screen position with the corresponding image pixel in memory 118.

In one embodiment, the adjustment of the displayed image at each surface position may be done over successive scan cycles, each scan cycle sweeping a new pseudorandom scanline, of the same surface position. As scanner 110 randomly projects scanlines onto screen 114, eventually each screen position is scanned again in a later scan cycle, providing the opportunity to further adjust the color and intensity of the projected image at each surface position, or add additional detail, possibly filling in small spaces missed in the previous scan cycles, to sharpen or soften edges as needed. Due to the high scan rate of scanner 110, each display pixel is likely scanned and adjusted multiple times at a rate that is imperceptible to a human viewer. The human visual system integrates successive adjustments of color and intensity into a perceived whole by averaging the color and intensity over time if such adjustments occur fast enough for the human visual system. Thus, even if in one scan cycle, the color and intensity of a display pixel is less than perfect as compared with the corresponding pixel of the image in memory 118, for example, due to lighting and/or screen 114 surface imperfections, the color and intensity of the display pixel is adjusted in the next few scan cycles and integrated by human eye before the human vision has a chance to perceive the imperfection in one cycle.

Figure 4A:
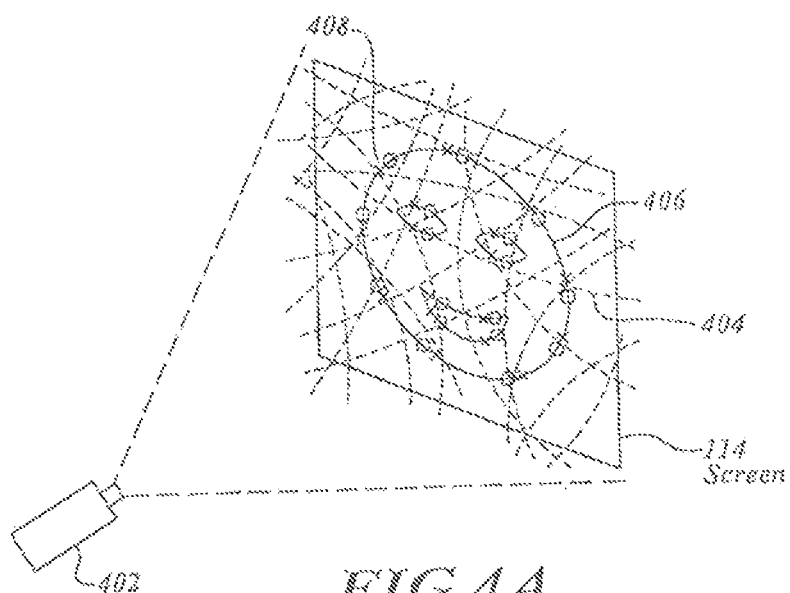
FIG. 4A shows one embodiment of light beam trajectories generated by a LID.

FIG. 4A shows one embodiment of pseudo random beam trajectories generated by LID 100. LID type projector 402 is used to project pseudorandom scanlines with trajectories 404 onto screen 114. As scanline 404 trajectories randomly cover surface of screen 114 hundreds of thousands of times a second, each screen position is scanned hundreds of times per second. Each display pixel may fall on different scanlines during scanning because of the pseudorandom nature of the scanlines. For example, a pixel 408 may fall on one scanline during one scan cycle and fall on another scanline passing through the same point in another scan cycle. This is so because it is well known in basic geometry that infinitely many lines can pass through the same point in a plane, such as the surface of screen 114.

As an illustrative example, consider an image 406 of a face that is displayed using LID 402 on screen 114. Each screen position 408 on the face 406 may fall on one or more scanlines. When screen position 408 is predicted to be the next display position on a current scanline, processor 116 (or equivalently, image processor 243 shown in FIG. 2) fetches the corresponding pixel data from the image in memory 118. The corresponding pixel data from the image in memory 118 are then used to modulate component image beams output by light sources 104 that are subsequently combined to form combined image beam 120. Combined image beam 120 is reflected by scanner 110 onto screen 114 at screen position 408 when the current scanline reaches screen position 408. This operation is typically performed on a nano-second time scale.

For relatively large spans of uniform image portions on a pixel scale, for example, a portion of blue sky or white wall, the modulation of component image beams need not change because the same color and intensities are repeated for many contiguous pixels. A Run-Length-Limited (RLL) image coding and/or display algorithm may be used to reduce the amount of processing needed to display such images. Most graphical images, such as various pictures like sceneries, clothing, faces, and the like, have large spans of uniform image colors and intensities at pixel level and can benefit from RLL based processing to increase efficiency. Even larger spans of uniformity may be encountered in synthetic game scenes and software application graphics such as desktop business applications, web pages, and the like.

Figure 4B:
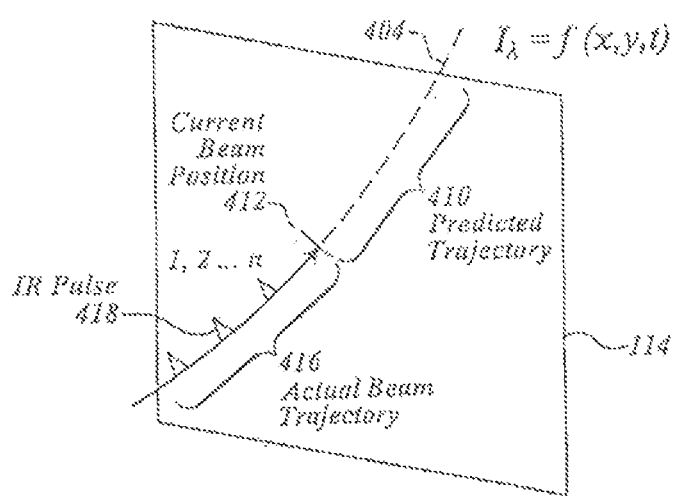
FIG. 4B shows an embodiment of one light beam trajectory with scanned and predicted trajectory portions.

FIG. 4B shows an embodiment of one pseudo random beam trajectory with scanned and predicted trajectory portions. The process of projecting an image using the LID may be divided into two distinct phases: a feedback phase during which an already-scanned portion of scanline 404 is detected, and a projection phase during which combined image beam 120 is projected onto a predicted portion of scanline 404. Correspondingly, scanline 404 has two distinct portions, one, scanned beam trajectory portion 416, and two, predicted trajectory portion 410. Scanned beam trajectory portion 416 of scanline 404 ends at current beam position 412 and includes a sequence of pulses 414, typically generated on the basis of nano-second timing. The predicted trajectory portion 410 is the portion that is predicted by processor 116 based on the data associated with the sequence of pulses 414. The data associated with the sequence of pulses 414 include [X,Y] position of the display pixel on which pulses 414 are projected, the time at which pulses 414 are detected, and the like. In effect, pulses 414 define multiple points which specify a scanned portion 416 of scanline 404. The remaining predicted trajectory portion 410 of scanline 404 is predicted or estimated by numerical techniques, such as curve fits, based on the data associated with pulses 414. Combined image beam 120 is generally projected on predicted trajectory portion 410 of scanline 404.

Figure 5:
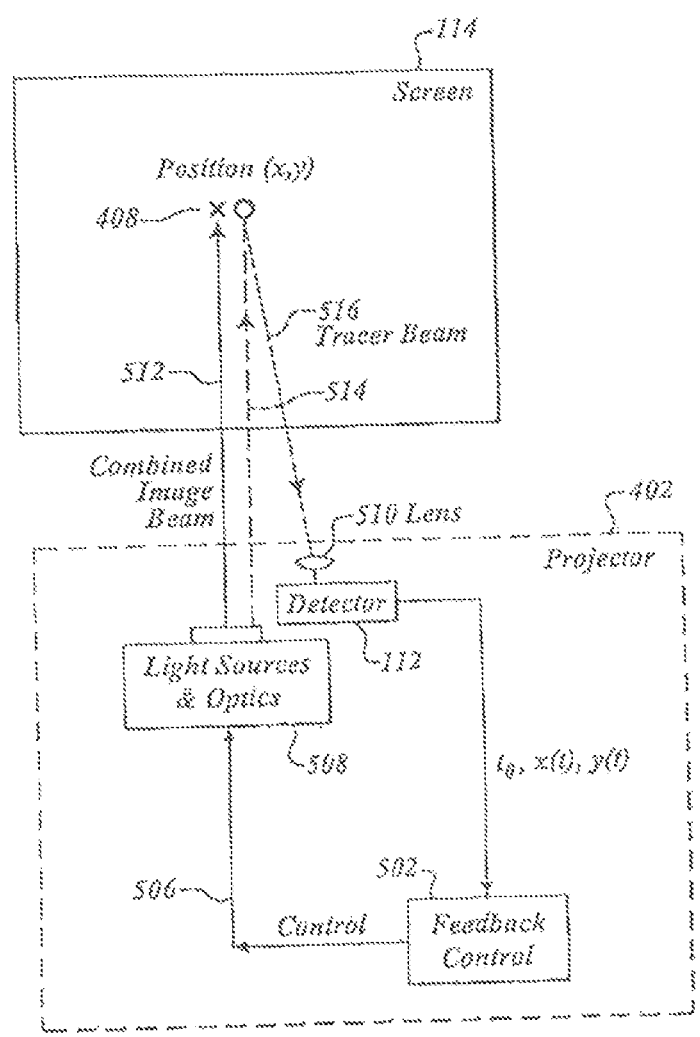
FIG. 5 shows an embodiment of a LID depicting one image beam and tracer beam point.

FIG. 5 shows an embodiment of the LID of FIG. 1 depicting one image beam and tracer beam point. This embodiment includes a projector 402 including a light source and optics unit 508, a detector 112 coupled with a lens 510, ad a feedback control unit 502 outputting control signals 506. A combined image beam 512 is projected onto screen 114 at screen position 408. screen position 408 is thus defined by two light beams in close proximity: a projection X of combined image beam 120 and a projection O of tracer beam 514. In one embodiment, the tracer beam 514 includes a rapid train of IR pulses 418 projected on screen 114 as the current scanline is swept across screen 114 with nanosecond timing. Alternatively, tracer beam 514 may be provided scanned as a continuous pattern. Also, tracer beam 514 may be scanned onto a remote surface or a moving object, e.g., vehicle in motion or a walking person or animal or even on the rapidly moving retina in a human eye, in the case of direct retinal projection (in Augmented Reality or Virtual Reality Head Mounted Displays). In one embodiment, projection O of IR pulse 418 is co-centric with projection X of combined image beam 512. In another embodiment, projection O of IR pulse 418 is positioned side-by-side with respect to projection X of combined image beam 512. In yet another embodiment, tracer beam 514 is a short-duration, on the order of a few nano-seconds, visible light pulse, that is imperceptible to human vision because of its very short duration.

In one or more embodiments, the tracer beam projects a pattern on a remote surface or object (e.g a walking person or a moving vehicle), following sequentially arced patterns, preferable as "pseudo random" scan pattern of fast linear strokes, as in FIG. 4A where a tip of the laser beam is shown to move time-sequentially, one position at one time), and where the position of an illuminated spot created by the beam on the remote surface keeps moving progressing in an analog fashion, moving its surface position proportional with time elapsing from nanosecond to nanosecond. In this way, a sequence of events observed by detector(s) 112, and 113 in FIG. 1 may also result in a series of pulses, but these pulses are detector generated, not generated by beam modulation, which causes the reflected photons of the tracer beam arriving as successive pixels (e.g. SiPM ADP pixels) are triggered in sequence. The spot beam on the remote surface (or screen) is reflected and projected onto the sensors pixelated surface. Also, as the tracer beam moves the spot the sensor moves in step with just a few nanoseconds delay based on the ToF distance (one nano second per foot distance). Thus, a position estimate may be generated accurately—only limited by the accuracy in the observation of when the first photons arrive at the next pixel in these asynchronous or twitch pixel arrays.

In one or more embodiment, tracer beam 514 may be continuously emitted at a short wavelength of 405 nanometers that may be blue/Ultra-violet in color. However, due to the high speeds at which tracer beam 514 is scanned, the limited luminosity (luminous efficacy) of the short wavelength blue light may be less than 1 milliLumen and thus imperceptible to the vision of most humans.

A reflection 516 of tracer beam 514 is detected by detector 112 which is generally positioned in close proximity to light sources and optics 508, for example, next to scanner 110 (not shown in FIG. 5). Lens 510 may be used to collect and focus an image of reflected light 516 from screen 114 onto the sensor array, for example, a CCD array, of detector 112. In one embodiment reflected light 516 also includes a reflection of combined image beam 512 for comparison of the displayed image with the image in memory 118 (see FIG. 1).

In one or more embodiments, detector 112 provides feedback information, such as timing information to of a pulse 414 (see FIG. 4B), position information [X, Y], and image information, such as display pixel color and intensity data to feedback control component 502. Although not shown in FIGS. 4A and 4B, in one or more embodiments another separate detector such as detector 113 as shown in FIG. 1, may be employed to provide additional feedback information to feedback control component 502 that may include additional image information and additional timing information for pulse 414 that is employed to determine at least three dimensional information [X, Y, Z] for screen 114, one or more remotely located surfaces (not shown) or one or more remotely located objects (not shown) that may be stationary or moving. In one or more embodiments, with reference to FIGS. 1 and 2, feedback control component 502 is implemented as one or more of processor 116, CPU 222, detector interface 262, image processor 243, BTP 245, and detector processor 247.

Feedback control 502 provides control information 506 to light sources and optics component 508. Such control information include timing information $t_s$, and modulation control information 308 (see FIG. 3) to control the generation of tracer beam 514 and combined image beam 512, as more fully described above.

In one embodiment, with reference to FIGS. 1 and 2, light sources and optics component 508 may be implemented as one or more of light source driver 102, light sources 104, tracer beam generator 106, beam combiner 108, and scanner 110.

Figure 6A:
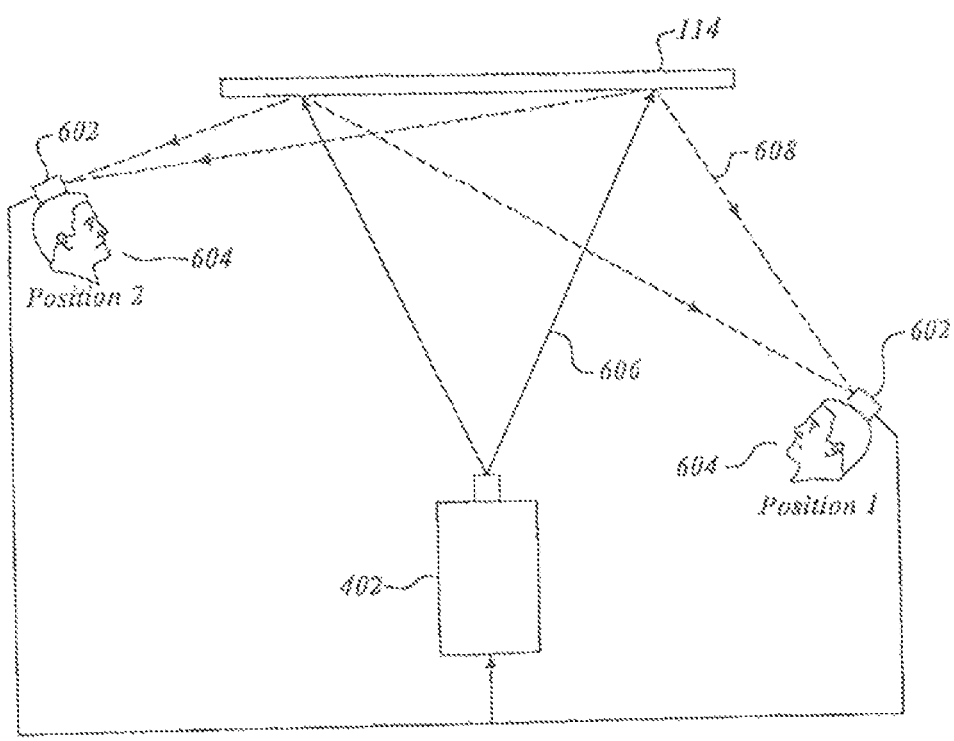
FIG. 6A shows an embodiment of an application of an LID with different user vantage points.

FIG. 6A shows an embodiment of an application of the LID of FIG. 1 with different user vantage points. For example, a user 604 may be at position-1, with respect to LID 402, and later move to position-2. In one embodiment, a head-mounted or body mounted position sensor 602 may be used to provide feedback about the user 604's current position to LID 402. In one embodiment, position sensor 602 may be a position camera that can collect visual information, such as an area of focus of user 604 or other information about the image from one or more of the screen, or a remote object (not shown). Based on feedback that LID 402 obtains from detector 112 (see FIG. 1) and the feedback provided by position sensor 602, processor 116 can calculate and adjust projected image beam 606 onto screen 114 in pseudo random scan patterns, e.g., cross hatching arcs, such that reflected beam 608 observed by user 604 provides a proper perspective of the projected image to user 604. Although not shown, in one or more embodiments position sensor 602 may employ a twitchy pixel array that provides feedback to LID 402 to automatically determine at least a three-dimensional position [X, Y, Z,] plus in some cases three more dimensions, such as pitch, roll and yaw, for a head or a facial feature of each user 604.

For instance, in one or more embodiments, if LID 402 is projecting an image of a car viewed from front when user 604 is viewing screen 114 from a vantage point along the direction of projection, then user 604 sees a front view of the car. Now, if user 604 moves to position-1 to the right of LID 402, then LID 402 calculates the new viewing angle for position-1 and projects the right-side perspective of the car image for user 604. Similarly, if user 604 moves to position-2 to the left of LID 402, then LID 402 calculates the new viewing angle for position-2 and projects the left-side perspective of the car image for user 604. Additionally, in one or more embodiments, a three or even six degrees of freedom position for detector 602 may be almost instantaneously determined for each pseudo random sweeping scan with one or more of photogrammetry or multi view stereo metric estimation methods. Further, this position determination may be employed as a low latency simultaneous localization and mapping method, which may be employed to project augmentations or attach labels onto real objects, such as the human fingers shown in FIG. 10A.

As described for FIG. 6A, this capability is useful in immersive applications, for example, video games, where user perspective can be dynamically and in real-time updated and projected. Additionally, in one embodiment, each eye can be treated as a separate point of view with different left and right depth perceptions. In this case, eyewear with separate shutters for each eye could be used to control the image viewed by each eye. Alternatively, polarization of lens in front of each eye could be employed to control the image viewed by each eye.

Figure 6B:
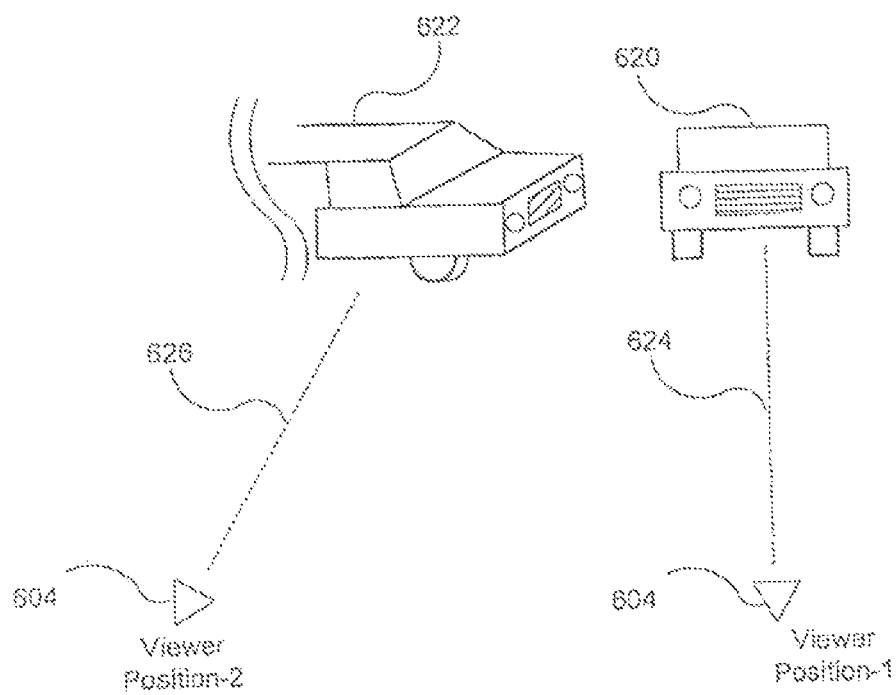
FIG. 6B shows an embodiment of an LID response to different viewing perspectives.

FIG. 6B shows an embodiment of a LID response to different viewing perspectives. In this embodiment, an illustrative image of a vehicle is projected by the LID onto a screen. When user 604 is at position-1, with a line of sight 624, which is substantially perpendicular to the screen, that is, substantially parallel with a center-line of projection from the LID to the screen, a front-view image 620 of the car is automatically projected by the LID. The position of user 604, in this case, position-1, relative to the center-line of projection is determined by information communicated via position sensor 602 (see FIG. 6A). When user 604 changes his position to position-2, with a line of sight 626, which is at an angle with respect to the center-line of projection, that is, not parallel with the center-line, the LID detects the new position via information provided by position sensor 602. Subsequently, the LID adjusts the image of the car to project the correct perspective image 622 of the car on the screen, as if user 604 is looking at a physical car in real world in 3-D. This embodiment enables projection of images in an immersive environment, such as video games, virtual reality applications like moving in and around an object, car, or building, and the like.

In one or more embodiments, substantially continuous scanning beam(s) moving in pseudo-random tracer pattern on remote three dimensional surfaces (objects, surfaces or screens) are tracked by one or more asynchronous sensors (e.g., twitchy pixels in linear or two dimensional SiPM arrays, with columns and rows address labelled to detect avalanche events emitted within less than a nano second, of light arriving at each successive pixel).

In one embodiment, the feedback and image adjustment mechanisms of LID may be used in an interactive virtual and/or augmented reality (VAR) system for interaction with user 604. In this embodiment, when user 604 approaches a projected object on the screen, the LID may provide many VAR capabilities, such as "zooming in," revealing ever greater detail about the projected object from the correct perspective, "zooming out," "panning left/right," "panning up/down," handling a projected object, for example, lifting or pushing, and most other interactions that may be performed on a real object. Furthermore, since few or no physical constraints exist in a VAR system, some interactions that cannot be performed with a physical object may be performed on a projected object. For example, user 604 may walk through a wall without breaking the wall, as light passing through glass. A "zoom factor" may determine the rate of magnification as a function of the distance between user 604 and the projected object. User 604 may approach any object in view on the screen. The zoom factor may depend on the relative distance and desired realism in the VAR system. These features may create enhanced depth & motion experience. Additionally, the scanned tracer patterns allow generation of a relatively exact instantaneous perspective of a remote surface or object in six degrees of freedom (framelessly and without unnecessary delays or eliminating a host of artifacts introduced by discrete quantizations).

In one embodiment, the LID renders a scene by continuous real-time adjustments of the projected image by referencing the image as viewed through a position camera aligned with the viewer's perspective, as described above with respect to FIGS. 6A and 6B. In one embodiment, the position camera may be focused on a field of view within the screen, representing a focus area of the viewer/user. For example, if the screen has the image of a football match, and the position camera is focused on a subarea of the screen, where the ball is located, then that subarea is the field of view. In one embodiment, the position camera may be mounted on goggles such that the direction of the gaze of the viewer/user determines the field of view seen by the position camera, which is subsequently fed back to the LID.

The position feedback and independence of quantization enables the LID to render objects in great detail, relatively unconstrained by any fixed resolution. The SiPM type pixels enable observation to be performed precisely in fractions of a nanosecond. In contrast, quantization employs frames that are snapshots, taken over 10 milliseconds (100 fps e.g.). The frames and their corresponding pixels are relatively coarse dimensional reductive lossy quantizations (forcing reality, best described in REAL numbers) into integer values. However, twitchy pixel arrays that employ t SiPMs can measure time in a 10 millionth fraction of the 10 millisecond frame interval, thus using this 10 million times more accurate time measurement to estimate the three dimensional spatial position of an edge of moving objects, such as fingers, pedestrians, or vehicles.

By concentrating the graphics subsystem computational resources, such as memory and processing power, on the rendering of graphics polygons describing the projected object, more detailed objects may be rendered. The system resources are more efficiently used because the field of view may be rendered with greater detail than a peripheral field, while still a sufficiently realistic peripheral vision experience is maintained. The peripheral field may be rendered in less detail, or with greater latency (for example, due to a lower processing priority), conserving computational resources such as memory and computing bandwidth. As discussed above, the distance of the viewer/user to the projected surface may be determined by detecting the tracer beam and determining the flight time of the tracer beam pulses. A total viewer distance, $D_T$ to an object is the sum of a real distance, $D_R$, and an imaginary distance, $D_I$: $D_T = D_R + D_I$. $D_R$ is the distance from the viewer (for example, the viewer's eyes) to the position on the screen where the object is projected. $D_I$ is the distance of the object away from and behind the plane represented by the projection surface (for example, screen), measured along the direction of view. For example, in a video game or VAR environment, a game engine may control $D_I$ by the varying size, shading, and rendering of perceivable details appropriately. $D_T$, may also be referred to as a radial distance (total perceived distance), that is the distance from the object in view to the viewer's eye measured radially, that is, along the direction of view. In addition to this radial distance, a correct angular perspective may also be determined, as discussed above.

Objects that can be rendered and viewed in different directions and angular positions may be limited by the screen geometry and the position of the viewer. In case of a standard single rectangular projection surface (for example, normal front or rear projection system configurations) the limiting factors are screen height and width, and the viewing distance. If projection is done on walls surrounding the viewer, little or no geometric limitations may exist for the field of view of the user and interactions with objects projected onto the screen. Apart from screen limitations imposed by geometry or physical configuration, the viewer, equipped with the position camera, may move freely about the screen and approach any object in his field of view, which is usually a limited subset of, a "view cone," within the total possible field of view. When the viewer approaches the screen the objects in his view will tend to naturally increase in size because the viewer is getting closer to them. As the image on the screen gets bigger, the image also occupies a greater portion of the field of view of the viewer. Accordingly, the viewer expects to see more details about the object, just as in real world.

At this point certain problems may occur that are best illustrated with an example. In an illustrative example, the viewer is looking at a static outdoor scene including a mountain about 10 miles away, some trees, and some rocks. Without any image adjustments by LID, as the viewer moves closer to the screen, the distance of the viewer to an object, for example, a tree, is reduced exactly proportionally to the real distance traversed by the viewer towards the screen. Thus as the viewer approaches a far away object, for example, the mountain 10 mile away in the view, the mountain will appear to come much closer than it should. For example, if the viewer travels three feet, half the distance of six feet from his original position to the screen, he will see the mountain twice as close even though he has not actually traveled five miles (half the perceived distance to the mountain). Even though this change in perceived distance is an expected artifact in a static image, it immediately tells the viewer's brain that the mountain is actually just a number of pixels projected on a flat surface six feet away, and not a real mountain 10 miles away. Thus, as the viewer comes closer to the screen, his natural depth perception is violated by every object in the scene, except possibly those objects that are perceived as close to the screen in the foreground.

Additionally, without image adjustment, all objects in the projected view may have unaltered geometric positions fixed to the projection surface, which is clearly not what would happen in reality. Furthermore, in the far background, the horizon does not recede, as it does in the real world, but comes 50% closer as the viewer moves three feet. In real world, as the user walks towards a mountain in the distance and approaches closer objects, the angular positions of objects with respect to the viewer's field of view generally increase for all objects in the view, more for closer objects, and less for farther objects.

Furthermore, without image adjustment, details that were hard to see at some distance, for example a tree that was 15 feet away, are still hard to see, when the viewer gets three feet closer. So, getting closer has less effect than expected. Also, as the viewer gets closer to the screen, serious projection and display limitations become visible due to an excessively coarse image rendering granularity and pixel pitch and other quantization artifacts that destroy the "suspension of disbelief".

The above visual faults may be more acute in a VAR environment. The visual faults that result from lack of proper adjustment to the projected image when the viewer moves with respect to the screen result in the loss of the carefully constructed illusion, which so critical to a full immersive experience.

The LID provides the capability to properly adjust the projected images, static, dynamic, or interactive, like VAR and video game environments, with respect to the viewer's position and field of view, to provide a realistic visual experience. Continuing with the illustrative example above, the viewer standing six feet away from the screen, may see in the center of the field of view a far away object, for example, the mountain. As the viewer moves half the distance to the screen—three feet—the system detects the viewer's motion and adjusts the screen size of the mountain correctly to half size, canceling the effect of the viewer moving 50% closer to the screen. The mountain is seen by the viewer as unaltered, as he would also see in real world, since the mountain is still approximately 10 miles away (less three feet) but the image is viewed from half the original distance to the screen. Without detecting the viewer's position, the mountain's apparent size would have doubled, as discussed above.

At the same time, a small bush in the foreground is left unaltered by the LID since the viewer's motion in fact results in the real distance to that bush being halved and the unaltered projected image should look twice as big, at half the distance, precisely as it would if it were a real bush. Additionally, since the bush is now quite close, a system using the LID, for example the VAR system, allocates some extra graphics resources to render more visible details in each leaf of the bush, and the like, to render a closer view of the bush, since the user is now closer and expects to see more detail. This is made possible by the dynamic resolution control feature of the LID. Possibly, as the viewer gets very close, the system may actually project a shadow of the viewer over the bush. Such rendering would further enhance the realism experienced by the viewer. The realism is further supported by the LID due to substantial lack of fixed pixel size, pixel position, pixel orientation, or scan patterns. The LID may render and display all objects in view in the natural looking detail with few or no obvious visual artifacts. An important point to note is that the LID is independent of a game controller, buttons, or keys to adjust the image. The LID may adjust the image automatically based on the position camera and the field of view of the viewer.

Figure 6C:
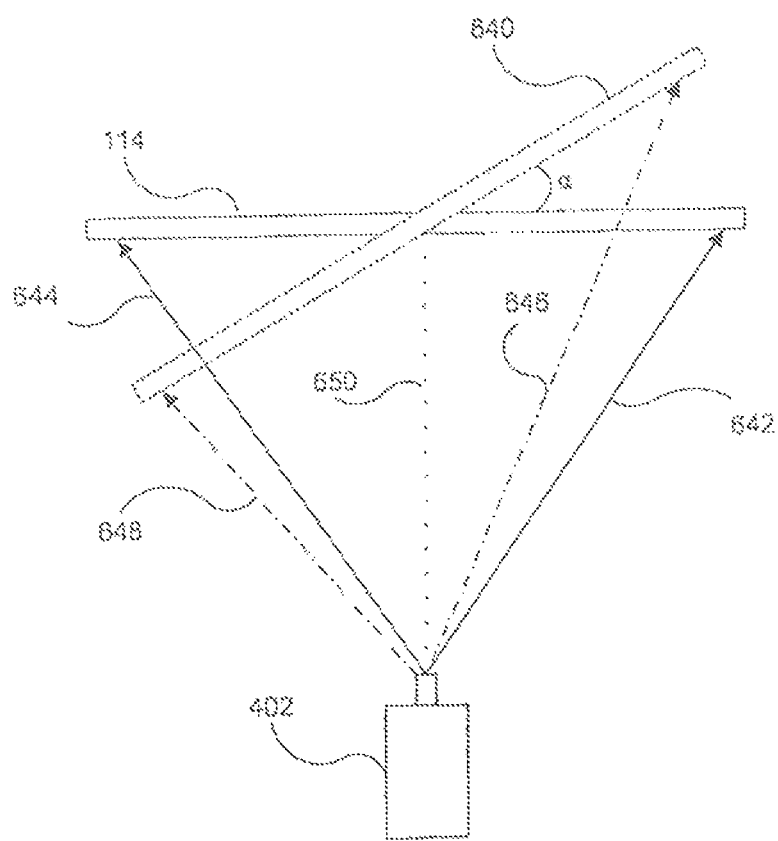
FIG. 6C shows an embodiment of a LID projection onto a tilted screen.

FIG. 6C shows an embodiment of a LID projection onto a tilted screen. LID 402 may project an image onto screen 114 when centerline 650 of projection is substantially perpendicular to the surface of screen 114. In this configuration, symmetrical projection lines 642 and 644 are substantially equal in length due to the symmetry of projection with respect to screen 114. In one embodiment, LID 402 may project the image onto screen 640 having an angle not perpendicular to centerline 650. In this configuration, asymmetrical projection lines 646 and 648 are substantially different in length due to the asymmetrical configuration of screen 640 with respect to LID 402. Because asymmetrical projection lines 646 and 648 have different lengths, the flight time of tracer beam pulses 418 (see FIG. 4B) will be different when the tracer beam is projected along the asymmetrical projection line 646 than when the tracer beam is projected along the asymmetrical projection line 648. This difference in flight time may be detected by the LID and used to adjust the projected image and avoid image distortion due to a "stretching" effect of a tilted screen.

The stretching effect is caused by geometric projection of a line segment onto a plane having an angle α with respect to the line segment. The length of the projected line segment, $L_p$=L/Cos α, where L is the length of the line segment. In this case, $L_p$>L, causing the stretching of the line segment. Similarly, any other shape projected on a tilted screen is also stretched by the same factor of 1/Cos α. The same adjustments done for tilted screen 640 may be applied to a projection surface with small surface irregularities and/or angles, such as a fabric with wrinkles or angled walls, in a piece-wise fashion. This ability of LID to use the tracer beam feedback and automatically adjust the projected image in real-time enables projection of images onto uneven and irregular surfaces with substantially reduced or eliminated distortions.

Figure 7A:
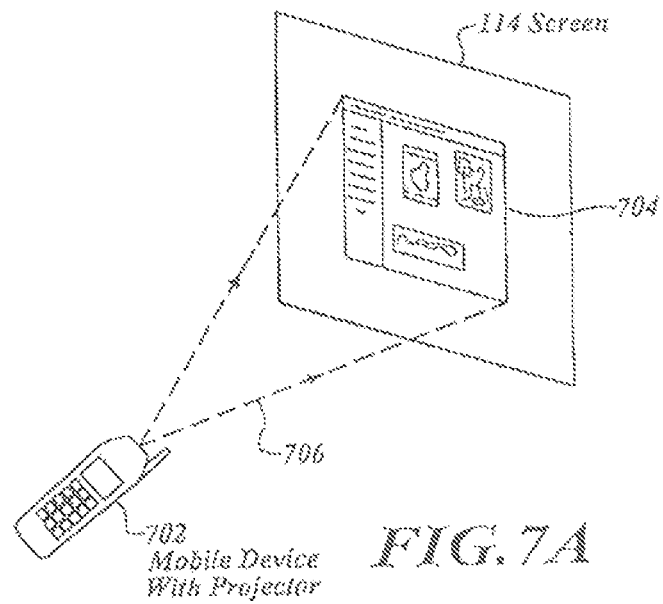
FIG. 7A shows an embodiment of a mobile device with an embedded LID.

FIG. 7A shows an embodiment of a mobile device with an embedded LID. Mobile device 702 may be any of a variety of mobile computing devices, such as mobile phones, PDA's, laptop PC's, and the like. The operation of LID is similar to that described above. Because LID technology is small by nature, using miniaturized solid state components such as LED light sources 104, MEMS (Micro Electronic and Mechanical Systems), such as scanner 110 (see FIG. 1), processor 116, and the like, and the actual screen, such as screen 114, where the image is projected is generally external to LID 100, LID is suitable for housing in small physical computing devices with little or no loss of screen size and/or displayed image quality. One limitation of small mobile computing devices is availability of sufficient power to run light sources for high intensity projection. In one embodiment, an AC power adapter may be used to provide additional electrical power for brighter or longer duration projections using mobile device 702. Software applications that need high quality GUI on modern mobile devices and can benefit from the LID technology include electronic mail (e-mail), video games, mobile web pages, and the like. The outputs of such software applications may be displayed using a LID as a projected image 704, instead of using the generally small and low resolution screens available on such devices.

Figure 7B:
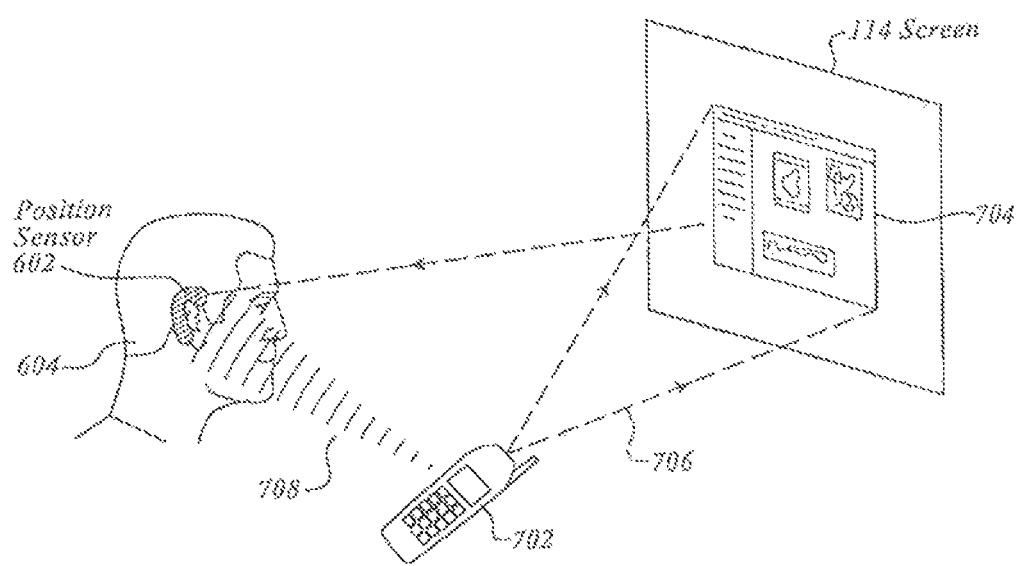
FIG. 7B shows another embodiment of a mobile device with an embedded LID and a head-mounted position sensor.

FIG. 7B shows another embodiment of a mobile device with an embedded LID and a head-mounted position sensor. In one embodiment, position sensor 602, shown in FIG. 6, may be implemented as an ear-mounted device that communicates wirelessly with the LID embedded in mobile computing device 702 to provide wireless position feedback 708 to the LID, as described above with respect to FIG. 6. Displayed image perspective is adjusted as user 604 moves around with respect to screen 114 and/or mobile device 702 when set in a stationary position.

Figure 8A:
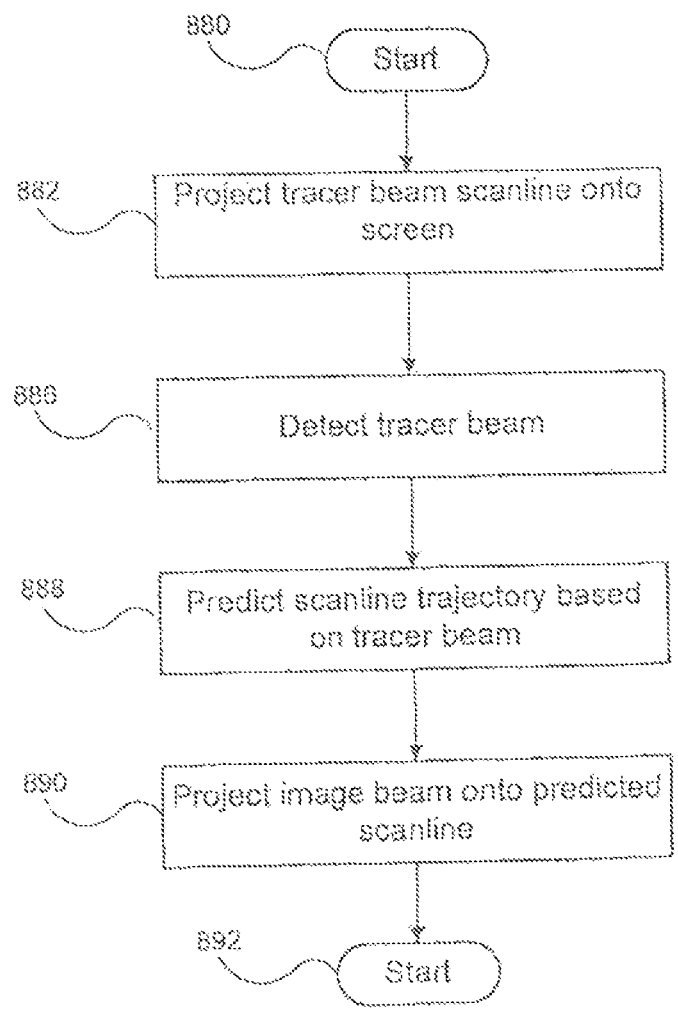
FIG. 8A shows a flow diagram of one embodiment of a high-level process of generating an image using a LID.

FIG. 8A shows a flow diagram of one embodiment of a high level process of generating an image using a LID. The process starts at block 880 and proceeds to block 882 where a tracer beam is projected onto a projection screen along a pseudorandom scanline trajectory. As described above, the tracer beam may include intense, short-duration light pulses, such as IR pulses, that may be imperceptible to human vision but may be easily detected by a detector. The process moves to block 886.

At block 886, the tracer beam is detected. Various detection schemes may be used that detect the screen position of each pulse on the pseudorandom scanline, such as 2-D CCD arrays, beam-folding optical detectors, and the like. Several screen positions corresponding to the tracer beam pulses are detected. In one embodiment, a sliding window with a width of N screen positions may be used to detect the tracer beam. The N screen positions may subsequently be used to predict the trajectory of the scanline. The process proceeds to block 888.

At block 888, a portion of the scanline trajectory that is not yet projected by the LID is predicted based on the N screen positions detected at block 886. For example, a curve fit algorithm may be used to extrapolate and determine the next M screen positions on the scanline. The process proceeds onto block 890.

At block 890, stored image pixels or generated graphics corresponding to the next M screen positions are obtained from an image source, such as from memory coupled with the LID. The correspondence of image pixels with the next M screen positions are not necessarily one-to-one. For example, one image pixel may cover and correspond to multiple screen positions, depending on the resolution of the image to be displayed. The obtained image is then projected by the LID onto one or more of the M screen positions. In one embodiment, the next M screen positions are determined on a continuous basis, for example, using another sliding window with a width of M. The process terminates at block 892. Additional process details are described below with respect to FIG. 8B.

FIG. 8B shows a flow diagram of one embodiment of a process of generating an image with the LID of FIG. 1. With reference to FIGS. 1 and 8, the overall process of generating an image using a LID starts at block 800 and proceeds to block 805 where tracer beam 122 pulses are projected onto screen 114. As discussed above, tracer beam 122 may be IR pulses that are projected in parallel with combined image beam 120 onto screen 114 and subsequently detected by detector 112. Tracer beam 122 is used to predict the next screen position on the current scan line being swept across screen 114 by scanner 110. The process proceeds to block 810.

At block 810, detector 112 is used to detect tracer beam 122 pulses, and provide the raw data and/or preprocessed data associated with the pulses to processor 116. In one embodiment, a sliding window algorithm is utilized to collected data about the N preceding pulses corresponding with the N preceding screen positions. The process proceeds to block 815.

At block 815, processor 116 calculates the trajectory of the current scan line to predict and/or estimate the next screen position on the current scanline for display of image pixel from memory 118. In one embodiment, next M screen positions are predicted based on the N preceding tracer beam 122 pulses on the current scanline. In one embodiment, the determination/prediction of the next M screen positions is repeated for each of the M pixels as the current scanline sweep continues by the scanner 110, thus implementing a sliding window algorithm both at the feedback end where data are collected about N preceding pulses and at the prediction end where M next screen positions are predicted. The sliding window at the feedback end is N pulses wide while the sliding window at the prediction end is M pixels wide. The process moves on to decision block 820.

At decision block 820, the process determines whether adjustment coefficients are updated and whether pixel color values, such as intensity or saturation, need adjustment before display. If so, the process proceeds to block 825 where the pixel values obtained from memory 118 are adjusted using the adjustment coefficients before proceeding to block 830. Otherwise, the process proceeds directly to block 830.

At block 830, the next M screen positions on the current scanline are determined. As noted above, in one embodiment, the next M screen positions are predicted based on dual sliding windows, one at the feedback end where data about preceding N screen positions are collected, and one at the prediction end where each of the next M screen positions are determined based on the data collected about the preceding N screen positions. The process proceeds to block 835.

At block 835, component image beams outputted by light sources 104 are modulated according to the corresponding values of color components of the pixels of image in memory 118, where the pixels correspond to the next screen position on the current scanline predicted at block 830. For example, the intensity of the R (Red) component image beam may be set to the red component value of the image in memory 118 for the pixel to be displayed next on the current scanline. The process proceeds to block 840.

At block 840, the component image beams, for example, RGB components, are combined together to form one combined image beam 120. In one embodiment, a prism may be used to combine the component image beam. In other embodiments other methods currently known in the art or methods to be discovered in the future may be used to combine the component image beams. The process proceeds to block 845.

At block 845, a scanner 110, for example a MEMS device with a rotating mirror with two degrees of rotational freedom, for example, two orthogonal planes of rotation, reflects the combined image beam 120 as pseudorandom scanlines sweeping across screen 114. Different methods may be used to inject randomness into the direction of the scanlines from one scan cycle to the next. These methods range from mechanical and physical means, such as imprecisely controlled off-center vibrations at microscopic level, to electronic and software means, such as random number generators. The process proceeds to block 850.

At block 850, detector 112 or another image detection camera optionally detects the reflection of combined image beam 120 from screen 114. In one embodiment, combined image beam 120 is scattered off screen 114 and is refocused onto detector 112, or the other image detection camera, using a lens 510 (see FIG. 5). Data collected about projected pixel values and positions are used to improve the projected pixel values (the image) on the next scan cycle. The process proceeds to decision block 855.

At decision block 855, the data collected about projected pixel values are compared with the corresponding pixel value of the image stored in memory 118 to determine any deviations. If any deviations are detected, for example, because of screen 114 color or texture, adjustment coefficients for the pixel values of the image in memory 118 are updated at block 860 to adjust such pixel values for the next scan cycle. Otherwise, the process proceeds to block 805 and the process is repeated for the next screen position on the current scanline. As one scanline is completed, another scanline is started and the same process described above is repeated with respect to the new scanline.

High Resolution Scanning

With high (super) resolution scanning of remote surfaces, objects of interest may be cropped and highlighted to accelerate perception of these objects, such as those that may be located on a roadway in front of a vehicle. In this way, vehicular collision avoidance agility may be improved and fast steering responsiveness for the vehicle may be provided. Further, one or more image projection devices may be employed to scan the surface of a road in front of a vehicle (FIG. 6B).

In one or more embodiments, perception of objects may be improved when the road surface is smooth, without strong sharp edges or structural edge features. Or the road surface coating is uniform providing no obvious image contrast fiducials, and there are no markings that cameras can get "a grip on". Perhaps a light snow has fallen or a storm has caused just enough snow/dust to cover up any remaining markings on the road surface.

Alternatively, in one or more embodiments, perception of objects may be improved when there are particularly low diffuse light conditions, e.g., winter evening with mist or fog diffusing the available light sources, and/or a low in the sky winter sun, moon light or street lights. Or even worse, the vehicle's headlights are absorbed, scattered and retro-reflected by snow, dust, mist droplets, or rain drops. Further, in one or more embodiments, when a small child, in a white winter coat, a white snow hare, or a pet bunny or other so-called "vulnerable road users" ("VRUs") cross a road on a dark winter evening, their presence in the path of an oncoming vehicle may not be detected by the typical type of camera used in vision systems for many popular electrically powered vehicles. A VRU may be a person using a road that is not protected by a car chassis or frame, animal pets, pedestrians, bicyclists, and the like. Also, a VRU may be classified as an object based on one or more of a shape, silhouette, motion, or the like.

However, when scanning beams are emanating from a vehicle, a new class of novel "VRU-safe" vehicle, such scanning beams can sharply delineate the outlines of VRUs on the road surface. The sweeping beams can immediately detect the outlines of VRUs. Sweeping across the road within the first 3 to 6 feet directly above the road surface the laser beam's leading edge would detect immediately the left and right edge of any VRU crossing the roads. See FIGS. 9A, 9B, 9C, 9D and 9E.

VRU Detection System

In one or more embodiment, when the scanning beam of light, such as a spot, is sweeping the road surface ahead of a vehicle with a rate of 10,000 sweeps per second, which might be done with scanning systems with a 5 kHz resonant scan mirror. In such a VRU system, left to right scans of the beam might alternate between right to left scans. Also, if a full field of view (FoV) of the VRU detection is approx. 50 degrees, then the beams sweeping across this FoV may take approximately 100 microseconds. Also, if a twitchy pixel sensor array includes 1,000 columns, a single reflection of the fast sweeping projected spot beam would cross an individual pixel in the array in approximately 100 nanosecond (100 micro seconds/1000=100 ns). At a distance of 10 meters, the spot beams' motion would sweep across an approximately 10 meters wide FoV (across approximately 3 lanes of traffic) at a rate of 1 centimeter (one pixel, $\frac{1}{1000}$th of the 50 degree FoV) per 100 nanoseconds or $\frac{1}{20}^{th}$ of a millimeter per nanosecond. However, when the beam's leading edge impinges on the VRU edge, the first reflected photons would arrive at least at one of the pixels of at least one of the twitchy pixel arrays in approx. 30 nanoseconds (ToF of 10 meters or 30 feet), and the first avalanche would signify/indicate that a close object is crossing the road within the reach of the sweeping spot beam of laser light. This indication may occur within a millisecond, and in some cases within $\frac{1}{10}$ of a millisecond. Note that when the arrivals of the first photons are detected with a temporal resolution of a nanosecond, which is quite easy in the latest SiPM pixel array technologies, then it follows, e.g., in the above example that at a distance of 10 meters ahead of a vehicle (or a robot driver) edges of the VRU can be located to the precision of single millimeter, if desired, which is very significantly beyond the abilities of other sensing systems (such as Cameras and light detection and ranging systems—LIDARS), and is well beyond the acuity of human vision.

In one or more embodiments, an image projection device for scanned (sweeping) laser spot beams of laser light may be configured to scan at least 10 lines across the FoV in a single millisecond. Also, the horizontal scan lines could be arranged to be 10 centimeters apart and thus detect any object greater that 10 centimeters within 1 meter above a surface of a road in front of a vehicle.

In one or more embodiments, scanning an individual point of laser light (spot) the image projection device may be arranged to scan 10 or more points of laser light across the FoV. As long as the points of light are suitably off set from each other by a twitchy pixel array receiver(s), trajectory estimation can quickly track impinging on edges of and progression of the individual points (spot beams) across a remote object such as the VRU. Also, in one or more embodiments, if a VRU detection system employs 10 or more spot beams of laser light simultaneously reflecting off the same scan mirror surface (polygonal, mems, galvanic, or the like) then a scan rate of one sweep across the FoV in one millisecond might be sufficient, thereby enabling a 10 times slower scan rate of 1 kHz (500 Hz back and forth and scan velocity across the same 1000 twitchy pixel columns, at "cadence" or a temporal pitch of approximately 1,000 nano seconds per column.

In one or more embodiments, the VRU detection system may provide highly precise edge detection for locating spatial edges (unmarked walls, corners, pillar and posts). The system can enable detection of a highly (super) resolved and ultra-low latency position, which can be used in determining a location in a six degrees of freedom (DoF) environment, e.g., the system may provide ultra-fast (laser fast) visual angular reckoning (to one $\frac{1}{100}$th degree in 3 key rotational degrees of freedom. The VRU detection system can enable flying drones, e.g., Quadcopters, to fly fast in small spaces, as it enables them to instantly detect otherwise hard to detect remote objects, such as small feature objects (birds and wires). The VRU detection system also provides for stabilizing and anchoring augmentation such as feature high lights or labels on real world objects in the FoV of a user, particularly when operating a headset in unstable and challenging inertial environments, such as any athletic activity, such as walking, running, swimming, or the like, or traveling by any type of vehicle, e.g., buses, trains, subways, boats, airplanes, helicopters, motorcycles, cars, or the like.

Figure 9A:
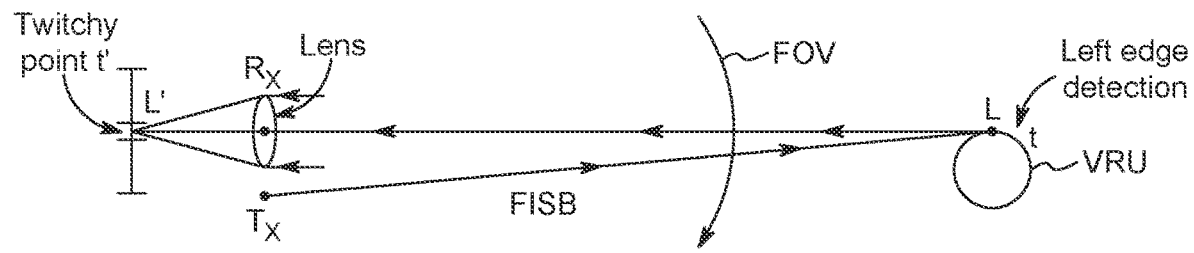
FIG. 9A illustrates a light transmitter emitting a fast sweeping scanning beam (FSSB) sweeping in a field of view (FoV) and the sweeping beam impinges on a left edge of a shape of a Vulnerable Road User (VRU)

FIG. 9A illustrates light transmitter Tx emitting a fast sweeping scanning beam (FSSB) sweeping (arrow) in a FoV and the sweeping beam impinges on the left edge at point L of a shape (the 3D surface contour) of a Vulnerable Road User (VRU). At time t, some of the beam's photons are reflected back to a receiver Rx, where a LENS focuses the captured/received photons (rays) in to a projection of R, i.e., R'. The first arriving photons are detected by a twitchy pixel at time t'.

Figure 9B:
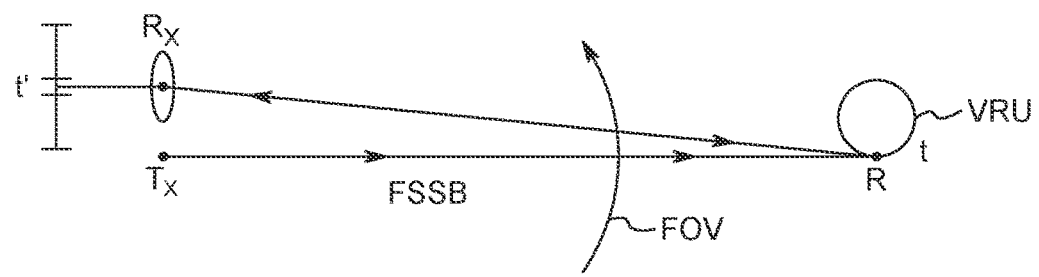
FIG. 9B shows a light transmitter emitting a FSSB sweeping in a FoV and the sweeping beam impinges on a right edge of a shape of a VRU.

FIG. 9B shows a light transmitter Tx emitting a fast sweeping scanning beam (FSSB) sweeping (arrow) in a FoV and the sweeping beam impinges on the right edge at point R of the shape of a Vulnerable Road User (VRU). At time t, some of the beam's photons are reflected back to a receiver Rx, where a lens (LENS) focuses the captured/received photons (rays) in to a projection of R, i.e., R'. The first arriving photons are detected by a twitchy pixel at time t'.

Figure 9C:
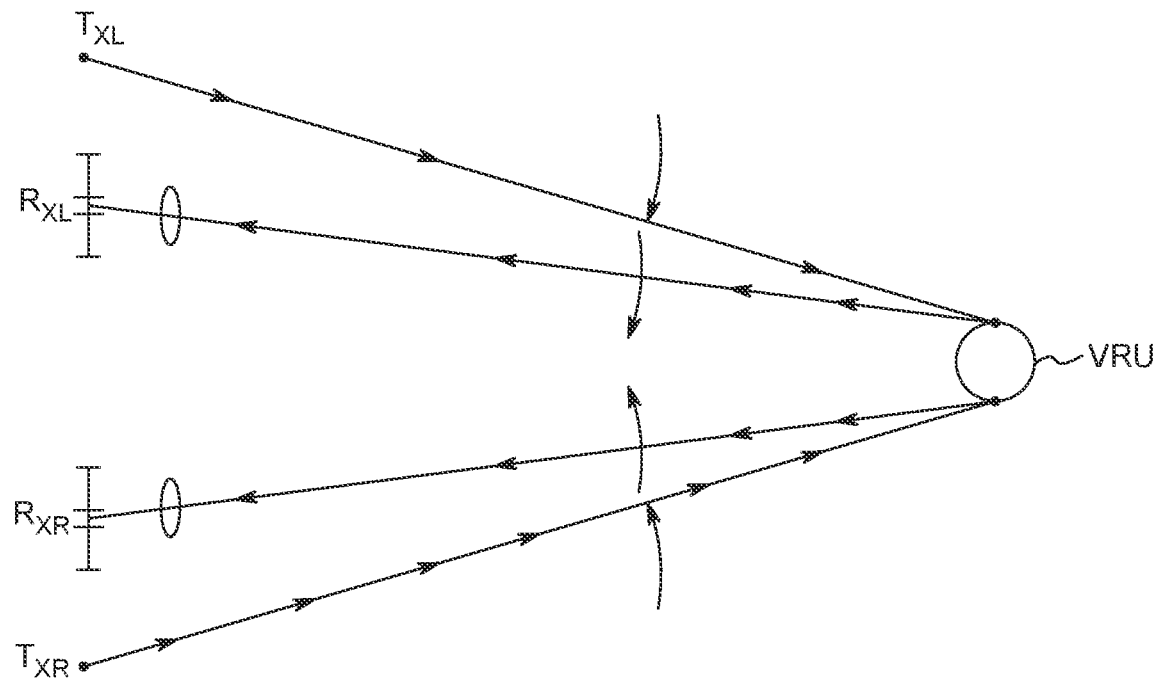
FIG. 9C illustrates a dual perspective VRU detection system with two receivers and two sweeping beam scanning systems to detect at least one edge of a VRU or other remote obstacles ahead of a vehicle.

FIG. 9C illustrates a dual perspective (stereo) VRU detection system with two receivers Rxl and Rxr, and two sweeping beam scanning systems Txl and Txr. The two beams may either operate simultaneously or in alternating fashion, e.g., each beam detects at least one edge of a VRU or other remote obstacles ahead of a vehicle.

Figure 9D:
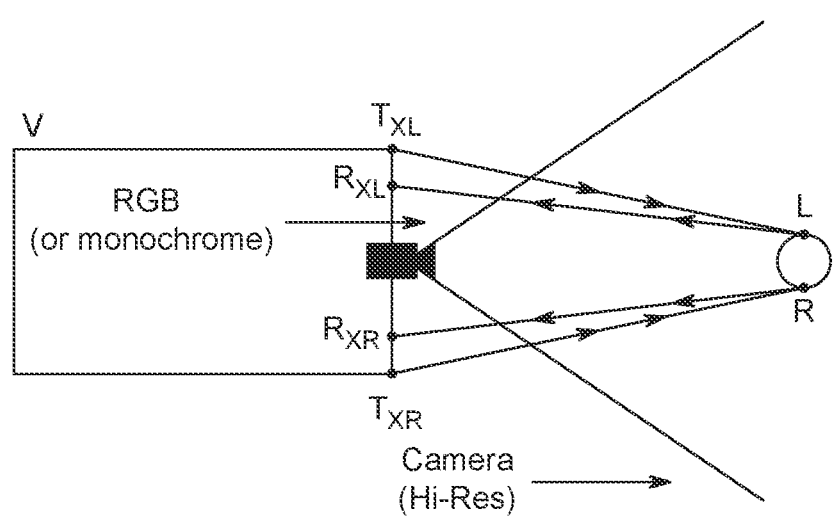
FIG. 9D shows a vehicle outfitted with a VRU detection system detecting the left and right contour points of a shape of a VRU immediately after reflected photons arrive at the receivers of the system.

FIG. 9D shows a vehicle V outfitted with the VRU detection system as described in FIG. 9C, detecting the left L and right R contour points immediately after reflected photons arrive at the Receivers Rxl and Rxr. In at least one or more embodiments, a separate forward detection imaging system (not shown) may share the FoV with the VRU detection system. The separate forward detection imaging system may employ one or more frame synchronous high resolution camera (monochrome or color) having a pixel resolution that matches the time interpolated edge detection resolution of the sweeping beams provided by the VRU detection system.

Figure 9E:
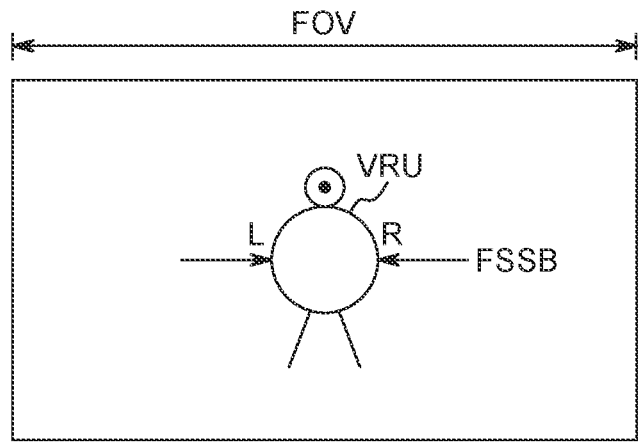
FIG. 9E illustrates an VRU detection system precisely and selectively "cropping out" a pixel from a high resolution image frame produced by a camera from a foreground object, such as a VRU.

FIG. 9E shows the VRU detection system precisely and selectively "cropping out" a pixel from a high resolution image frame produced by a camera, that is exactly and only the pixels from the foreground object, i.e., the VRU. Also, although a single high resolution camera is shown, two or more cameras can each benefit simultaneously from this cropping action, as it enables a selective and instantaneous foveation onto the VRU. This cropping—removing the background pixels—can reduce by 90% or more the visual data to be examined. This reduction greatly reduces the need for pixel feature matching searches and other computationally intense computer vision algorithms employed by vehicle anti-collision systems, which greatly improves system latency and path planning. Also, in one or more embodiments, typically, each millisecond before a collision counts, e.g., approximately $10^9$ Operations are saved per millisecond. Additionally, multiple perspectives provided by two or more cameras enables multiple precisely cropped images of a remote object, or alternatively multiple sequential views as a vehicle approaches an object (possibly a VRU), which enables photogrammetry methods and visual odometry to locate and track the trajectory of the object as a vehicle approaches the object. Further, since the edges are illuminated for less than a microsecond, they are not blurred so motion and the three dimensional position of the object can be tracked with extremely high motion precision, i.e., with exact nearly instantaneous velocity determination. (So both Human fingers and Robot fingers can now be tracked very accurately, with negligible latency.

Figure 10A:
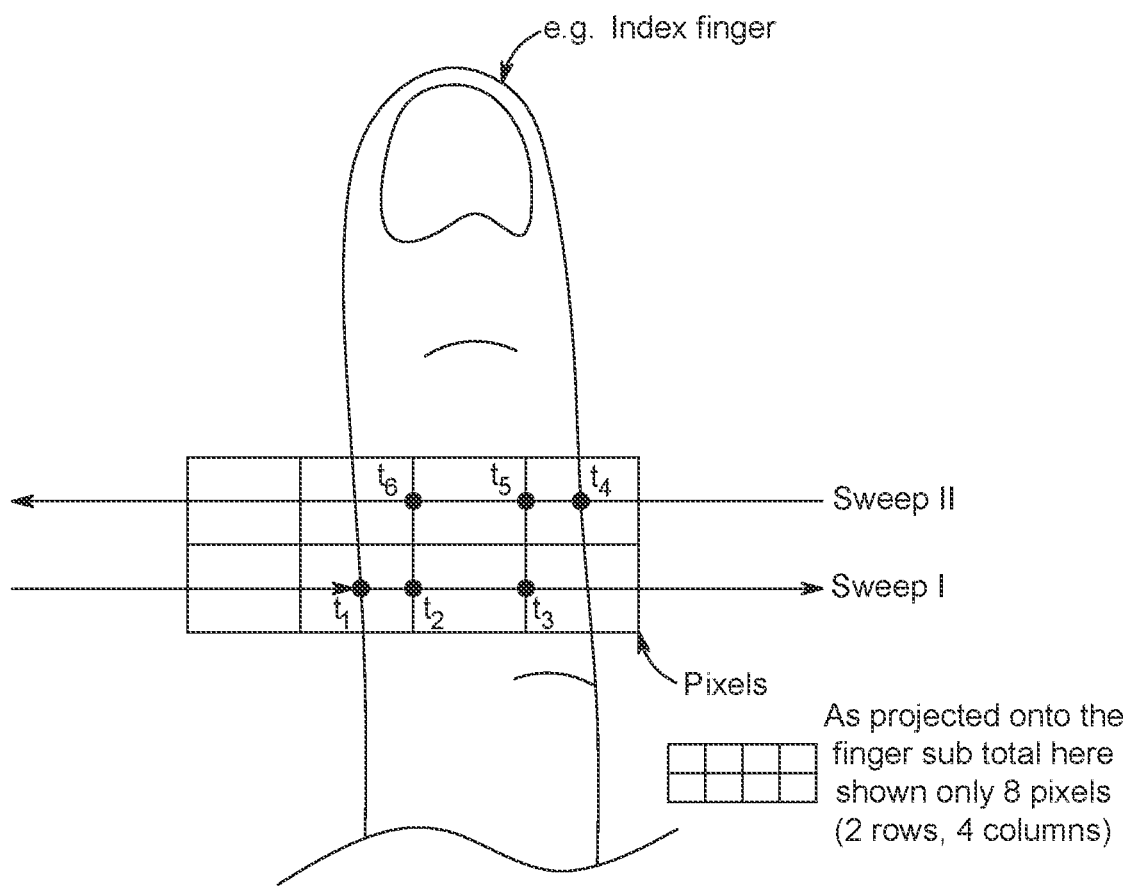
FIG. 10A shows an index finger as it is swept across by a fast detection spot beam from left to right and then in the reverse direction from right to left.
Figure 10B:
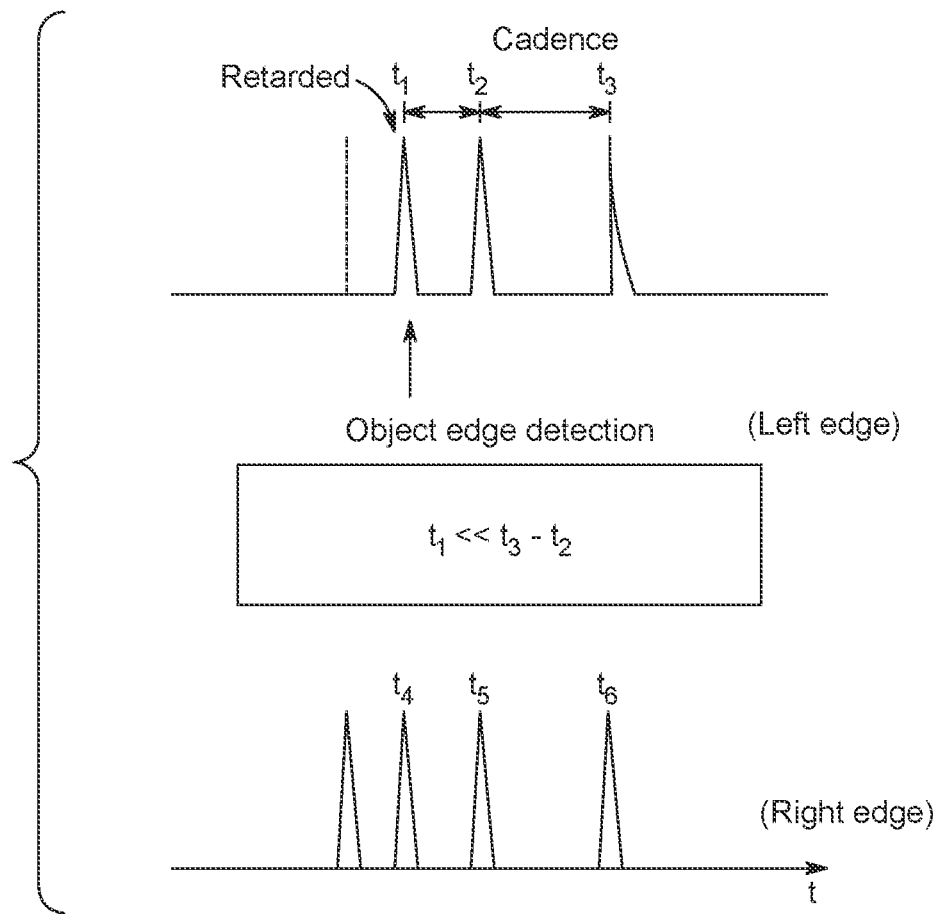
FIG. 10B illustrates where an event is out of cadence, and it does not fit the expected time matching the observed pixel boundaries.
Figure 10C:
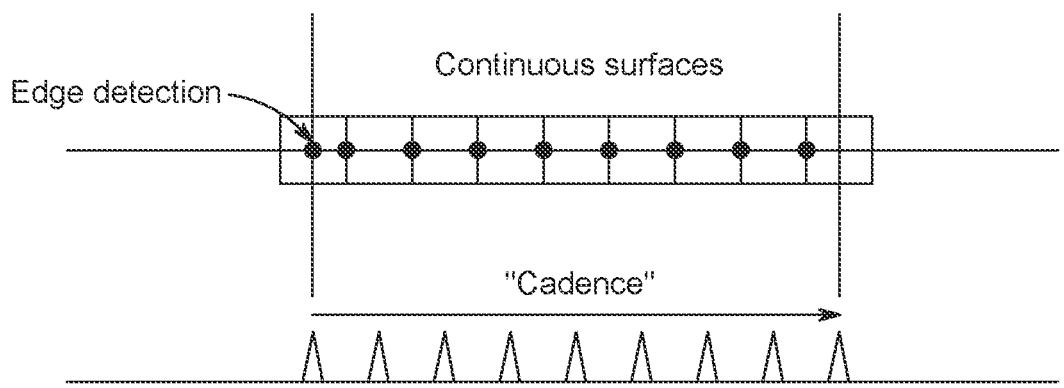
FIG. 10C shows larger surfaces that reveal the cadence of regular spacing of a pixel grid projected onto a relatively smooth flat surface at a distance as a fast scan beam arcs across field of view.

FIGS. 10A, 10B and 10C illustrate examples of determining highly precise edges in the near field of an Augmented Reality (AR) scan perception system. These figures show an index finger about 10 mm wide, the beam scan across at 5 KHz back and forth with a highly focused beam with minimal spot size of $\frac{1}{4}^{th}$ of mm (250 microns) impinging on the finger at moment t. Moment t is observed by a twitchy pixel sensor, e.g., a sensor array of 65,536 SiPM pixels 256 columns, 256 rows, each configured to alert and report an avalanche in the array. If the beam again, as in the previous example, sweeps across a 50-degree field of view, across 256 columns in 100 micro seconds, the 10-mm width of index finger spans across approximately 2.5 columns, the view "frustum" of a single twitchy pixel being approx. 4 mm×4 mm=16 mm$^2$ per pixel at a distance of 1 m. Thus, if the user's hands and finger motion is tracked over a working surface of one square meter tiled into a raster of tiles: this working surface intersects with view frusta of 65,526 "ultra-twitchy" pixels. Further, since the beam is focused, all of its blue PhotonJet output (e.g. 2×10$^{15}$ 405 nm Blu-Ray laser photons in to 250 micron spot beam is focused on the fingers, or any other object in the user's hand) the spot area on the surface fills at any time during its scan trajectory less than 100$^{th}$ of the "Pixel Frustum Tiles" as projected surface on the finger See FIG. 10A. As the leading edge of this highly focused beam impinges on the finger's edge, at least one of the cameras in the user's headset detects that event within 10 nanoseconds (note it takes only 3 nanoseconds for the first reflected photons to reach the detector).

Additionally, in one or more embodiments, with only 256 columns across and a full sweep across a FoV of 256 columns in 100 microseconds, a "Natural Rhythm", e.g., the cadence between pixel events regardless of distance, may be approximately 239 microseconds. Although it is unlikely that an edge of the finger aligns with a new pixel, it is somewhat likely to expect three events across the 10-millimeter width of a finger. For example, a first event might be approximately 3 nanoseconds after the sweeping spot beam impinges on a finger, and two more events might occur as the spot on the finger advances enough to enter the two successive pixels across the finger. The exact nanosecond of the first event informs on a precise momentary lateral (achieving resolution, of $\frac{1}{10}^{th}$ of millimeter or 100 microns with zero motion blur) position of the finger in the path of the scanned spot beam's sweeping direction (lateral sweep direction). The next two events may constitute reflections of the spot beam from two other positions somewhere else on the finger's contiguous surface. Note that if there are multiple fingers with some gaps (best greater than 4 millimeter) than a succession of surfaces and leading edges is instantaneously detected in a single sweep of the scanned spot beam.

FIG. 10A shows an index finger as it is swept across by a fast detection spot beam from left to right (events t1, t2 and t3) and then in the reverse direction from right to left (events at t4, t5 and t6).

FIG. 10B illustrates the case where event t1 is "out of cadence," and it does not fit the expected time matching the pixel boundaries observed by t2 and t3. It is actually late in occurring, i.e. "retarded" or out of sync events that do not fit the scan trajectory. It is likely an edge is being detected, when t1<<t3-t2, the latter matching the signature "cadence", e.g., easily observed for when scanning contiguous flat surfaces of larger objects such as walls tables or road surfaces.

FIG. 10C shows larger surfaces that reveal "cadence" of the regular spacing of the pixel grid projected onto a relatively smooth flat surface at a distance (minimal disparity at larger distances, surfaces do not need to flat, or of constant range as the fast scan beam arcs across the FoV).

Figure 11A:
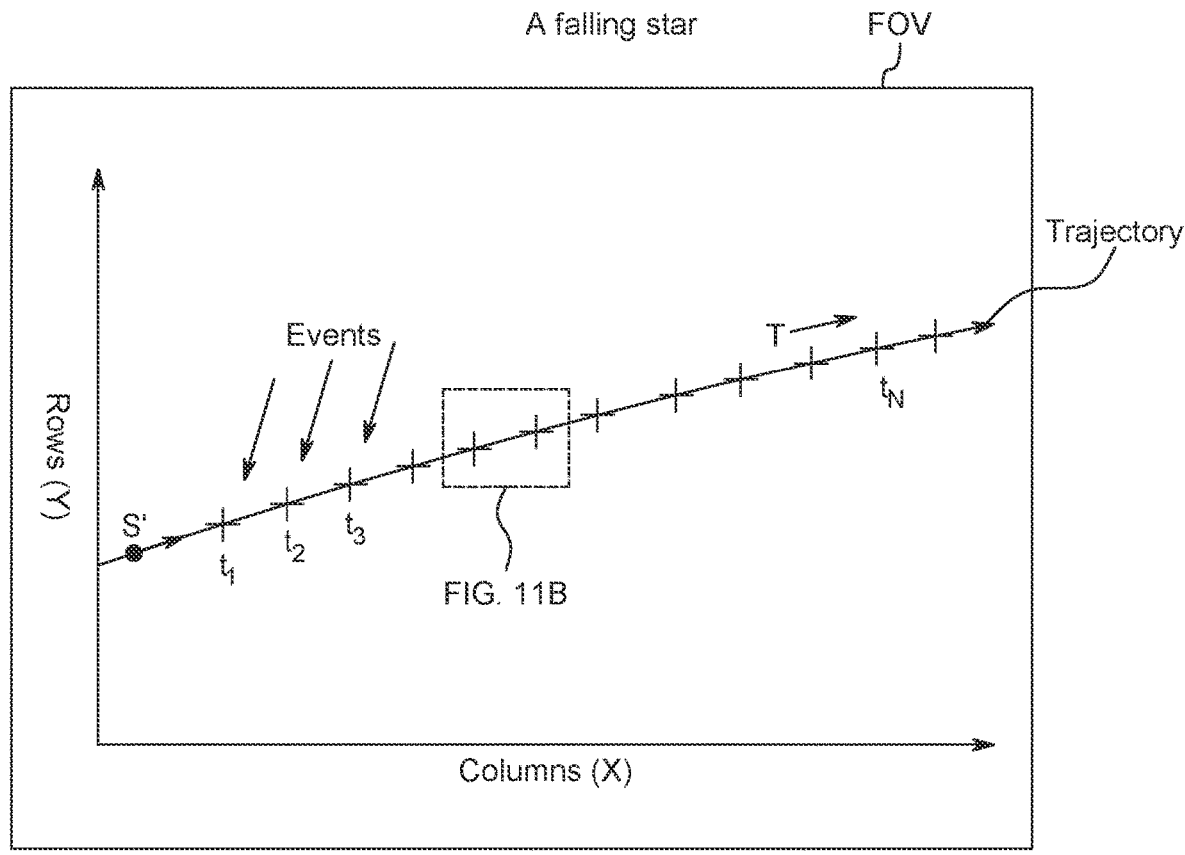
FIG. 11A illustrates a back reflected image projection of a laser beam's spot sweeping across a remote surface crossing the FoV of the VRU detection system.

FIG. 11A illustrates "A falling star" (also known as "shooting star") the back—reflected image projection of the laser beam's spot sweeping across a remote surface crossing of the FoV of the VRU detection system. The back projected spot S' streaks across the twitchy pixel array leaving a trace T→ across the twitchy pixels, as a discrete series of events (e.g. SiPM avalanches) in a time-sequential manner, and in a pixel-sequential manner adjacent pixels "fire" (avalanche) in a fast series that fits the Trace T→. N consecutive events are reported at time t1 t2 t3 . . . tn.

Figure 11B:
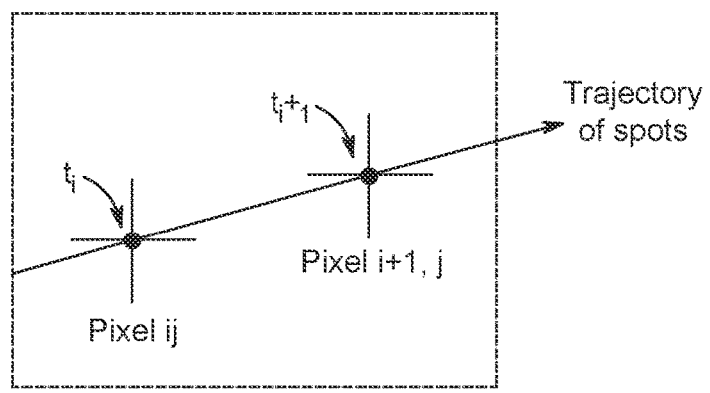
FIG. 11B shows an enlarged detail of the trajectory of the laser beam's spot which causes sequential events to occur in adjacent pixels.

FIG. 11B shows an enlarged detail of the trajectory of the spot S' which causes sequential events to occur in adjacent pixels, respectively, i.e., pixel i, j and pixel i+1, j at times $t_i$ and $t_{i+1}$.

Figure 11C:
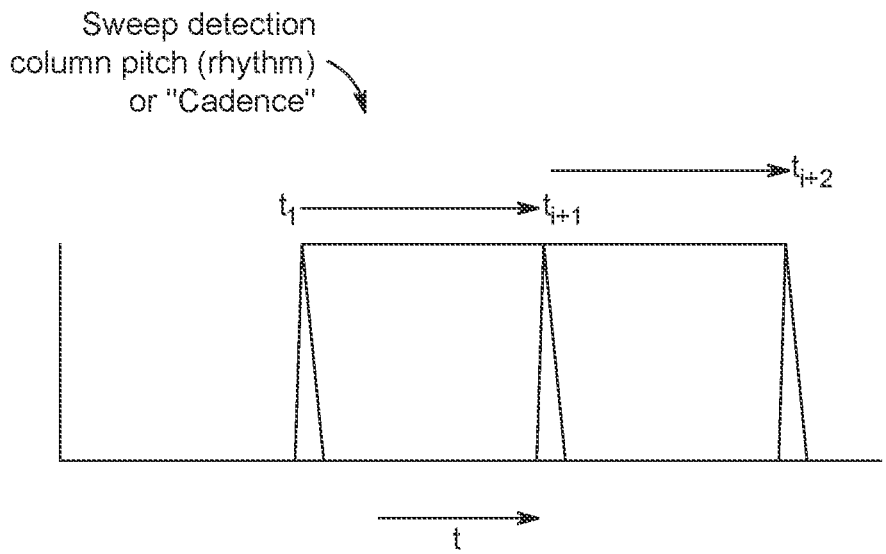
FIG. 11C illustrates sequential events that occur at adjacent pixels at a characteristic cadence when the receiver is close to the transmitter and is invariant to distance.

FIG. 11C illustrates sequential events that occur at adjacent pixels at a characteristic "cadence" which if the receiver is close to the transmitter is invariant to distance, it's only a function to the sweep speed (rotational speed in degrees per second) and the pitch of the pixels (columns), i.e. angular resolution (number of pixels per degree).

Figure 12A:
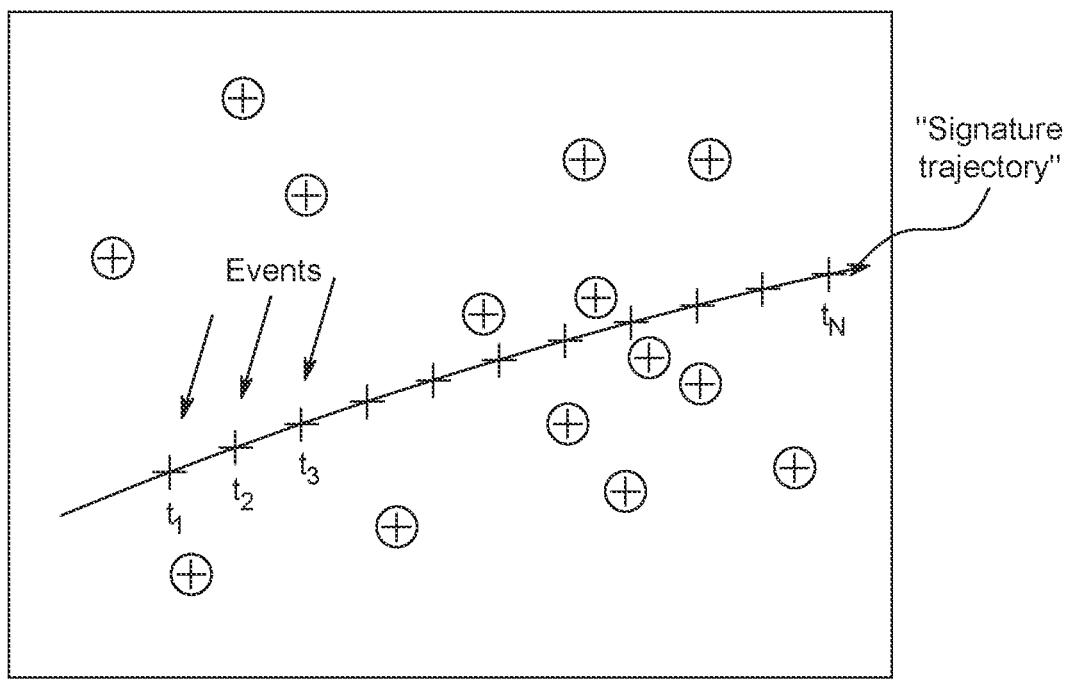
FIG. 12A shows random noise events and true signal events occurring concurrently across a twitchy pixel array.

FIG. 12A shows random noise events (0+0+0+) and true signal events (++++) occur concurrently across the twitchy pixel array. The true events can be sorted from the false (noise) events as only the true events fit the "signature trajectory" left by the fast sweep of the scanned spot beam.

Figure 12B:
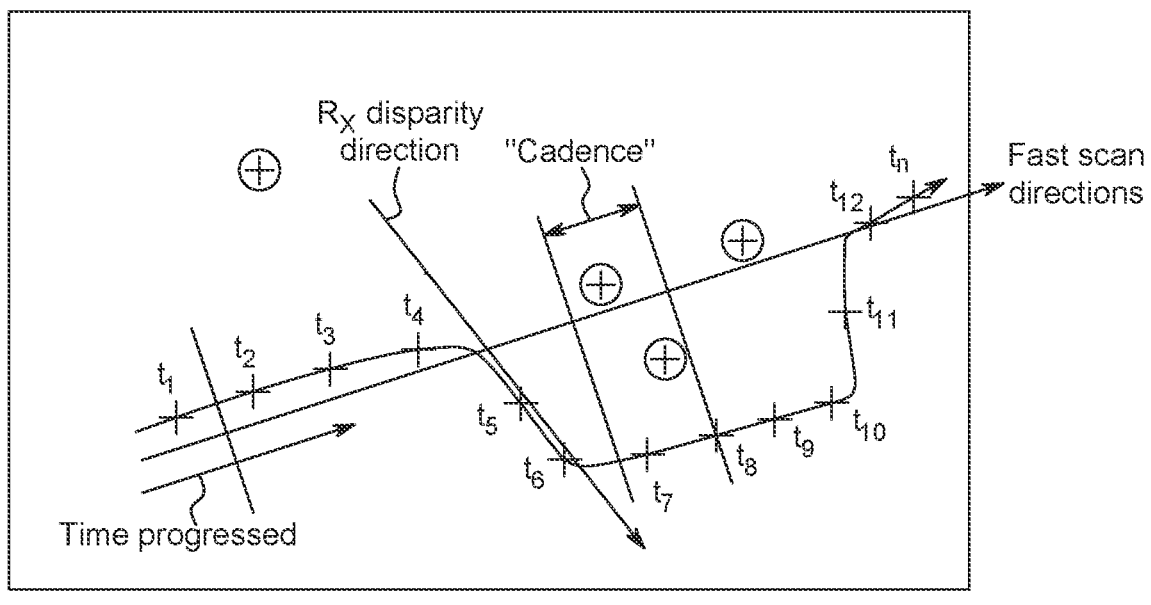
FIG. 12B illustrates a signature trajectory that is not as smooth when a receiver is offset from a transmitter in a VRU detection system, in accordance with the invention. The scan direction is the progression of the spot due to the rotation of the beam, and the offset or disparity direction is the movement of the spot due to variations in range with greater disparity in the near field, for surface positions that are closer, and lesser disparity for further positions. These two directions are not the same and may be orthogonal.

FIG. 12B illustrates the signature directory might not be smooth if the receiver Rx is offset from the transmitter (Tx) in that case as here depicted deviations from the scan trajectory represents the disparity direction (the disparity vector), and variations in the Z distance the range of the surface traced by the flying laser spot. Note there might be a plurality of sensors each with its own, different unique offset, i.e., its own fixed unique disparity direction. The laser scan motion is the same for all observers, whereas the disparity direction is unique to each sensor, thus by combining the observations of multiple sensors by computation means, the disparity (a very precise measure of range in the near field) can be observed independent form the scan pattern motion signature which can thus be used by all observers to filter out the random noise. (sensor dark current and ambient).

In one or more embodiments, random noise events (0+0+0+) and true signal events (++++) may occur concurrently across the twitchy pixel array. Also, the true events (++++) can be sorted, differentiated from the false (noise) events. In this way, the true events fit the signature trajectory left by the fast sweeping scan beam. And the time sequential trail of events is the signature that reveals "how the dots connect". The events that are (likely) true events t1 t2 . . . t12, t13 are all very close and progressive, and they advance forward at the same rate as the scan direction, i.e. the direction where the cadence is closest to constant.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for scanning beams of light, comprising:
   one or more light sources;
   one or more sensors;
   a memory to store instructions that are configured to cause actions; and
   one or more processor devices, wherein execution of the instructions enables performance of actions, comprising:
      employing the one or more light sources to pseudo randomly scan one or more beams of light adapted for projection onto one or more remote surfaces; and
      employing the one or more sensors to determine one or more edges at one or more multi-dimensional positions of the one or more remote surfaces based on one or more reflections of the one or more beams of light.

2. The system of claim 1, further comprising:
   employing a sweep of the one or more light beams in a first lateral direction and another sweep of the one or more light beams in a second lateral direction to determine each edge of the one or more remote surfaces in a field of view based on the one or more reflections of the one or more beams of light from the one or more remote surfaces that are out of cadence.

3. The system of claim 1, wherein employing the one or more light sources to pseudo randomly scan the one or more beams of light, further comprises:
   sweeping the one or more beams of light through a field of view in a first lateral direction and through the field of view in a second lateral direction onto the one or more remote surfaces, wherein the first lateral direction is opposite to the second lateral direction.

4. The system of claim 1, further comprising:
   employing a first light source located in a first position to sweep pseudo random scans of a first beam through a field of view in a first lateral direction and a second light source that is located at a second position to sweep pseudo random scans of a second beam of light through the field of view in a second lateral direction onto the one or more remote surfaces; and
   employing the reflections of the first and second beams of light beams to determine one or more of:
      two or more remote surfaces that are contiguous in the field of view;
      a trajectory of movement by the one or more remote surfaces in the field of view; or
      one or more edges of the one or more remote surfaces in the field of view.

5. The system of claim 1, further comprising:
   employing a sweep of the one or more light beams in a first lateral direction and another sweep of the one or more light beams in a second lateral direction to determine a trajectory of movement through a field of view based on the one or more reflections of the one or more beams of light from the one or more remote surfaces.

6. The system of claim 1, wherein the one or more sensors further comprise:
   a twitchy pixel array that employs one or more Silicon Photon Multiplier (SiPM) arrays.

7. The system of claim 1, wherein the one or more sensors further comprise:
   determining a trajectory of one or more objects in a foreground based on reflections of the one or more light beams from the one or more objects.

8. A method of scanning beams of light, comprising:
   employing one or more light sources to pseudo randomly scan one or more beams of light adapted for projection onto one or more remote surfaces; and
   employing the one or more sensors to determine one or more edges at one or more multi-dimensional positions of the one or more remote surfaces based on one or more reflections of the one or more beams of light.

9. The method of claim 8, further comprising:
   employing a sweep of the one or more light beams in a first lateral direction and another sweep of the one or more light beams in a second lateral direction to determine each edge of the one or more remote surfaces in a field of view based on the one or more reflections of the one or more beams of light from the one or more remote surfaces that are out of cadence.

10. The method of claim 8, wherein employing the one or more light sources to pseudo randomly scan the one or more beams of light, further comprises:
   sweeping the one or more beams of light through a field of view in a first lateral direction and through the field of view in a second lateral direction onto the one or more remote surfaces, wherein the first lateral direction is opposite to the second lateral direction.

11. The method of claim 8, further comprising:
   employing a first light source located in a first position to sweep pseudo random scans of a first beam through a field of view in a first lateral direction and a second light source that is located at a second position to sweep pseudo random scans of a second beam of light through the field of view in a second lateral direction onto the one or more remote surfaces; and employing the reflections of the first and second beams of light beams to determine one or more of:
    two or more remote surfaces that are contiguous in the field of view;
    a trajectory of movement by the one or more remote surfaces in the field of view; or
    one or more edges of the one or more remote surfaces in the field of view.

12. The method of claim 8, further comprising:
employing a sweep of the one or more light beams in a first lateral direction and another sweep of the one or more light beams in a second lateral direction to determine a trajectory of movement through a field of view based on the one or more reflections of the one or more beams of light from the one or more remote surfaces.

13. The method of claim 8, wherein the one or more sensors further comprise:
    a twitchy pixel array that employs one or more Silicon Photon Multiplier (SiPM) arrays.

14. The method of claim 8, wherein the one or more sensors further comprise:
    determining a trajectory of one or more objects in a foreground based on reflections of the one or more light beams from the one or more objects.

15. A computer readable non-transitory media for storing instructions that are configured to cause actions for scanning beams of light, wherein one or more processor devices that execute the instructions enable performance of actions, comprising:
    employing one or more light sources to pseudo randomly scan one or more beams of light adapted for projection onto one or more remote surfaces; and
    employing the one or more sensors to determine one or more edges at one or more multi-dimensional positions of the one or more remote surfaces based on one or more reflections of the one or more beams of light.

16. The computer readable non-transitory storage media of claim 15, further comprising:
employing a sweep of the one or more light beams in a first lateral direction and another sweep of the one or more light beams in a second lateral direction to determine each edge of the one or more remote surfaces in a field of view based on the one or more reflections of the one or more beams of light from the one or more remote surfaces that are out of cadence.

17. The computer readable non-transitory storage media of claim 15, wherein employing the one or more light sources to pseudo randomly scan the one or more beams of light, further comprises:
    sweeping the one or more beams of light through a field of view in a first lateral direction and through the field of view in a second lateral direction onto the one or more remote surfaces, wherein the first lateral direction is opposite to the second lateral direction.

18. The computer readable non-transitory storage media of claim 15, further comprising:
employing a first light source located in a first position to sweep pseudo random scans of a first beam through a field of view in a first lateral direction and a second light source that is located at a second position to sweep pseudo random scans of a second beam of light through the field of view in a second lateral direction onto the one or more remote surfaces; and
employing the reflections of the first and second beams of light beams to determine one or more of:
    two or more remote surfaces that are contiguous in the field of view;
    a trajectory of movement by the one or more remote surfaces in the field of view; or
    one or more edges of the one or more remote surfaces in the field of view.

19. The computer readable non-transitory storage media of claim 15, further comprising:
employing a sweep of the one or more light beams in a first lateral direction and another sweep of the one or more light beams in a second lateral direction to determine a trajectory of movement through a field of view based on the one or more reflections of the one or more beams of light from the one or more remote surfaces.

20. The computer readable non-transitory storage media of claim 15, wherein the one or more sensors further comprise:
    a twitchy pixel array that employs one or more Silicon Photon Multiplier (SiPM) arrays.

\* \* \* \* \*